United States Patent
Kamei et al.

(10) Patent No.: US 9,817,186 B2
(45) Date of Patent: Nov. 14, 2017

(54) POLARIZATION ROTATOR

(71) Applicant: NIPPON TELEGRAPH AND TELEPHONE CORPORATION, Tokoy (JP)

(72) Inventors: Shin Kamei, Atsugi (JP); Makoto Jizodo, Atsugi (JP); Hiroshi Fukuda, Atsugi (JP); Kiyofumi Kikuchi, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/122,840

(22) PCT Filed: Mar. 4, 2015

(86) PCT No.: PCT/JP2015/001158
§ 371 (c)(1),
(2) Date: Aug. 31, 2016

(87) PCT Pub. No.: WO2015/133140
PCT Pub. Date: Sep. 11, 2015

(65) Prior Publication Data
US 2017/0068048 A1    Mar. 9, 2017

(30) Foreign Application Priority Data

Mar. 5, 2014 (JP) ................................ 2014-042837
Sep. 26, 2014 (JP) ................................ 2014-197460

(51) Int. Cl.
*G02B 6/126* (2006.01)
*G02B 6/122* (2006.01)
(Continued)

(52) U.S. Cl.
CPC ........... *G02B 6/126* (2013.01); *G02B 6/1228* (2013.01); *G02B 6/14* (2013.01); *G02B 6/2766* (2013.01);
(Continued)

(58) Field of Classification Search
CPC .... G02B 6/0028; G02B 6/1228; G02B 6/126; G02B 6/14; G02B 6/2766; G02B 6/305; G02B 2006/12097; G02B 2006/12195
See application file for complete search history.

(56) References Cited

U.S. PATENT DOCUMENTS 5,852,687 A    12/1998    Wickham
7,792,403 B1    9/2010    Little et al.
(Continued)

FOREIGN PATENT DOCUMENTS

JP    H06-18735 A    1/1994
JP    2013-125276 A    6/2013

OTHER PUBLICATIONS

Daoxin Dai et al., "Mode Conversion in Tapered Submicron Silicon Ridge Optical Waveguides", Optics Express, vol. 20, No. 12, Jun. 4, 2012, pp. 13425-13439.*
(Continued)

*Primary Examiner* — Daniel Petkovsek
(74) *Attorney, Agent, or Firm* — Workman Nydegger

(57) ABSTRACT

Polarization rotators of conventional techniques require forming a silicon nitride layer, which is not employed in usual fabrication of a silicon waveguide circuit. In order to employ a polarization rotator function in an optical integrated circuit, a process of forming a silicon nitride layer is added just for that purpose. This increases the fabrication time and complicates the fabrication equipment. In a polarization rotator of the present invention, the waveguide width of a center core portion of a polarization converter is made
(Continued)

small. Thus, the intensity of an optical wave does not concentrate only at the center core portion and is more influenced by structural asymmetry. With the configuration of the polarization rotator of the present invention, it is possible to efficiently cause polarization conversion with a structure including only a silicon waveguide and no silicon nitride layer or the like formed thereon.

15 Claims, 44 Drawing Sheets

(51) Int. Cl.
  *G02B 6/14* (2006.01)
  *G02B 6/27* (2006.01)
  *G02B 6/28* (2006.01)
  *G02B 6/12* (2006.01)

(52) U.S. Cl.
  CPC .. *G02B 6/2861* (2013.01); *G02B 2006/12061* (2013.01); *G02B 2006/12097* (2013.01); *G02B 2006/12147* (2013.01)

(56) References Cited

U.S. PATENT DOCUMENTS

| | | | |
|---|---|---|---|
| 8,855,449 B1* | 10/2014 | Roth | G02B 6/2773 385/11 |
| 8,873,899 B2* | 10/2014 | Anderson | G02B 6/27 385/11 |
| 9,128,242 B2* | 9/2015 | Kojima | G02B 6/14 |
| 9,557,482 B2* | 1/2017 | Oka | G02B 6/105 |
| 2009/0297093 A1 | 12/2009 | Webster et al. | |
| 2014/0133796 A1* | 5/2014 | Dong | G02B 6/126 385/11 |
| 2016/0178842 A1* | 6/2016 | Goi | G02B 6/126 385/11 |

OTHER PUBLICATIONS

International Preliminary Report on Patentability and Written Opinion dated Sep. 15, 2016, issued in PCT Application No. PCT/JP2015/001158, fled Mar. 4, 2015.
Long Chen et al., *Compact Polarization Rotator on Silicon for Polarization-Diversified Circuits*, Optics Letters, vol. 36, 2011, pp. 469-471.
Daoxin Dai et al., *Novel Concept for Ultracompact Polarization Splitter-Rotator Based on Silicon Nanowires*, Optics Express, vol. 19, 2011, pp. 10941-10949.
Wesley D. Sacher et al, "Polarization Rotor-Splitter in Standard Active Silicon Photonic Platforms", Optics Express, vol. 22, No. 4, Feb. 10, 2014, pp. 3777-3786.
Yunhong Ding et al, "Wideband Polarization Splitter and Rotator with Large Fabrication Tolerance and Simple Fabrication Process", Optics Letters, vol. 38, No. 8, Apr. 15, 2013, pp. 1227-1229.
EP 15757973.1, Aug. 2, 2017, Search Report.
SG 11201607289S, Aug. 1, 2017, Search Report.

* cited by examiner

POLARIZATION ROTATOR

TECHNICAL FIELD

The present invention relates to a polarization rotator. More specifically, the present invention relates to a planar polarization rotator formed of silicon waveguides.

BACKGROUND ART

Optical circuits formed of silicon waveguides have been actively researched and developed since they have an advantage that the circuit size can be significantly smaller than those using conventional materials such as silica. Controlling the polarization of passing light, in particular, polarization splitting and polarization rotation, is one of important functions of an optical circuit. A polarization rotator is a circuit configured to output light of polarization perpendicular to the polarization of polarized light inputted thereto. As optical circuits formed on a planar substrate, generally used is an optical circuit configured to convert TE-polarized light, having its electric-field component horizontal to the substrate, into TM-polarized light, having its electric-field component vertical to the substrate, or an optical circuit configured to convert TM-polarized light into TE-polarized light.

There have been proposed several methods of performing polarization rotation with a silicon waveguide. As a first conventional technique example, a circuit has been proposed which is configured to adiabatically rotate polarization by using a structure of silicon nitride $Si_3N_4$ added on a silicon waveguide. Details of this polarization rotator are disclosed in NPL 1.

Moreover, as a second conventional technique example, a polarization rotator has been proposed which includes a polarization converter and a mode converter with silicon waveguides whose over claddings are made of silicon nitride. In this conventional technique example, the polarization converter includes a tapered waveguide whose width gradually increases, while the mode converter includes an asymmetric directional coupler including two waveguides differing in width. This polarization rotator is disclosed in detail in NPL 2.

FIGS. 43A and 43B are views showing the configuration of the polarization rotator in the above second conventional technique example. FIG. 43A is a top view of a surface where the circuit is formed. The polarization rotator shown in FIG. 43A includes: a polarization converter 1003 formed of a tapered waveguide whose width increases from w1 to w2; and a mode converter 1014 formed of an asymmetric directional coupler including two waveguides 1005, 1006 differing in width. The tapered waveguide 1003 and the waveguide 1005 are smoothly connected by a second tapered waveguide 1004. Optical signals of given polarizations and modes are inputted into and outputted from the polarization rotator shown in FIG. 43A through input-output waveguides 1001, 1007, 1008. The input-output waveguide 1001 and the tapered waveguide 1003 are smoothly connected by a third tapered waveguide 1002. In the figure, the waveguides and the boundaries of their regions are individually illustrated with clear dotted lines (partitions perpendicular to the direction of travel of light). It is, however, to be noted that the partitions are illustrated based on the functions for convenience and the constituent material has no discontinuity or actual boundary.

In an example of the actual structure, the length of the tapered waveguide 1003 is 50 μm, and its width is w1=0.69 μm to w2=0.83 μm. The waveguide 1005 and the waveguide 1006, forming the asymmetric directional coupler, have a width of 0.9 μm and a width of 0.405 μm, respectively, and both have a length of 17 μm. The gap between the two waveguides 1004, 1005 is 0.25 μm. The width of the input-output waveguide 1001 is 0.5 μm, and the length of each of the second tapered waveguide 1004 and the third tapered waveguide 1002 is 15 μm.

Also, in a different structure example focusing on reducing the entire circuit length, the length of the tapered waveguide 1003 is 44 μm, and its width is w1=0.69 μm to w2=0.83 μm as in the above structure. The widths of the waveguide 1005 and the waveguide 1006, forming the asymmetric directional coupler, are 0.9 μm and 0.405 μm, respectively. The gap between the waveguides 1005, 1006 is 0.15 μm so that the lengths of the two waveguides 1005, 1006 can both be 7 μm and the length of asymmetric directional coupler can therefore be reduced. The width of the input-output waveguide 1001 is 0.54 μm. The length of each of the second tapered waveguide 1004 and the third tapered waveguide 1002 is 15 μm. In the case of this structure, the entire length of the polarization rotator is 71 μm.

FIG. 43B shows a cross-sectional structure taken along line XLIIIB-XLIIIB in the top view of the polarization rotator shown in FIG. 43A. An under cladding 1010 made of silica is provided on a silicon substrate 1011. A core 1003 of the tapered waveguide made of silicon is formed on the under cladding 1010. Further, an over cladding 1009 of silicon nitride $Si_3N_4$ is formed in such a way as to cover the core 1003. The core thickness of the waveguide 1003 is 0.22 μm, the thickness of the over cladding 1009 is 1.5 μm, and the thickness of the under cladding 010 is 2 μm.

TM-polarized basic mode light 1012 inputted into the circuit from the input-output waveguide 1001 is converted into TE-polarized 1st order mode light as it propagates through the tapered waveguide 1003, or the polarization converter. Further, at the asymmetric directional coupler 1014, or the mode converter, the TE-polarized 1st order mode light propagating through the waveguide 1005 is coupled to a TE-polarized basic mode at the waveguide 1006, and TE-polarized basic mode light 1013 is outputted into the input-output waveguide 1008. The circuit shown in FIGS. 43A and 43B is bidirectional. Thus, in a case where the TE-polarized basic mode light 1013 is inputted in the reverse direction from the input-output waveguide 1008, it passes through paths that are the reverse of the paths mentioned above, and the TM-polarized basic mode light 1012 is outputted into the input-output waveguide 1001.

A polarization rotator needs to have an asymmetric waveguide in order to cause polarization conversion of an optical wave propagating therethrough. A structurally symmetric waveguide has no coupling between a TE mode and a TM mode and cannot therefore cause polarization conversion. In Conventional Technique Example 1, the silicon nitride $Si_3N_4$ structure formed on top acts to break symmetry. In Conventional Technique Example 2, the under cladding and the over cladding differ from each other in refractive index and thereby provide asymmetry.

CITATION LIST

Non Patent Literatures

NPL 1: L. Chen et al, "Compact polarization rotator on silicon for polarization-diversified circuits", OPTICS LETTERS, Vol. 36, pp. 469-471, (2011)

NPL 2: D. Dai et al, "Novel concept for ultracompact polarization splitter-rotator based on silicon nanowires", OPTICS EXPRESS, Vol. 19, pp. 10940-10949, (2011)

SUMMARY OF INVENTION

Technical Problems

However, polarization rotators including silicon waveguides as described above have the following problems. Specifically, the polarization converter in NPL 1 requires forming a silicon waveguide and then forming a silicon nitride layer on the silicon waveguide and processing the silicon nitride layer. Also, the polarization converter in NPL 2 requires forming a silicon waveguide and then forming a silicon nitride layer on the silicon waveguide since the entire over cladding is made of silicon nitride.

Moreover, the gap between the waveguides of the asymmetric directional coupler at the mode converter is 0.15 µm, which is small, whereas the entire circuit length reaches 71 µm and its size therefore is large.

As described, the conventional polarization rotators require forming a silicon nitride layer, which is not employed in usual fabrication of a silicon waveguide circuit. In order to employ such a polarization rotator in an optical integrated circuit, a process of forming a silicon nitride layer is added just for that purpose. This increases the fabrication time and complicates the fabrication equipment.

Furthermore, since the smallest fabrication dimension in part of the optical circuit is 0.15 µm, which is small, it is difficult to ensure fabrication tolerance. There has been a need for a structure that allows more relaxed fabrication tolerance.

The present invention has been made in view of these problems, and an object thereof is to provide an optical circuit capable of reducing the fabrication cost by being formed of silicon waveguides, and also relaxing requirements on fabrication accuracy in close arrangement of waveguides.

Solution to Problems

One aspect of the present invention provides a polarization rotator characterized in that the polarization rotator comprises: a polarization converter including a silicon rib waveguide and configured to convert TM-polarized basic mode light into TE-polarized 1st order mode light, the silicon rib waveguide including a center-portion core and a peripheral-portion core thinner than the center-portion core, and having such a tapered shape that a core width of the peripheral-portion core gradually increases; and a mode converter optically connected to the polarization converter and configured to convert the TE-polarized 1st order mode light into TE-polarized basic mode light.

The above polarization rotator is preferably such that the mode converter includes an asymmetric directional coupler including two waveguides differing in width, the two waveguides differing in width are silicon rib waveguides with no center-portion core, and of the two waveguides differing in width, the wider waveguide has one end optically connected to the polarization converter.

Further, the polarization converter and the mode converter can be smoothly connected by a tapered intermediate waveguide, and the tapered intermediate waveguide can be any one of a silicon rib waveguide with no center-portion core, a silicon rib waveguide, and a silicon rib waveguide with no center-portion core and a silicon rib waveguide joined to each other.

The above one aspect of the present invention can be preferably such that the mode converter includes an optical splitter optically connected to the polarization converter, a delay circuit including two waveguides, and an optical coupler.

More preferably, the optical splitter includes a silicon rib waveguide with no center-portion core, and a silicon rib waveguide including two thick core portions, and the silicon rib waveguide with no center-portion core has one end connected to the polarization converter.

Also, the above polarization rotator can be such that the mode converter includes an asymmetric directional coupler including two waveguides differing in width, the two waveguides differing in width are silicon channel waveguides, of the two waveguides differing in width, the wider waveguide has one end optically connected to the polarization converter by an intermediate waveguide, the intermediate waveguide includes a silicon rib waveguide including two portions with relatively thick cores and a peripheral portion with a relatively thin core, and each of the portions with the relatively thick cores has a tapered structure.

The above polarization rotator is preferably such that a tapered waveguide is connected to at least one of one end of the wider waveguide of the asymmetric directional coupler and one end of the narrower waveguide of the asymmetric directional coupler, and a width of the tapered waveguide decreases gradually and a tip thereof is cut off.

Another aspect of the present invention provides a polarization rotator characterized in that the polarization rotator comprises: an input-output waveguide into which to input TM-polarized basic mode light; a polarization converter including a silicon rib waveguide and configured to convert the TM-polarized basic mode light into TE-polarized 1st order mode light, the silicon rib waveguide including a center-portion core and a peripheral-portion core thinner than the center-portion core, and having such a tapered shape that a core width of the peripheral-portion core gradually increases; a core-width conversion waveguide situated between the input-output waveguide and the polarization converter and continuously varying a core width between a waveguide at the input-output waveguide and the center-portion core of the polarization converter; and a mode converter optically connected to the polarization converter and configured to convert the TE-polarized 1st order mode light into TE-polarized basic mode light.

Also, a polarization rotator according to a still another aspect comprises: a polarization converter including a silicon rib waveguide and configured to convert TM-polarized basic mode light into TE-polarized 1st order mode light, the silicon rib waveguide including a center-portion core and a peripheral-portion core thinner than the center-portion core, and having such a tapered shape that a core width of the peripheral-portion core gradually increases; and a mode converter optically connected to the polarization converter and configured to convert the TE-polarized 1st order mode light into TE-polarized basic mode light, and the mode converter can include a delay circuit including two waveguides optically connected to the polarization converter, and any one of an optical coupler and an optical combiner.

The polarization rotator according to the above still other aspect is preferably such that the mode converter includes a delay circuit configured to cause a delay of ½ of a wavelength and a 2×1 coupler, or a delay circuit configured to cause a delay of ¼ of a wavelength and a 2×2 combiner.

More preferably, the delay circuit of the mode converter that is configured to cause a delay of ¼ of a wavelength is two silicon rib waveguides each including a relatively thick center-portion core and a relatively thin peripheral-portion core, one of the two silicon rib waveguides has a structure including such tapers that a width of the center-portion core gradually increases and then gradually decreases toward an output side, and the 2×2 combiner of the mode converter is a directional coupler.

Also, the polarization rotator according to the above still other aspect can be such that the polarization converter and the mode converter are optically connected by a tapered intermediate waveguide, the tapered intermediate waveguide is a rib waveguide including a center-portion core and a peripheral-portion core thinner than the center-portion core, and has such a tapered shape that a width thereof gradually decreases toward an output side, a portion connecting the tapered intermediate waveguide and the mode converter includes two cores, and each of the two cores has such a tapered shape that a width of the core gradually increases.

The polarization rotator according to the above still other aspect can be such that the center-portion core of the polarization converter has such a tapered shape that a width of the center-portion core gradually decreases toward an output side, and the peripheral-portion core of the polarization converter has such a tapered shape that the width of the peripheral-portion core gradually increases toward the output side.

Also, the tapered shape of the peripheral-portion core of the polarization converter can be designed such that the width of the peripheral-portion core increases in a curved manner.

Further, each of the above polarization rotators can operate also as a polarization rotator-splitter.

Advantageous Effects of Invention

As described above, with the present invention, it is possible to provide a polarization rotator that includes only silicon waveguides and needs no additional process for a silicon nitride layer or the like. Further, with the present invention, it is possible to relax requirements on fabrication accuracy in close arrangement of waveguides.

DESCRIPTION OF EMBODIMENTS

In one instance of a polarization rotator of the present invention, a waveguide at a polarization converter is formed in a rib structure, which has an inverted T-shape in cross section, thereby creating asymmetry in the waveguide structure. Further, the waveguide width of the center core portion of the rib structure is set to be extremely small. In this way, the configuration is such that the intensity of an optical wave does not concentrate only at the center core portion and is more influenced by the structural asymmetry. With this configuration, it is possible to efficiently cause polarization conversion with a structure including only a silicon waveguide and no silicon nitride layer or the like formed thereon.

Specifically, the polarization rotator of the present invention includes: a polarization converter including a silicon rib waveguide and configured to convert TM-polarized basic mode light into TE-polarized 1st order mode light, the silicon rib waveguide including a center-portion core and a peripheral-portion core thinner than the center-portion core, and having such a tapered shape that the core width of the peripheral-portion core gradually increases; and a mode converter optically connected to the polarization converter and configured to convert the TE-polarized 1st order mode light into TE-polarized basic mode light. Various embodiments of the polarization rotator of the present invention will be described below in detail.

First Embodiment

A polarization rotator according to a first embodiment of the present invention will be described. This embodiment shows a basic configuration of the polarization rotator of the present invention, and is a configuration example including input-output waveguides which are channel waveguides.

Figure 1:
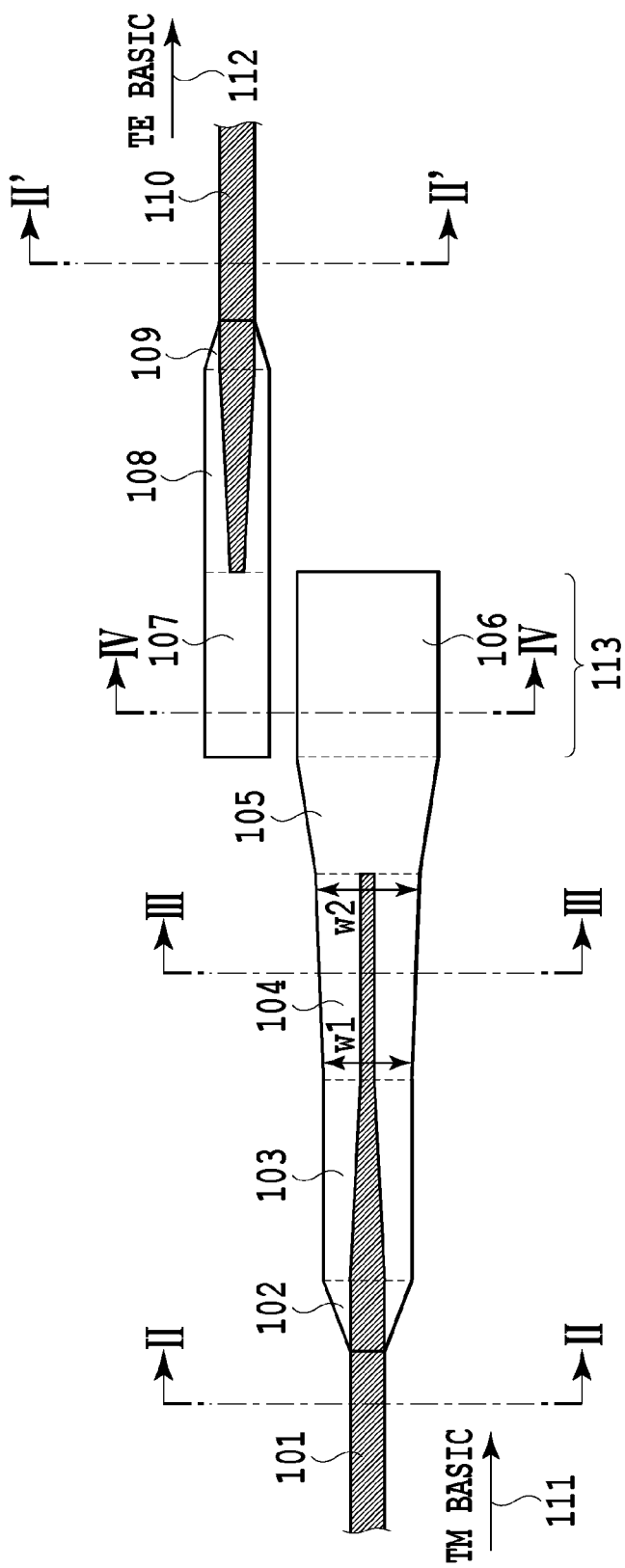
FIG. 1 is a view showing a configuration in a first embodiment of a polarization rotator of the present invention.

FIG. 1 is a view showing a configuration in the first embodiment of the polarization rotator of the present invention, and is a view of a device's surface where the circuit is formed. In figures explaining the present invention below, waveguides and the boundaries of their regions are individually illustrated with clear dotted lines (partitions perpendicular to the direction of travel of light). It is, however, to be noted that the partitions are illustrated based on the functions of these parts for convenience and the constituent material has no discontinuity or actual boundary. A polarization converter 104 and a mode converter 113 perform main operation in polarization rotation. TM-polarized basic mode light 111 inputted from an input-output waveguide 101 at the left end of the figure is converted by the polarization converter of the present invention into TE-polarized 1st order mode light 112 and then outputted from an input-output waveguide 110 at the right end. The polarization converter is formed of a silicon rib waveguide 104 including a center portion with a relatively thick core and peripheral portions with relatively thin cores, and is such a tapered waveguide 104 that the core width of the peripheral portions increases from w1 to w2.

The mode converter 113 is formed of silicon rib waveguides 106, 107 with no center portion, and is an asymmetric directional coupler including two waveguides differing in width. The mode converter 113 is configured to convert the TE-polarized 1st order mode light inputted from the left in FIG. 1 into one of the silicon rib waveguides, namely, the silicon rib waveguide 106, into TE-polarized basic mode light and output it from the right of the other silicon rib waveguide 107. Thus, the mode converter includes an asymmetric directional coupler including two waveguides differing in width, and the two waveguides differing in width are silicon rib waveguides with no center portion. Of the two waveguides differing in width, the wider waveguide has one end optically connected to the polarization converter.

An intermediate waveguide 105 is provided between the polarization converter 104 and the silicon rib waveguide 106. The intermediate waveguide 105 is formed of a silicon rib waveguide with no center portion, and is a tapered waveguide smoothly connecting the polarization converter 104 and the silicon rib waveguide 106 to each other. The input-output waveguides 101, 110 are provided at the opposite ends of the whole polarization rotator and are each formed of a channel waveguide including a rectangular core. A rib-channel conversion waveguide 102, 103 and a rib-channel conversion waveguide 108, 109 are provided between the input-output waveguide 101 and the polarization converter 104 and between the input-output waveguide 110 and the silicon rib waveguide 107, respectively.

Each of these rib-channel conversion waveguides is formed of a section 102, 109 converting the waveguide structure from a channel structure into a rib structure, and a section 103, 108 varying the core width of the center portion of the rib waveguide. These rib-channel conversion waveguides do not directly contribute to the polarization rotation function but eliminate structural discontinuity between the waveguides between which the rib-channel conversion waveguides are connected, and are thus effective in preventing excessive optical loss. For this reason, it is preferable to place the rib-channel conversion waveguides. In particular, the section 103, 108, which changes the core width of the center portion of the rib waveguide, reduces the discontinuity of the center-core portion where the intensity of the propagating optical wave concentrates, and is therefore highly effective in preventing excessive optical loss.

The length of the polarization converter 104 is 100 µm, the core width of its center portion is 0.15 µm, and the core width of its peripheral portions is w1=0.9 µm to w2=1.8 µm.

The widths of the waveguide 106 and the waveguide 107, forming the asymmetric directional coupler 113, or the mode converter, are 2.0 µm and 0.8 µm, respectively. The length of each of the two waveguides is 50 µm, and the gap between the two waveguides is 0.4 µm.

The length of the intermediate waveguide 105 is 15 µm. The width of each input-output waveguide 101, 110 is 0.5 µm. As for the rib-channel conversion waveguide 102, 103, the length of the waveguide 102 is 50 µm, the core width of its center portion is 0.5 µm, and the core width of its peripheral portions varies from 0.5 µm to 0.9 µm, while the length of the waveguide 103 is 200 µm, the core width of its center portion varies from 0.5 µm to 0.15 µm, and the core width of its peripheral portions is 0.9 µm. Also, as for the rib-channel conversion waveguide 108, 109, the length of the waveguide 108 is 200 µm, the core width of its center portion varies from 0.15 µm to 0.5 µm, and the core width of its peripheral portions is 0.8 µm, while the length of the waveguide 109 is 50 µm, the core width of its center portion is 0.8 µm, and the core width of its peripheral portions varies from 0.8 µm to 0.5 µm.

Figure 2:
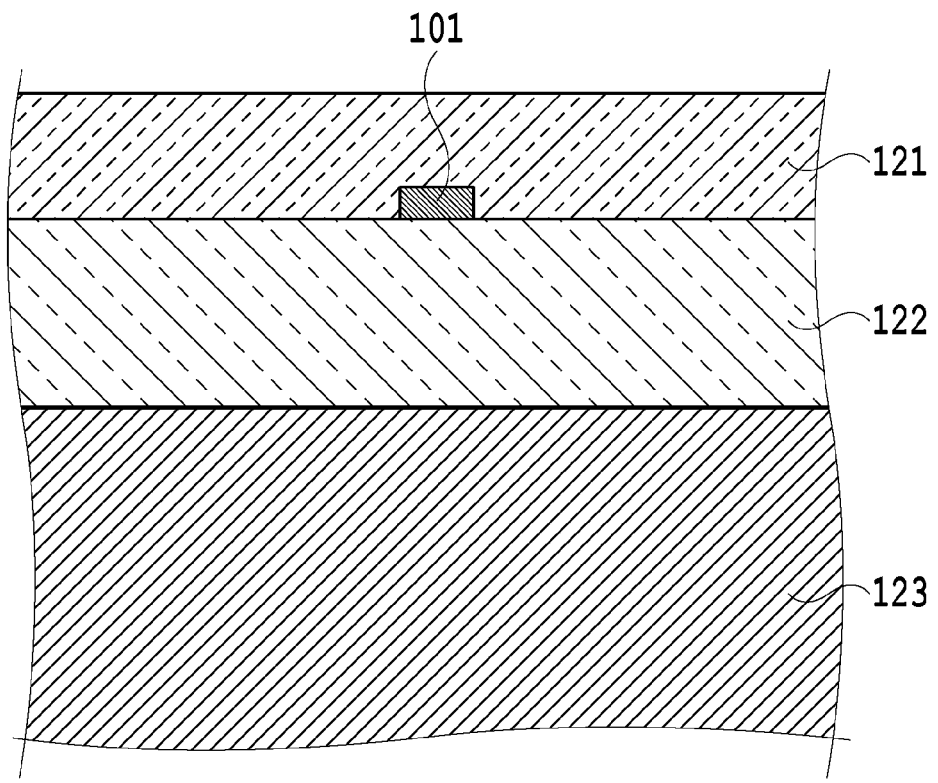
FIG. 2 is a view showing a cross-sectional structure taken along line II-II on one of input-output waveguides in FIG. 1.

FIG. 2 is a view showing a cross-sectional structure taken along line II-II on one of the input-output waveguides in the top view in FIG. 1. An under cladding 122 made of silica glass is provided on a silicon substrate 123. A core 101 of the channel waveguide made of silicon is created on the under cladding 122. Further, an over cladding 121 made of silica glass is provided in such a way as to cover the core 101. The core thickness of the waveguide 101 is 0.22 µm, the thickness of the over cladding 121 is 1.5 µm, and the thickness of the under cladding 122 is 2 µm. Though not shown, the cross-sectional circuit structure taken along line II'-II' on the input-output waveguide 110 in the top view in FIG. 1 is exactly the same as the cross-sectional structure taken along line II-II shown in FIG. 2.

Figure 3:
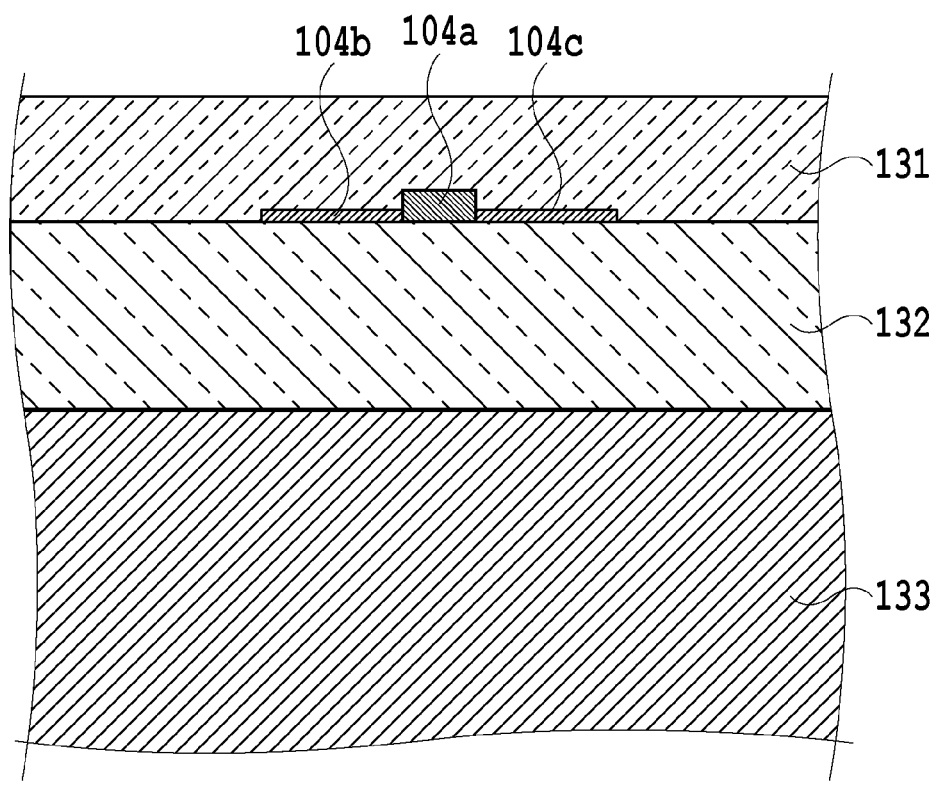
FIG. 3 is a view showing a cross-sectional structure taken along line III-III on a polarization converter in FIG. 1.

FIG. 3 is a view showing a cross-sectional structure taken along line III-III on the polarization converter in the top view in FIG. 1. An under cladding 132 made of silica glass is provided on a silicon substrate 133. A center-portion core 104a and peripheral-portion cores 104b, 104c of the rib waveguide made of silicon are created on the under cladding 122. Further, an over cladding 131 made of silica glass is provided in such a way as to cover each core. The core thickness of the center portion 104a is 0.22 µm, the core thickness of the peripheral portions 104b, 104c is 0.06 µm, the thickness of the over cladding 131 is 1.5 µm, and the thickness of the under cladding 132 is 2 µm.

Figure 4:
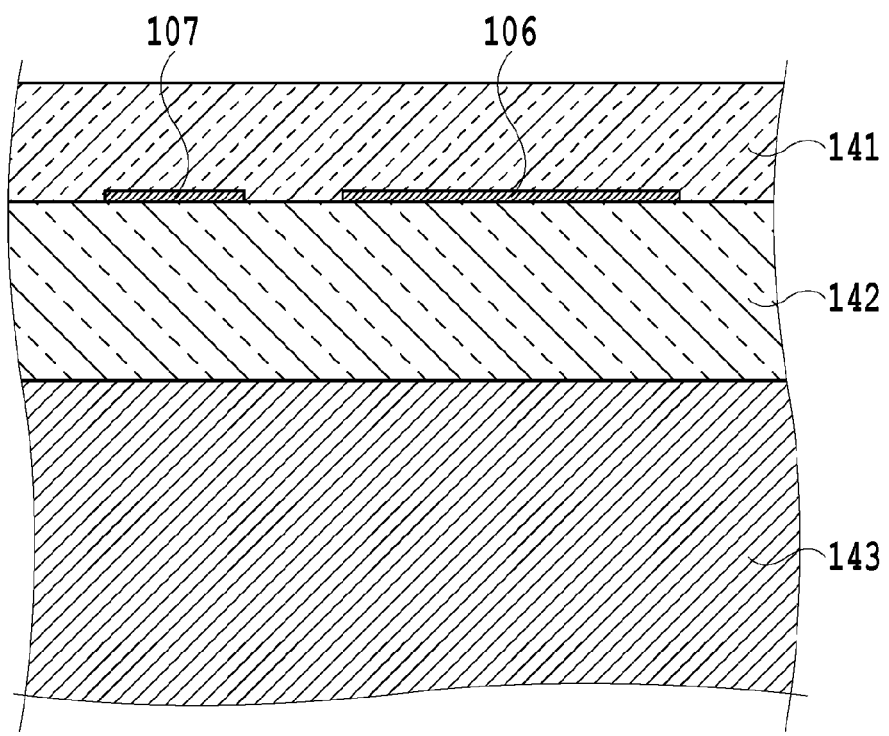
FIG. 4 is a view showing a cross-sectional structure taken along line IV-IV on a mode converter in FIG. 1.

FIG. 4 is a view showing a cross-sectional structure taken along line IV-IV on the mode converter in the top view in FIG. 1. An under cladding 142 made of silica glass is provided on a silicon substrate 143. Cores 106, 107 of the rib waveguides with no center portion made of silicon are created on the under cladding 142. Further, an over cladding 141 made of silica glass is provided in such a way as to cover both cores. The core thickness of the waveguides 106, 107 is 0.06 µm, the thickness of the over cladding 141 is 1.5 µm, and the thickness of the under cladding 142 is 2 µm.

As mentioned earlier, in order to cause polarization conversion of an optical wave propagating through the polarization rotator, waveguides need to have asymmetry. In the polarization converter 104 of the present invention, its waveguide is formed in a rib structure, which has an inverted T-shape in cross section, thereby basically creating asymmetry. Here, the structure of a usual rib waveguide is such that the width of its center-core portion is about 0.5 µm and the intensity of an optical wave concentrates at this center-core portion. For this reason, only providing thin peripheral cores hardly provides asymmetry, and may achieve polarization conversion to some extent but the efficiency of the polarization conversion is low.

In the polarization rotator of the present invention, the waveguide width of the center-core portion is reduced to about 0.15 µm. In this way, the intensity of an optical wave does not concentrate solely on the center-core portion and is more influenced by the structural asymmetry. With this configuration, a structure including only a silicon waveguide can efficiently cause polarization conversion with no silicon nitride layer or the like formed thereon.

In this embodiment, the polarization converter 104 and the rib-channel conversion waveguide 102, 103 are provided as individual circuits that bear their own functions. The two functions—polarization conversion and waveguide structure conversion—can also be implemented at the same time by such a tapered structure that the width of the center-core portion and the width of the peripheral-portion cores vary at the same time. However, implementing the two functions with one tapered structure imposes a design requirement that limits the amount of variation in width of the center-core portion and the amount of variation in width of the peripheral-portion cores for efficiently causing polarization conversion. There is a possibility that the conversion efficiency might be lowered by an error in core width of about ±0.05 µm caused by a device fabrication error. In contrast, the polarization converter 104 with the structure of the present invention can obtain the same characteristics even if the width of the center-core portion or the peripheral-portion cores changes by about ±0.05 µm. For this reason, the polarization converter 104 and the rib-channel conversion waveguide 102, 103 are preferably provided independently of each other so as to be a structure that has higher tolerance (larger tolerable errors) during device fabrication.

Thus, the present invention can be implemented as a polarization rotator characterized in that the polarization rotator includes: an input-output waveguide into which to input TM-polarized basic mode light; a polarization converter including a silicon rib waveguide and configured to convert the TM-polarized basic mode light into TE-polarized 1st order mode light, the silicon rib waveguide including a center-portion core and a peripheral-portion core thinner than the center-portion core, and having such a tapered shape that the core width of the peripheral-portion core gradually increases; a core-width conversion waveguide situated between the input-output waveguide and the polarization converter and continuously varying the core width between a waveguide at the input-output waveguide and the center-portion core of the polarization converter; and a mode converter optically connected to the polarization converter and configured to convert the TE-polarized 1st order mode light into TE-polarized basic mode light.

Figure 5:
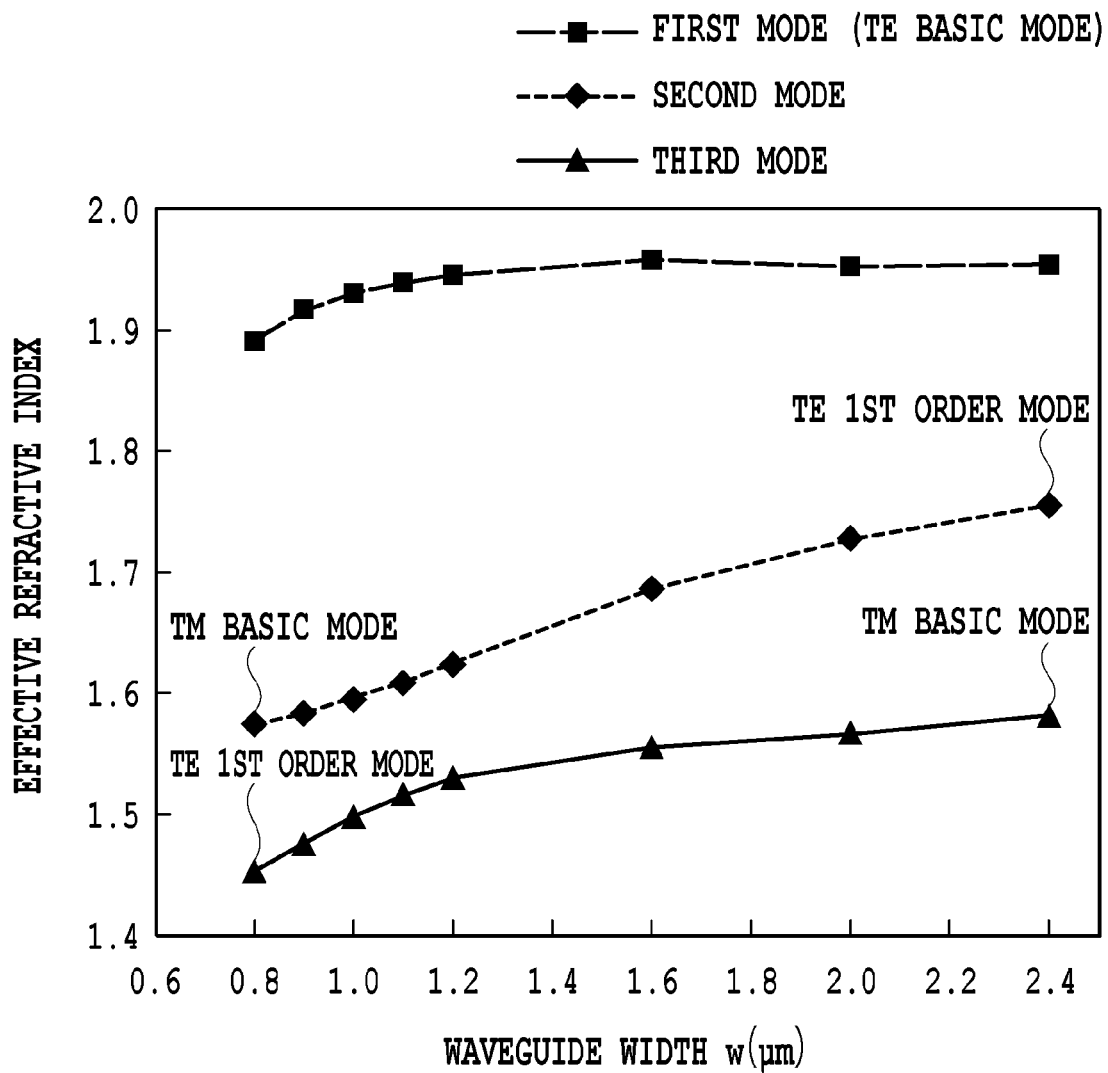
FIG. 5 is a diagram explaining the function of the polarization converter in the first embodiment of the present invention.

FIG. 5 is a diagram explaining the operation of the polarization converter in the first embodiment of the present invention. FIG. 5 is the result of calculation of an effective refractive index (vertical axis) versus a core width w of the peripheral portions of a rib waveguide. The material of each part of the polarization converter and the cross-sectional structure of the waveguide used for the calculation are similar to those of the cross section taken along line in FIG. 3, and only the core width w of the peripheral portions is varied to calculate the effective refractive index for three modes. In the cross-sectional view in FIG. 3, the core width w of the peripheral portions is the length from the left end of the peripheral-portion core 104b to the right end of the peripheral-portion core 104c.

Here, a first mode plotted with squares maintains a TE-polarized basic mode regardless of the core width w of the peripheral portions. On the other hand, a second mode plotted with diamonds and a third mode plotted with triangles are hybrid modes in which a TE-polarized component and a TM-polarized component are mixed in accordance with the change in core width w of the peripheral portions. When the core width w of the peripheral portions is around 0.8 μm, the second mode is substantially a TM-polarized basic mode and the third mode is substantially a TE-polarized 1st order mode. On the other hand, when the core width w of the peripheral portions is around 2.4 μm, the second mode switches from the TM-polarized basic mode to substantially a TE-polarized 1st order mode, and the third mode switches from the TE-polarized 1st order mode to substantially a TM-polarized basic mode.

Figure 6:
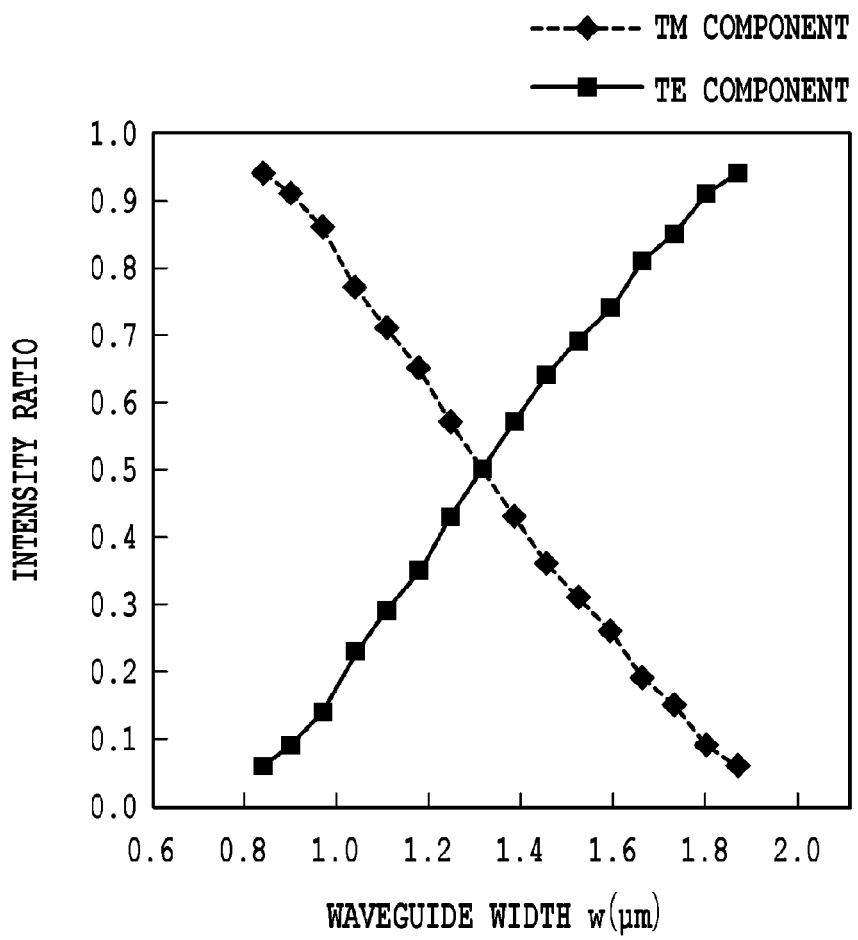
FIG. 6 is a diagram showing the intensity ratio between a TE-polarized component and a TM-polarized component at the polarization converter of the present invention shown in FIG. 5.

FIG. 6 is a diagram showing the intensity ratio between the TE-polarized component and the TM-polarized component at the polarization converter of the present invention shown in FIG. 5. FIG. 6 shows the intensity ratio between the TE-polarized component and the TM-polarized component (vertical axis) versus the core width w of the peripheral portions of the rib waveguide (horizontal axis) based on the result of the calculation of the second mode in the operation example shown in FIG. 5. FIG. 6 indicates that, as the width w of the peripheral-portion cores 104b, 104c increases, the intensity ratio of the TM-polarized component decreases but the intensity ratio of the TE-polarized component increases, and the two components switch from each other. The polarization converter 104, shown in FIG. 1, is designed such that the core width w1 on the narrower side and the core width w2 on the wider side cover as much as possible a range shown in FIG. 6 within which the two polarized components in the second mode switch from each other. Specifically, in this embodiment, w1=0.9 μm and w2=1.8 μm. In a case where the TM-polarized basic mode light 111 is inputted into the polarization converter 104 from the left side in FIG. 1, the optical wave propagating through the polarization converter 104 is converted into a TE-polarized 1st order mode by the gradual increase in core width from w1 to w2, and is outputted from the right side of the polarization converter 104.

In the asymmetric directional coupler 113, or the mode converter, the core width of each of the waveguide 106 and the waveguide 107 is designed such that the effective refractive index of the TE-polarized 1st order mode at the one waveguide 106 and the effective refractive index of the TE-polarized basic mode at the other waveguide 107 are substantially equal. In this way, the TE-polarized 1st order mode light inputted into the one waveguide 106 is coupled to the TE-polarized basic mode at the other waveguide 107, and TE-polarized basic mode light is outputted from the waveguide 107.

In the polarization rotator in this embodiment, the TM-polarized basic mode light 111 inputted into the circuit from the input-output waveguide 101 is inputted into the polarization converter 104 through the rib-channel conversion waveguide 102, 103 to be converted into TE-polarized 1st order mode light. The TE-polarized 1st order mode light from the polarization converter 104 is inputted into the one waveguide 106 of the asymmetric directional coupler, or the mode converter, through the intermediate waveguide 105. At the waveguide 106, the TE-polarized 1st order mode light is converted into TE-polarized basic mode light and outputted from the other waveguide 107. The TE-polarized basic mode light then passes through the rib-channel conversion waveguide 108, 109 and is outputted from the input-output waveguide 110 as TE-polarized basic mode light 112. The polarization rotator in this embodiment is bidirectional. Thus, in a case where the TE-polarized basic mode light 112 is inputted in the reverse direction from the input-output waveguide 110, it passes through paths that are the reverse of the series of paths mentioned above, and the TM-polarized basic mode light 111 is outputted into the input-output waveguide 101.

As described above, the polarization rotator in this embodiment implements a function similar to the polarization rotators of the conventional techniques. However, unlike the conventional techniques, the polarization rotator of the present invention does not need to include a silicon nitride layer or a silicon nitride component. The polarization rotator of the present invention includes only silicon waveguides and therefore has a great advantage that it does not need an additional process for silicon nitride layer or the like. Configurations with various modifications are applicable to the polarization rotator in this embodiment. For example, as will be discussed next, it is possible to add a configuration that reduces noise light and improves the return loss characteristic.

In the polarization rotator shown in FIG. 1, the right side of the one waveguide 106 of the asymmetric directional coupler 113 and the left of the other waveguide 107 of the asymmetric directional coupler 113 are provided with no waveguide structure and terminated. Based on the design, when light is inputted from the input-output waveguide 101, the propagating light is supposed to be all coupled from the one waveguide 106 to the other waveguide 107 and never reach the right end of the waveguide 106. Also, when light is inputted in the reverse direction from the input-output waveguide 110, the propagating light is also supposed to be all coupled from the one waveguide 107 to the other waveguide 106 and never reach the left end of the waveguide 107. However, in the actual circuit fabrication, the waveguide size and the like differ to some extent from those in the design. For this reason, there is a possibility that part of the propagating light might reach the right end of the waveguide 106 or the left end of the waveguide 107 as unwanted noise light.

In such a case, the noise light is reflected on the right end of the waveguide 106 or the left end of the waveguide 107 and returns to the input-output waveguide 101 or the input-output waveguide 110, from which the light has been inputted. This results in a possibility that the return loss characteristic of the polarization rotator might be deteriorated.

To avoid the above problem of deterioration in return loss characteristic, it is preferable to further add a waveguide structure and an optical termination or radiation structure at at least one of the right end of the waveguide 106 and the left end of the waveguide 107.

Figure 7:
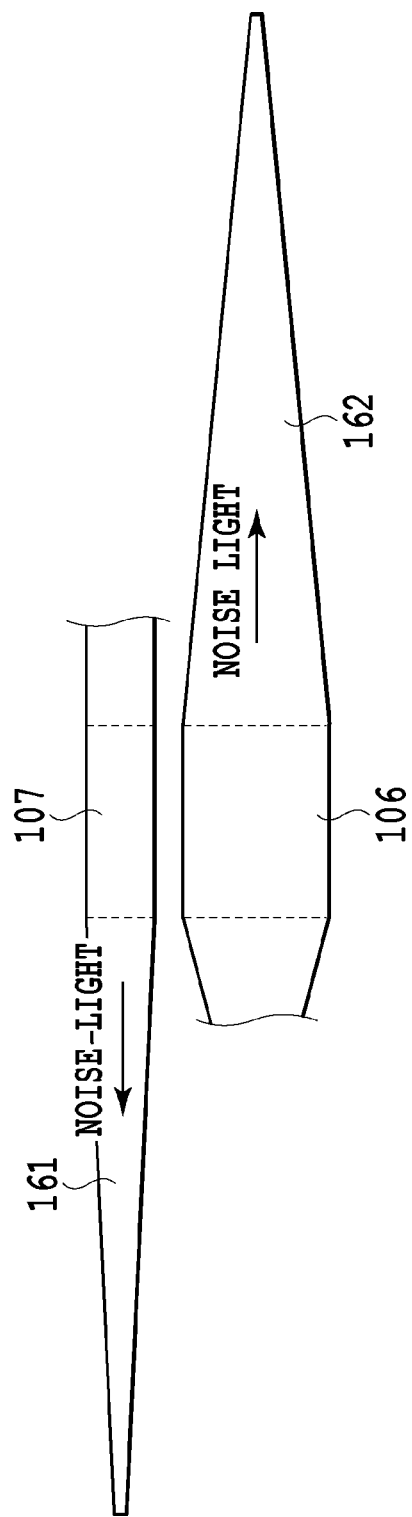
FIG. 7 is a view showing an example of optical radiation structures applicable to the polarization rotator of the present invention.

FIG. 7 is a view showing an example of optical radiation structures applicable to the polarization rotator of the present invention. FIG. 7 only illustrates structures added to the two waveguides 106, 107 of the asymmetric directional coupler 113, shown in FIG. 1. Tapered waveguides 161, 162 formed of silicon rib waveguides with no center portion are newly added at the ends of the two waveguides 106, 107. Here, the length of each tapered waveguide 161, 162 is 200 µm, and the core width of its tip is 0.15 µm. Thus, the shape of the tip of each tapered waveguide is such that part of the waveguide is cutoff. Noise light transferred from the waveguides 106, 107 is inputted into and propagates through the respective tapered waveguides 162, 161. However, as the tapered waveguides 161, 162 extend toward their tips, the tapered waveguides 161, 162 weaken their optical confinement and thereby gradually radiate and attenuate the light. Hence, the noise light will not be reflected and return to the input-output waveguides 101, 110.

Thus, in the above optical radiation structure, a tapered waveguide is connected to at least one of one end of the wider waveguide of the asymmetric directional coupler and one end of the narrower waveguide of the asymmetric directional coupler, and the tapered waveguide gradually narrows with its tip cut off.

The polarization rotator in this embodiment assumes that the TM-polarized basic mode light 111 is inputted from the input-output waveguide 101. In a case where TE-polarized basic mode light is inputted from the input-output waveguide 101, the TE-polarized basic mode light propagates through the polarization converter 104 while remaining as TE-polarized basic mode light. Further, at the mode converter 113, the propagating light propagates through the waveguide 106 while remaining as TE-polarized basic mode light, and is hardly coupled to the waveguide 107. Then, the polarization rotator of the present invention can also function as a polarization splitter with an input-output waveguide newly added to FIG. 1 on a line extending from the waveguide 106 of the mode converter 113.

Figure 8:
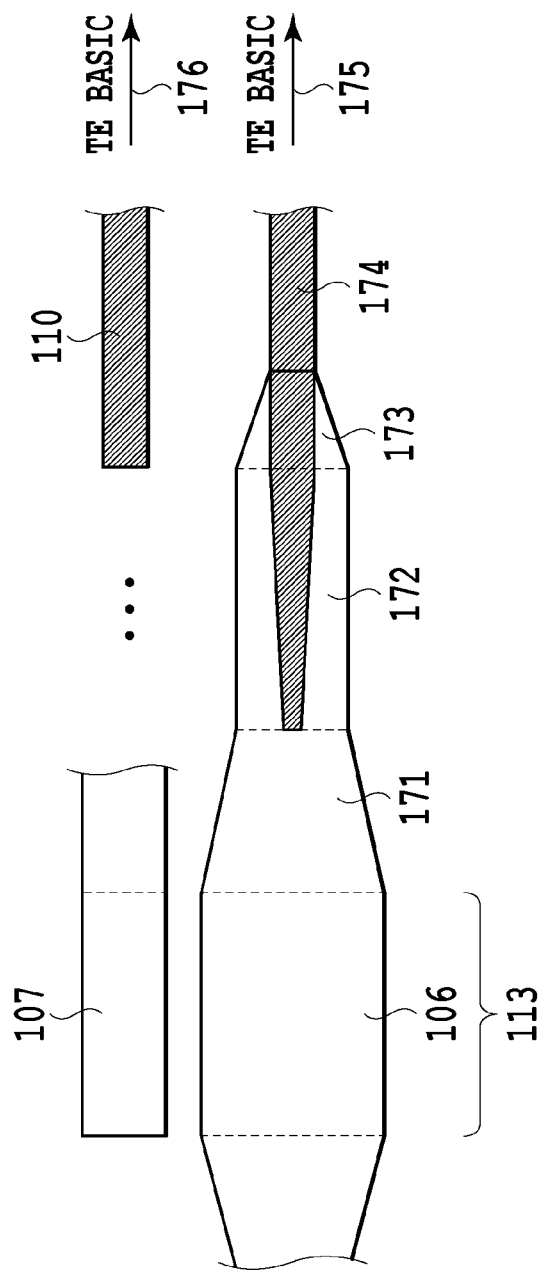
FIG. 8 is a view showing a waveguide structure capable of adding a polarization splitting function to the polarization rotator of the present invention.

FIG. 8 is a view showing a waveguide structure capable of adding a polarization splitting function to the polarization rotator of the present invention. FIG. 8 shows an additional waveguide structure, along with part of FIG. 1, connected to the right side of the waveguide 106 of the asymmetric directional coupler 113, or the mode converter shown in FIG. 1, to add the polarization splitting function. An intermediate waveguide 171 formed of a rib waveguide with no center portion, a rib-channel conversion waveguide 172, 173, and an input-output waveguide 174 are connected in this order on a lined extending from the waveguide 106 of the asymmetric directional coupler 113. The rib-channel conversion waveguide includes a section 172 varying the core width of the center portion of the rib waveguide, and a section 173 converting the waveguide structure into a channel structure. Also, the input-output waveguide 174 is formed of a channel waveguide including a rectangular core.

More specifically, the intermediate waveguide 171 is a tapered waveguide having a length of 15 µm and core widths varying from 2.0 µm to 1.2 µm. The length of the waveguide 172 of the rib-channel conversion waveguide is 200 µm, the core width of its center portion varies from 0.15 µm to 0.5 µm, and the core width of its peripheral portions is fixed at 1.2 µm. The length of the rib-channel conversion waveguide 173 is 50 µm, the core width of its center portion is fixed at 0.5 µm, and the core width of its peripheral portions varies from 1.0 µm to 0.5 µm. The core width of the input-output waveguide 174 is 0.5 µm.

In the polarization rotator in this embodiment with the waveguide structure shown in FIG. 8 added thereto, TM-polarized basic mode light inputted from the input-output waveguide 101 in FIG. 1 passes through the polarization converter and the mode converter to be converted into TE-polarized basic mode light 176 and is outputted from the input-output waveguide 110 (polarization conversion function). At the same time, TE-polarized basic mode light inputted from the input-output waveguide 101 passes through the polarization converter and the mode converter but is not converted, and is outputted as TE-polarized basic mode light 175 from the input-output waveguide 174 (polarization splitting function). In other words, the function of a polarization rotator and the function of a polarization splitter can be implemented at the same time.

The circuit in this embodiment is bidirectional. Thus, the TE-polarized basic mode light 176 inputted in the reverse direction from the input-output waveguide 110 is converted into a TM-polarized basic mode and outputted into the input-output waveguide 101. Also, the TE-polarized basic mode light 175 inputted in the reverse direction from the input-output waveguide 174 is outputted into the input-output waveguide 101 as is. In other words, the function of a polarization rotator and the function of a polarization combiner can be implemented at the same time.

As described above in detail, with the polarization converter of the present invention, it is possible to form a polarization converter from only a silicon waveguide without having to include a silicon nitride layer or a silicon nitride component as in the conventional techniques. Since there is no need for an additional process for a silicon nitride layer or the like, the problem of increase in fabrication time and the problem of complication of the fabrication equipment do not occur.

Second Embodiment

A polarization rotator according to a second embodiment of the present invention will be described. The structure of the polarization rotator in this embodiment is substantially the same as the first embodiment but differs therefrom in that rib waveguides are employed as the input-output waveguides. The polarization rotator of the present invention can handle not only case where the input-output waveguides are channel waveguides but also cases where various input-output waveguides.

Figure 9:
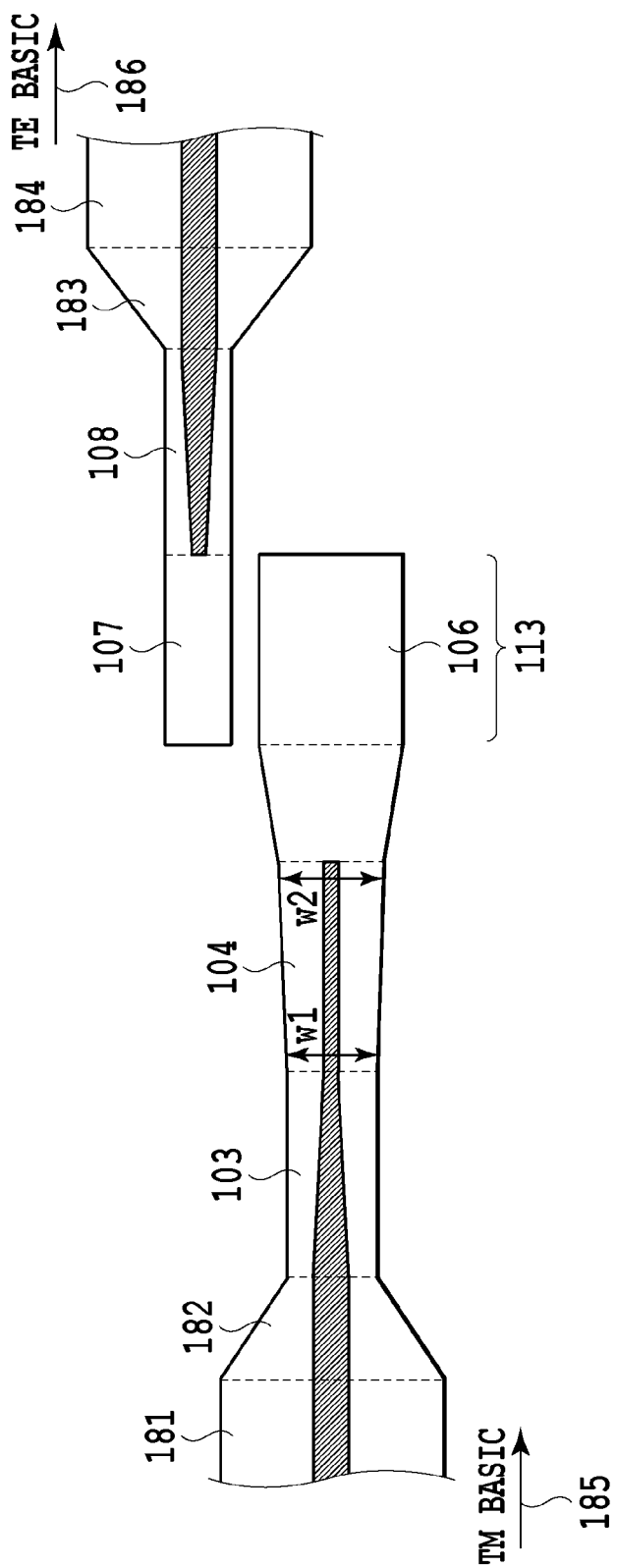
FIG. 9 is a view showing the configuration of a polarization rotator in a second embodiment of the present invention.

FIG. 9 is a view showing the configuration of the polarization rotator in the second embodiment of the present invention. The configuration of the polarization rotator in this embodiment is exactly the same as the configuration shown in FIG. 1 from the rib-channel conversion waveguide 103, which varies the core width, to the rib-channel conversion waveguide 108, which varies the core width, and description thereof will be omitted. In the polarization rotator in this embodiment, input-output waveguides 181, 184 are formed of rib waveguides. For this reason, an intermediate waveguide 182 formed of a rib waveguide is provided between the input-output waveguide 181 and the rib-channel conversion waveguide 103. Similarly, an intermediate waveguide 183 formed of a rib waveguide is provided between the input-output waveguide 184 and the rib-channel conversion waveguide 108.

The core width of the center of each input-output waveguide 181, 184 is 0.5 μm, and the core width of its peripheral portions is 2.5 μm. The length of the intermediate waveguide 182 is 50 μm, the core width of its center is 0.5 μm, and the core width of its peripheral portions varies from 2.5 μm to 0.9 μm. The length of the other intermediate waveguide 183 is 50 μm, the core width of its center is 0.5 μm, and the core width of its peripheral portions varies from 0.8 μm to 2.5 μm. The core thickness of the center portion of each of the waveguides 181 to 182 and the waveguides 183 to 184 is 0.22 μm, and the core thickness of its peripheral portions is 0.06 μm.

In the polarization rotator in this embodiment, TM-polarized basic mode light 185 inputted into the circuit from the input-output waveguide 181 is inputted into the polarization converter 104 through the intermediate waveguide 182 to be converted into TE-polarized 1st order mode light. The output from the polarization converter 104 is inputted into the waveguide 106 of the asymmetric directional coupler, or the mode converter 113, through the intermediate waveguide 105 to be converted into TE-polarized basic mode light, and is outputted from the waveguide 107. The converted light is outputted as TE-polarized basic mode light 186 from the input-output waveguide 184 through the intermediate waveguide 183. The polarization rotator in this embodiment is bidirectional. Thus, in a case where the TE-polarized basic mode light 186 is inputted in the reverse direction from the input-output waveguide 184, it passes through paths that are the reverse of the paths mentioned above, and the TM-polarized basic mode light 185 is outputted into the input-output waveguide 181.

As described above, the polarization rotator in this embodiment handles the case where the input-output waveguides are rib waveguides, and implements a function similar to the polarization rotators of the conventional techniques. The polarization converter of the present invention includes only a silicon waveguide and needs no additional process for a silicon nitride layer or the like. Moreover, the polarization converter in this embodiment can also employ the structure that prevents deterioration in return loss characteristic, described in the first embodiment with reference to FIG. 7, and the structure that implements the function of a polarization splitter or combiner at the same time, described in the first embodiment with reference to FIG. 8.

As for the mode converters 113 in the above first embodiment and second embodiment, design parameters of the asymmetric directional coupler, formed of rib waveguides, are described by taking specific values as an example. However, the polarization rotator of the present invention is not limited to these parameters. The widths of the two waveguides are determined by the thicknesses of the waveguide cores and the refractive index of the material of each of the over cladding and the under cladding. Thus, the design parameters of the asymmetric directional coupler only need to be set such that the effective refractive index of the TE-polarized basic mode at the narrower waveguide 107 and the effective refractive index of the TE-polarized 1st order mode at the wider waveguide 106 are close in value.

Third Embodiment

A configuration and operation in still another, third embodiment of the polarization rotator of the present invention will be described. The polarization converter in this embodiment greatly differs from the first embodiment shown in FIG. 1 in the configuration of the mode converter. The configurations of the input-output waveguides, which are channel waveguides, and the configurations of the part of the circuit configured to perform polarization conversion are similar to the first embodiment.

Figure 10:
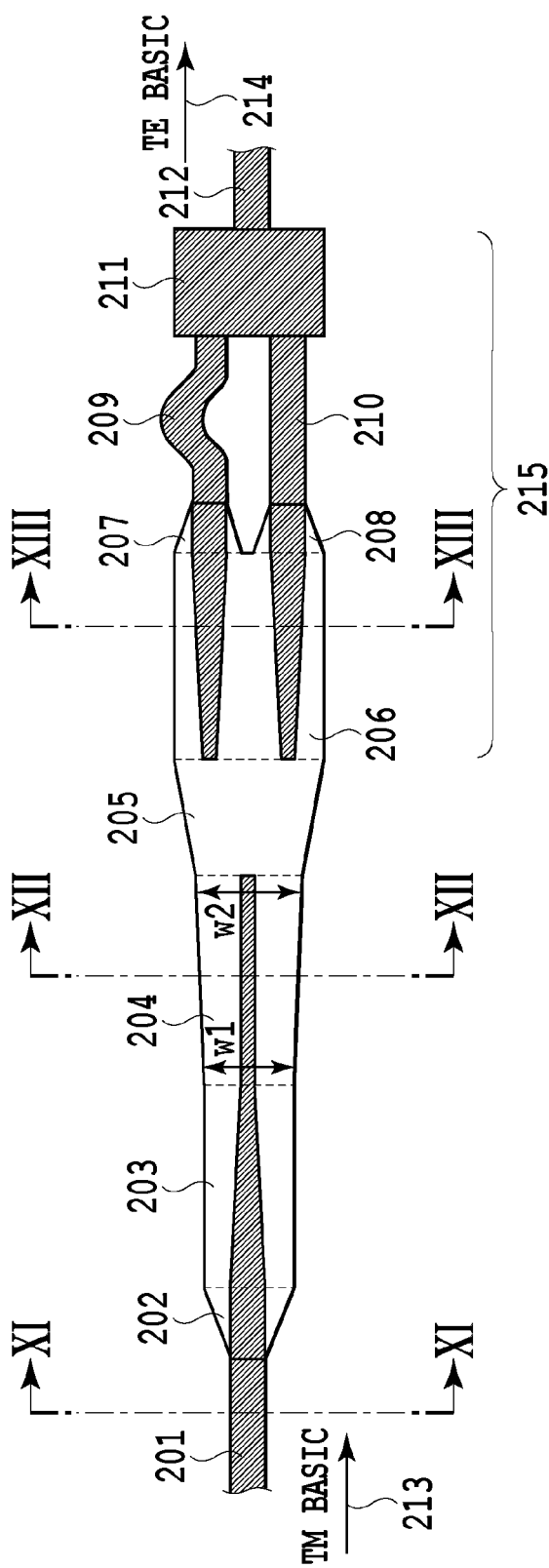
FIG. 10 is a view showing the configuration of a polarization rotator in a third embodiment of the present invention.

FIG. 10 is a view showing the configuration of the polarization rotator in the third embodiment of the present invention. It is a view of a device's surface where the circuit is formed. A polarization converter 204 and a mode converter 215 perform main operation in polarization rotation. TM-polarized basic mode light 213 inputted from an input-output waveguide 201 at the left end of the figure is converted by the polarization converter of the present invention into TE-polarized 1st order mode light 214 and then outputted from an input-output waveguide 212 at the right end. The polarization converter 204 is formed of a silicon rib waveguide including a center portion with a relatively thick core and peripheral portions with relatively thin cores, and is such a tapered waveguide that the core width of the peripheral portions gradually increases from w1 to w2. The configuration of the polarization converter 204 is similar to the first and second embodiments.

The mode converter 215 includes an optical splitter 206 and rib-channel conversion waveguides 207, 208 formed of silicon rib waveguides, rib-channel conversion waveguides 207, 208, a delay circuit 209, 210 formed of channel waveguides, and an optical coupler 211 formed of a channel waveguide. The mode converter 215 is configured to convert the TE-polarized 1st order mode light inputted into the optical splitter 206 from the left side in the figure into TE-polarized basic mode light and output it from the right side of the optical coupler 211. Thus, the mode converter includes an optical splitter optically connected to the polarization converter, a delay circuit including two waveguides, and an optical coupler.

The polarization converter 204 and the mode converter 215 are connected by an intermediate waveguide 205. In this embodiment, the intermediate waveguide 205 is formed of a silicon rib waveguide with no center portion, and is a tapered waveguide smoothing connecting the polarization converter 204 and the optical splitter 206. The input-output waveguides 201, 212 are provided at the opposite ends of the whole polarization rotator and are each formed of a channel waveguide including a rectangular core. A rib-channel conversion waveguide 202, 203 is provided between the input-output waveguide 201 and the polarization converter 204. The rib-channel conversion waveguide includes a section 202 converting the waveguide structure from a channel structure into a rib structure, and a section 203 varying the core width of the center portion of the rib waveguide. The length of the polarization converter 204 is 50 μm, the core width of its center portion is 0.15 μm, and the core width of its peripheral portions is w1=0.9 μm to w2=1.8 μm.

In the mode converter 215, the length of the optical splitter 206 is 200 μm. The optical splitter 206 includes two portions with relatively thick cores. Each of these portions is formed in such a tapered structure that the core width increases from 0.15 μm to 0.5 μm. The gap between the two tapered structures is 1.15 μm. Moreover, peripheral portions of the optical splitter 206 with relatively thin cores have a core width of 2.3 μm. The length of each rib-channel conversion waveguide 207, 208 is 50 μm, and the core width of its center portion is fixed at 0.5 μm. Further, the peripheral portions of each rib-channel conversion waveguide 207, 208 is formed in such a tapered structure that the core width varies from 1.0 μm to 0.5 μm.

In the mode converter 215, the delay circuit 209, 210 is designed such that the waveguide 209 is longer than the waveguide 210 by 0.314 μm. The optical coupler 211 here is implemented by a multi-mode interference circuit (MMI). The length and width of the MMI are 3.5 μm and 2.0 μm, respectively, and the gap between the portions of the waveguides 209, 210 connected to the MMI is 1.0 μm. Also, the input-output waveguide 212 is connected to the center of the MMI.

The length of the intermediate waveguide 205 is 15 μm. The width of each input-output waveguide 201, 212 is 0.5 μm. In the rib-channel conversion waveguide 202, 203, the length of the waveguide 202 is 50 μm, the core width of its center portion is 0.5 μm, and the core width of its peripheral portions varies from 0.5 μm to 0.9 μm, while the length of the waveguide 203 is 200 μm, the core width of its center portion varies from 0.5 μm to 0.15 μm, and the core width of its peripheral portions is 1.0 μm.

Figure 11:
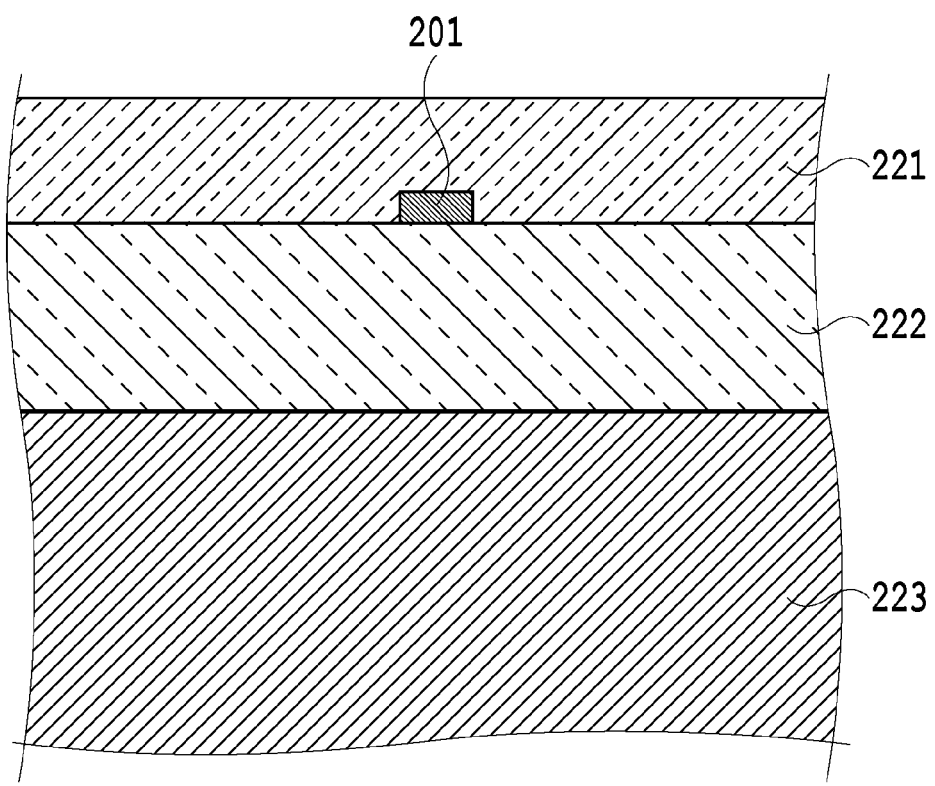
FIG. 11 is a view showing a cross-sectional structure taken along line XI-XI on an input-output waveguide for a polarization converter in FIG. 10.

FIG. 11 is a view showing a cross-sectional structure taken along line XI-XI on one of the input-output waveguides in the top view in FIG. 10. An under cladding 222 made of silica glass is provided on a silicon substrate 223. A core 201 of the channel waveguide made of silicon is created on the under cladding 222. Further, an over cladding 221 made of silica glass is provided in such a way as to cover the core 201. The core thickness of the waveguide 201 is 0.22 μm, the thickness of the over cladding 221 is 1.5 μm, and the thickness of the under cladding 222 is 2 μm.

Figure 12:
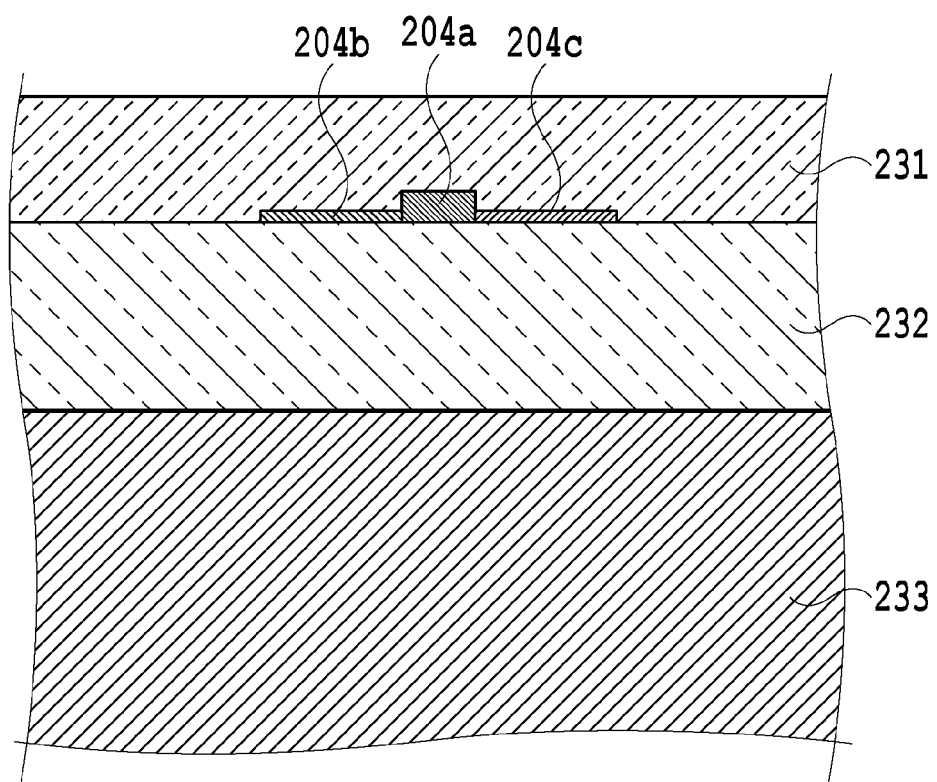
FIG. 12 is a view showing a cross-sectional structure taken along line XII-XII on the polarization converter in FIG. 10.

FIG. 12 is a view showing a cross-sectional structure taken along line XII-XII on the polarization converter in the top view in FIG. 10. An under cladding 232 made of silica glass is provided on a silicon substrate 233. A center-portion core 204a and peripheral-portion cores 204b, 204c of the rib waveguide made of silicon are created on the under cladding 232. Further, an over cladding 231 made of silica glass is provided in such a way as to cover each core. The core thickness of the center portion 204a is 0.22 μm, the core thickness of the peripheral portions 204b, 204c is 0.06 μm, the thickness of the over cladding 231 is 1.5 μm, and the thickness of the under cladding 232 is 2 μm.

Figure 13:
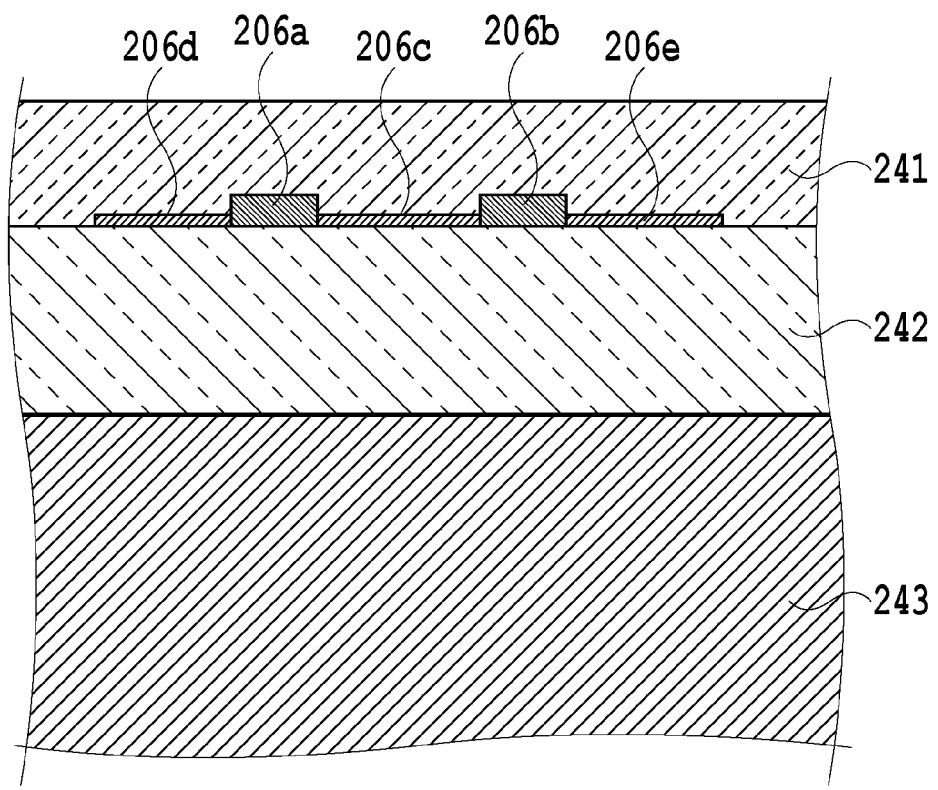
FIG. 13 is a view showing a cross-sectional structure taken along line XIII-XIII on a mode converter in FIG. 1.

FIG. 13 is a view showing a cross-sectional structure taken along line XIII-XIII on the mode converter in the top view in FIG. 10. An under cladding 242 made of silica glass is provided on a silicon substrate 243. Thick core portions 206a, 206b and thin peripheral cores 206c, 206d, 206e of the rib waveguide made of silicon are created on the under cladding 242. Further, an over cladding 241 made of silica glass is provided in such a way as to cover all the cores. The core thickness of the thick core portions 206a, 206b is 0.22 μm, the core thickness of the peripheral cores 206c, 206d, 206e is 0.06 μm, the thickness of the over cladding 241 is 1.5 μm, and the thickness of the under cladding 242 is 2 μm.

The polarization converter 204 in this embodiment is designed similarly to the polarization converter 104 in the first embodiment; the core width w1 on the narrower side is 0.9 μm, and the core width w2 on the wider side is 1.8 μm. In a case where TM-polarized basic mode light is inputted into the polarization converter 204 from the left side in FIG. 10, the propagating optical wave is converted into a TE-polarized 1st order mode by the gradual increase in core width from w1 to w2, and is outfitted from the right side of the polarization converter 204.

At the mode converter 215, the TE-polarized 1st order mode light inputted from the polarization converter 204 into the optical splitter 206 is split into two beams of TE-polarized basic mode light having the same intensity. The two beams of TE-polarized basic mode light are inputted into the delay circuit 209, 210 through the rib-channel conversion waveguides 207, 208, respectively. At this point, assuming that the used central wavelength of the polarization converter in this embodiment is 1.55 μm, a phase difference of ½ of the wavelength is present between the two beams of TE-polarized basic mode light. Further, as the two beams of TE-polarized basic mode light pass through the delay circuit 209, 210, a delay of ½ of the wavelength is added. Hence, the phase difference between the two beams of TE-polarized basic mode light is zero when they are inputted into the optical coupler 211. The two beams of TE-polarized basic mode light in phase are combined at the optical coupler 211 and outputted as a beam of TE-polarized basic mode light from the input-output waveguide 212.

As in the other embodiments, the polarization rotator in this embodiment is also bidirectional. Thus, in a case where TE-polarized basic mode light 214 is inputted in the reverse direction from the input-output waveguide 212, it passes through paths that are the reverse of the paths mentioned above, and the TM-polarized basic mode light 213 is outputted into the input-output waveguide 201.

In the polarization rotator in this embodiment, in a case where TE-polarized basic mode light is inputted from the input-output waveguide 201, the TE-polarized basic mode light propagates through the polarization converter 204 while remaining as TE-polarized basic mode light. Further, at the optical splitter 206, the TE-polarized basic mode light is split into two beams of TE-polarized basic mode light having the same intensity, but no phase difference is present between the two beams of TE-polarized basic mode light.

Then, the delay added at the delay circuit 209, 210 may be set at ¼ of the used central wavelength, and the optical coupler 211 may be changed to a two-input two-output MMI. In this way, TM-polarized basic mode light inputted into the polarization rotator in the changed embodiment is rotated into TE-polarized basic mode light and outputted from one of the outputs of the MMI. At the same time, TE-polarized basic mode light inputted into the polarization rotator in the changed embodiment remains as TE-polarized basic mode light and is outputted from the other output of the MMI. In other words, by slightly modifying the polarization rotator in FIG. 10, a polarization rotator and a polarization splitter can be implemented at the same time as well.

As described above, the polarization rotator in this embodiment can also implement functions such as polarization rotation, polarization splitting, and polarization combination similar the polarization rotators of the conventional techniques. On the other hand, the polarization converter of the present invention includes only a silicon waveguide and needs no additional process for a silicon nitride layer or the like as in the polarization rotators of the conventional techniques. It is needless to say that the polarization converter in this embodiment can also employ the structure that prevents deterioration in return loss characteristic, described in the first embodiment with reference to FIG. 7.

As for the mode converter 215 of the polarization rotator in this embodiment, design parameters of the optical splitter 206 and the delay circuit 209 are described by taking specific values as an example. However, the parameters are not limited to these values. Further, the optical coupler is described by taking an MMI as an example. However, any other circuits configured to implement optical combination such as a Y-branch circuit are applicable to the present invention.

Fourth Embodiment

A configuration and operation in still another, fourth embodiment of the polarization rotator of the present invention will be described. This embodiment differs from the foregoing embodiments in the configurations of the mode converter and the intermediate waveguide connecting the polarization converter and the mode converter.

Figure 14:
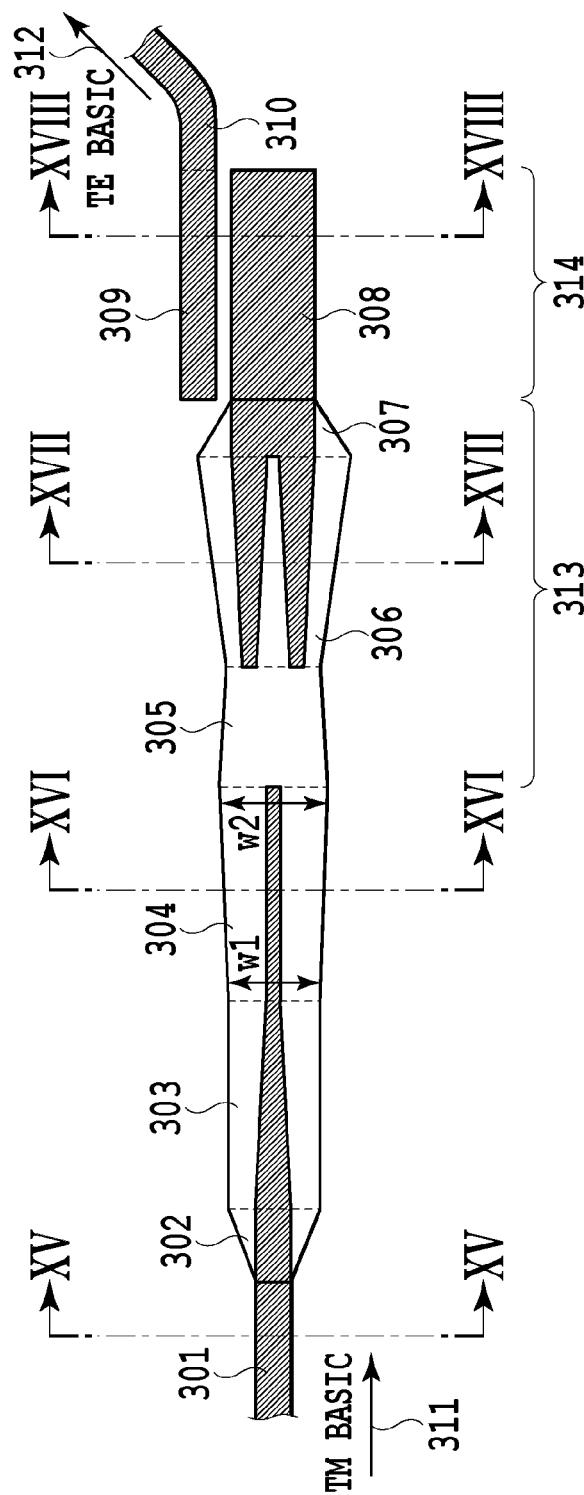
FIG. 14 is a view showing the configuration of a polarization rotator in a fourth embodiment of the present invention.

FIG. 14 is a view showing the configuration of the polarization rotator in the fourth embodiment of the present invention. It is a view of a device's surface where the circuit is formed. A polarization converter 304 and a mode converter 314 perform main operation in polarization rotation. TM-polarized basic mode light 311 inputted from an input-output waveguide 301 at the left end of the figure is converted by the polarization converter of the present invention into TE-polarized 1st order mode light 312 and then outputted from an input-output waveguide 310 at the right end. The polarization converter 304 is formed of a silicon rib waveguide including a center portion with a relatively thick core and peripheral portions with relatively thin cores, and is such a tapered waveguide that the core width of the peripheral portions increases from w1 to w2.

The mode converter 314 includes an asymmetric directional coupler 308, 309 including two waveguides differing in width and each formed of a silicon channel waveguide. The mode converter is configured to convert TE-polarized 1st order mode light inputted into ones of its waveguides, namely, the waveguide 308, from the left side in FIG. 14 into TE-polarized basic mode light and output it from the right side of the other waveguide 309.

In this embodiment, the configuration of an intermediate waveguide 313 connecting the polarization converter 304 and the mode converter 314 is a characteristic difference from the other embodiments. In the intermediate waveguide 313, three types of waveguides 305, 306, 307 are connected in this order. The waveguide 305 is formed of a silicon rib waveguide with no center portion, and is a tapered waveguide smoothly connecting the polarization converter 304 and the following intermediate waveguide 306. The intermediate waveguides 306, 307 are a rib-channel conversion waveguide and include a waveguide section 306 varying the core width of each center portion of the rib waveguide, and a waveguide section 307 converting the waveguide structure from a rib structure to a channel structure.

Thus, in this embodiment, the mode converter includes the asymmetric directional coupler 308, 309 including two waveguides differing in width; the two waveguides differing in width are silicon channel waveguides; of the two waveguides differing in width, the wider waveguide 308 has one end optically connected to the polarization converter 304 by the intermediate waveguide 313; the intermediate waveguide includes the silicon rib waveguide 306 including two portions with relatively thick cores and peripheral portions with relatively thin cores; and each of the portions with the relatively thick cores has a tapered structure.

The input-output waveguides 301, 310, formed of channel waveguides including rectangular cores, are provided at the opposite ends of the whole polarization converter. A rib-channel conversion waveguide 302, 303 is provided between the input-output waveguide 301 and the polarization converter 304, the rib-channel conversion waveguide 302, 303 smoothly connecting the input-output waveguide 301 and the polarization converter 304. Specifically, the rib-channel conversion waveguide 302, 303 includes a waveguide section 302 converting the waveguide structure from a channel structure into a rib structure, and a waveguide section 303 varying the core width of the center portion of the rib waveguide.

The length of the polarization converter 304 is 50 μm, the core width of its center portion is 0.15 μm, and the core width of its peripheral portions is w1=0.9 μm to w2=1.8 μm.

The widths of the one waveguide 308 and the other waveguide 309, forming the asymmetric directional coupler 314, or the mode converter, are 1.0 μm and 0.5 μm, respectively, and their lengths are both 20 μm. The gap between the two waveguides is 0.4 μm.

In the intermediate waveguide 313, the length of the waveguide 305 is 15 μm, and the core width of its peripheral portion varies from 1.8 μm to 1.0 μm. Also, as for the rib-channel conversion waveguide 306, 307, the length of the waveguide section 306 is 200 μm. The waveguide section 306 includes two portions with relatively thick cores, each of which has such a tapered structure that the core width varies from 0.15 μm to 0.485 μm. The gap between the two tapered structures is 0.5 μm. The peripheral portions also have such a tapered structure that the core width varies from 1.0 μm to 2.5 μm. The length of the waveguide section 307 is 50 μm, the core width of its center portion is fixed at 1.0 μm, and the core width of its peripheral portions varies from 2.5 μm to 1.0 μm.

The width of each input-output waveguides 301, 310 is 0.5 μm. As for the rib-channel conversion waveguide 302, 303, the length of the waveguide section 302 is 50 μm, the core width of its center portion is 0.5 μm, and the core width of its peripheral portions varies from 0.5 μm to 1.0 μm; and the length of the waveguide section 303 is 200 μm, the core width of its center portion varies from 0.5 μm to 0.15 μm, and the core width of its peripheral portions is 1.0 μm.

Figure 15:
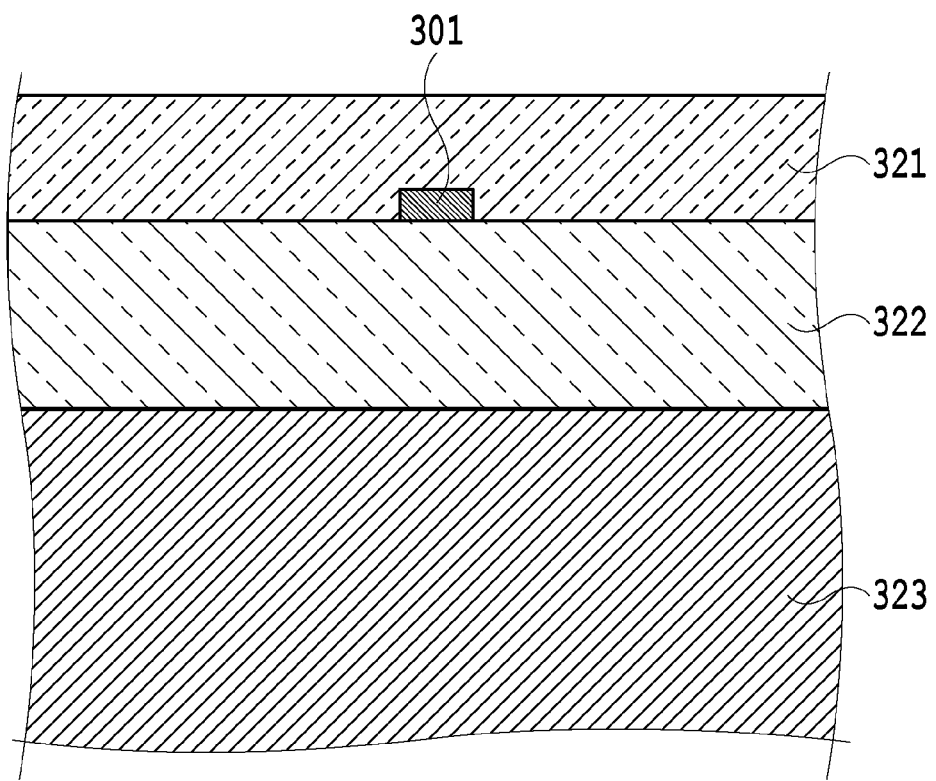
FIG. 15 is a view showing a cross-sectional structure taken along line XV-XV on one of input-output waveguides in FIG. 14.

FIG. 15 is a view showing a cross-sectional structure taken along line XV-XV on one of the input-output waveguides in the top view in FIG. 14. An under cladding 322 made of silica glass is provided on a silicon substrate 323. A core 301 of the channel waveguide made of silicon is created on the under cladding 322. Further an over cladding 321 made of silica glass is provided in such a way as to cover the core 301. The core thickness of the waveguide 301 is 0.22 μm, the thickness of the over cladding 321 is 1.5 μm, and the thickness of the under cladding 322 is 2 μm.

Figure 16:
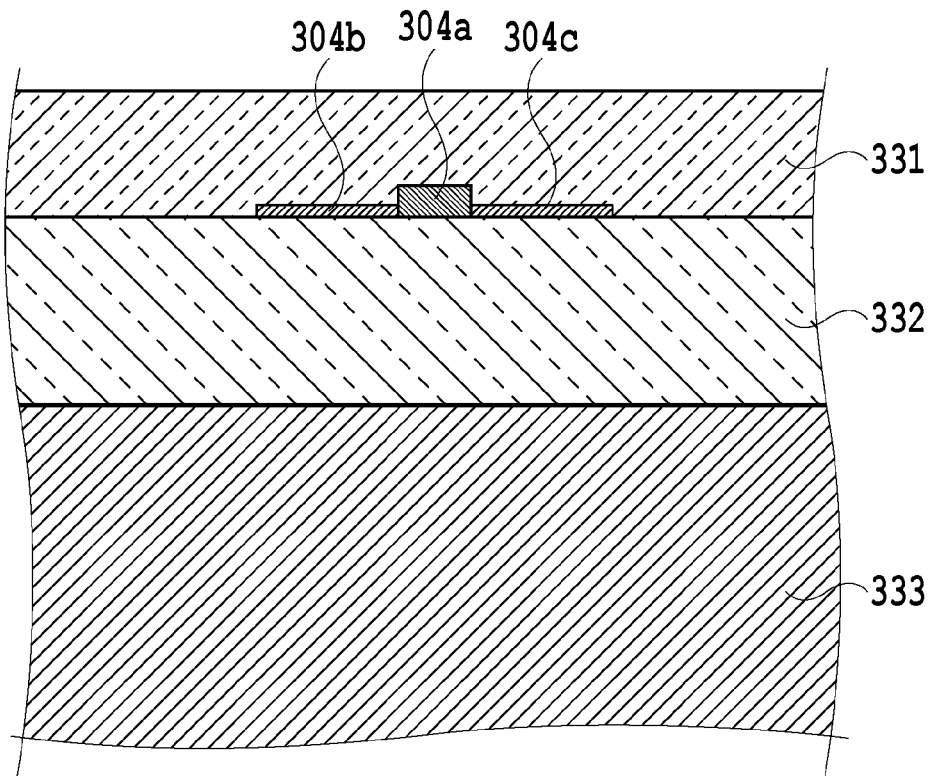
FIG. 16 is a view showing a cross-sectional structure taken along line XVI-XVI on a polarization converter in FIG. 14.

FIG. 16 is a view showing a cross-sectional structure taken along line XVI-XVI on the polarization converter in the top view in FIG. 14. An under cladding 332 made of silica glass is provided on a silicon substrate 333. A center-portion core 304a and peripheral-portion cores 304b, 304c of the rib waveguide made of silicon are created on the under cladding 332. Further, an over cladding 331 made of silica glass is provided in such a way as to cover each core. The core thickness of the center portion 304a is 0.22 μm, the core thickness of the peripheral portions 304b, 304c is 0.06 μm, the thickness of the over cladding 331 is 1.5 μm, and the thickness of the under cladding 332 is 2 μm.

Figure 17:
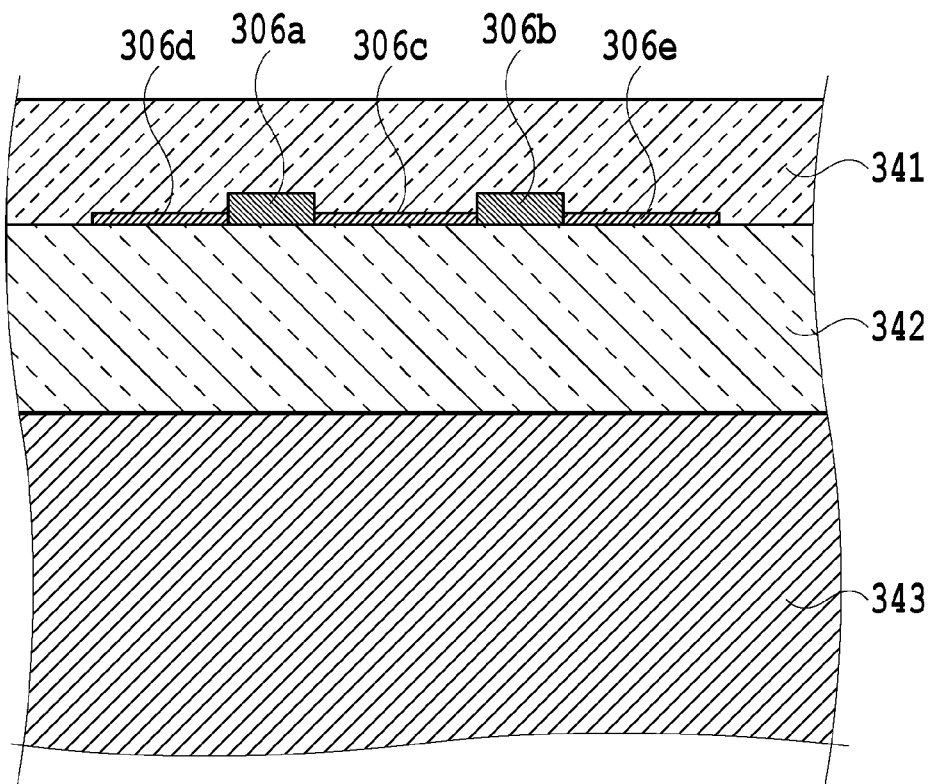
FIG. 17 is a view showing a cross-sectional structure taken along line XVII-XVII on an intermediate waveguide in FIG. 14.

FIG. 17 is a view showing a cross-sectional structure taken along line XVII-XVII on the intermediate waveguide in the top view in FIG. 14. An under cladding 342 made of silica glass is provided on a silicon substrate 343. Thick core portions 306a, 306b and peripheral-portion cores 306c, 306d, 306e of the rib waveguides made of silicon are created on the under cladding 342. Further, an over cladding 341 made of silica glass is provided in such a way as to cover all the cores. The core thickness of the thick core portions 306a, 306b is 0.22 μm, the core thickness of the peripheral-portion cores 306c, 306d, 306e is 0.06 μm, the thickness of the over cladding 341 is 1.5 μm, and the thickness of the under cladding 342 is 2 μm.

Figure 18:
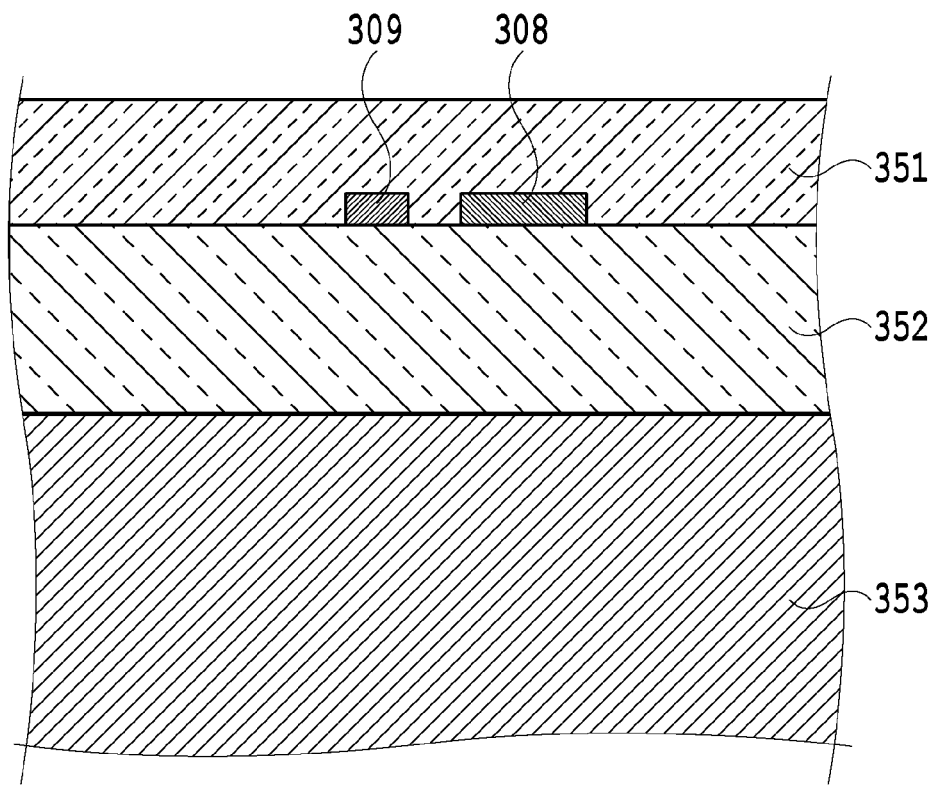
FIG. 18 is a view showing a cross-sectional structure taken along line XVIII-XVIII on an asymmetric directional coupler in FIG. 14.

FIG. 18 is a view showing a cross-sectional structure taken along line XVIII-XVIII on the asymmetric directional coupler in the top view in FIG. 14. An under cladding 352 made of silica glass is provided on a silicon substrate 353. Cores 308, 309 of the channel waveguides made of silicon are created on the under cladding 352. Further, an over cladding 351 made of silica glass is provided in such a way as to cover each core. The core thickness of the waveguides 308, 309 is 0.22 μm, the thickness of the over cladding 351 is 1.5 μm, and the thickness of the under cladding 352 is 2 μm.

The polarization converter 304 in this embodiment is designed similarly to the polarization converter 104 in the first embodiment; the core width w1 on the narrower side is 0.9 μm, and the core width w2 on the wider side is 1.8 μm. In a case where the TM-polarized basic mode light 311 is inputted into the polarization converter 304 from the left side in FIG. 14, the propagating optical wave is converted into a TE-polarized 1st order mode by the gradual increase in core width from w1 to w2, and is outfitted from the right side of the polarization converter 304. The TE-polarized 1st order mode light after the conversion is inputted into the mode converter through the intermediate waveguide 313.

In the asymmetric directional coupler 308, 309, or the mode converter, the core width of each of the one waveguide 308 and the other waveguide 309 is designed such that the effective refractive index of the TE-polarized 1st order mode at the waveguide 308 and the effective refractive index of the TE-polarized basic mode at the waveguide 309 are substantially equal. In this way, the TE-polarized 1st order mode light inputted into the one waveguide 308 is coupled to the TE-polarized basic mode at the other waveguide 309, and TE-polarized basic mode light is outputted from the waveguide 309. The converted light is outputted from the input-output waveguide 310 as TE-polarized basic mode light 312.

The rib-channel conversion waveguides 306, 307 in the intermediate waveguide 313 are designed such that the TE-polarized 1st order mode light inputted from 305, which is a rib waveguide with no center portion, is inputted into the channel waveguide 308 of the asymmetric directional coupler while remaining as TE-polarized 1st order mode light.

As in the other embodiments, the polarization rotator in this embodiment is also bidirectional. Thus, in a case where the TE-polarized basic mode light 312 is inputted in the reverse direction from the input-output waveguide 310, it passes through paths that are the reverse of the paths mentioned above, and the TM-polarized basic mode light 311 is outputted into the input-output waveguide 301.

The polarization rotator in this embodiment can also implement functions such as polarization rotation, polarization splitting, and polarization combination similar to the polarization rotators of the conventional techniques. On the other hand, the polarization converter of the present invention includes only a silicon waveguide and needs no additional process for a silicon nitride layer or the like as in the polarization rotators of the conventional techniques. The polarization converter in this embodiment can also employ the structure that prevents deterioration in return loss characteristic, described in the first embodiment with reference to FIG. 7, and the structure that implements the function of a polarization splitter or combiner at the same time, described in the first embodiment with reference to FIG. 8.

As for the mode converter of the polarization rotator in the above fourth embodiment, design parameters of the asymmetric directional coupler, formed of channel waveguides, are described as specific values. However, the parameters are not limited to these values. Requirements for the widths of the two waveguides 308, 309 are determined by the thicknesses of the waveguide cores and the refractive index of the material of each of the over cladding and the under cladding. The design parameters of the asymmetric directional coupler only need to be set such that the effective refractive index of the TE-polarized basic mode at the narrower waveguide 309 and the effective refractive index of the TE-polarized 1st order mode at the wider waveguide 308 are close in value.

The polarization converter in each of the above embodiments has been described such that silica glass is used as the material of the over cladding and the under cladding. However, the material is not limited only to silica glass. The over cladding and the under cladding only need to be made of a material lower in refractive index than silicon.

Also, as for the polarization converter in each of the above embodiments, specific numerical values are exemplary given as the thicknesses of the over cladding and the under cladding. However, the thicknesses are not limited to these numerical values. The over cladding and the under cladding only need to be as thick as or thicker than the cores.

Further, as for the polarization converter in each of the above embodiments, specific values are exemplary given as design parameters of the silicon waveguide. However, the parameters are not limited to these values. The core width of the peripheral portions of the silicon waveguide that causes conversion between TM basic mode light and TE 1st order mode light is determined by the thickness and width of the center-portion core, the thickness of the peripheral-portion cores, the refractive index of the material of each of the over cladding and the under cladding, and the like. The waveguide widths w1, w2 of the opposite ends of the tapered waveguide at each polarization converter 104, 204, 304 only need to be set to cover as much as possible the range of change in waveguide width within which polarization conversion occurs.

Also, for efficient polarization conversion, the width of the center-portion core of each polarization converter 104, 204, 304 is preferably set to be small to provide a structure with such large vertical asymmetry that the optical wave can be sufficiently influenced. In view of this, the width of the center-portion core is preferably less than or equal to twice the thickness of the center-portion core. In each of the above embodiments, the thickness and core width of the center-portion core of the waveguide of the polarization converter are set at 0.22 μm and 0.15 μm, respectively and well satisfy the above requirement that the width of the center-portion core is less than or equal to twice the thickness of the center-portion core. Meanwhile, the thickness of the peripheral-portion cores of the rib waveguide is not limited to the value in the embodiment. However, if the thickness of the peripheral-portion cores is near the thickness of the center-portion core, there is a possibility that an unwanted high mode higher than the 1st order mode might occur and deteriorate the polarization conversion characteristic. Thus, in view of suppressing the high-order mode, the thickness of the peripheral-portion cores is preferably set to be less than or equal to ⅓ of the thickness of the center-portion core.

Each of the first, second, and fourth embodiments has shown an example utilizing an asymmetric directional coupler as a mode converter, and the third embodiment has shown an example utilizing an interference circuit including an optical splitter, a delay circuit, and an optical coupler. It is generally possible to utilize an adiabatic converter as a mode converter, but the size of the circuit tends to increase to about several hundred μm in length. In contrast, the circuit length of an asymmetric directional coupler or interference circuit formed of silicon waveguides is only about several μm to several tens μm. Thus, in view of downsizing the circuit, an asymmetric directional coupler or an interference circuit is preferably utilized, as discussed in the embodiments of the present invention.

Also, for the polarization converter in each of the above embodiments, in view of connectivity to other circuits, the input-output waveguide is a single-mode waveguide or optically connected to a single-mode waveguide. The requirements for a silicon waveguide to be a single-mode waveguide differ depending on the refractive index of the material of each of the over cladding and the under cladding. However, in a case of using silica for the claddings, which has been most commonly, the cross-sectional area of the waveguide core needs to be approximately less than or equal to 0.2 µm² if the waveguide is a channel waveguide, and the cross-sectional area of the center portion (thick core region) of the waveguide core needs to be approximately less than or equal to 0.2 µm² if the waveguide is a rib waveguide.

As described above in detail, with the polarization converter of the present invention, it is possible to provide a polarization rotator that includes only silicon waveguides and needs no additional process for a silicon nitride layer or the like.

In the following, description will be given of embodiments as other instances of the polarization rotator of the present invention in each of which the polarization rotator has a configuration more simplified from a different point of view and can also allow more relaxed fabrication tolerance and reduce the entire circuit length. Each of the above embodiments includes the configuration in which the width of a tapered waveguide reaches 0.15 µm or the core width of the center portion of the polarization converter. Here, the influence of the width of the tapered waveguide on circuit characteristics is sufficiently small and is not problematic in view of tolerable fabrication errors (tolerance).

In contrast, a variation in the gap between the waveguides of the directional coupler greatly influences circuit characteristics. The asymmetric directional coupler of the polarization rotator described as a conventional technique includes a configuration in which the gap between its waveguides reaches 0.15 µm. Such a variation in the gap between the waveguides of the asymmetric directional coupler greatly influences the circuit characteristics and has thus been problematic in view of tolerable fabrication errors (tolerance).

Fifth Embodiment

A polarization rotator in a fifth embodiment of the present invention will be described below with reference to FIGS. 19 to 21. The fifth embodiment and the following embodiments will present configuration examples using no directional coupler at a polarization converter and various new configuration examples using a directional coupler with a relatively large gap between its waveguides and focusing on the configuration of the mode converter at the second part of the polarization rotator.

Configuration of Polarization Rotator

Figure 19:
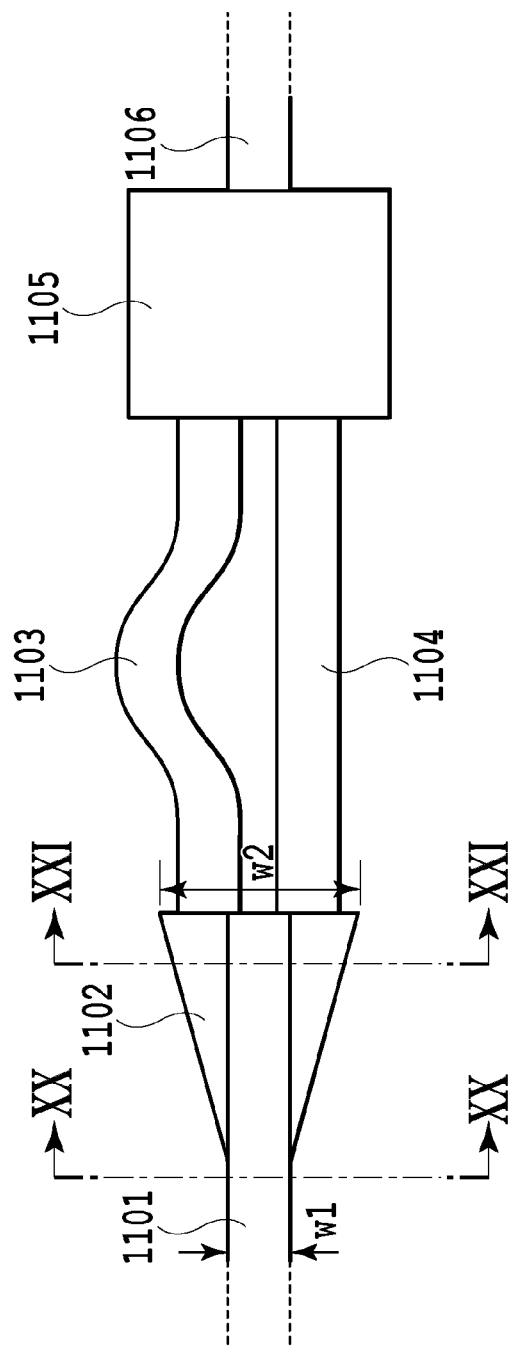
FIG. 19 is a view showing the configuration of a polarization rotator in a fifth embodiment of the present invention.

FIG. 19 is a view showing a configuration example of the polarization rotator in this embodiment. At a polarization converter 1102 in this embodiment in FIG. 19, TM-polarized basic mode light inputted from the left side in the figure is converted into TE-polarized 1st order mode light, and outputted from the right side in the figure.

The polarization converter 1102 is formed of a silicon rib waveguide including a center portion with a thick core and peripheral portions with thin cores. The core width of the waveguide at the center portion is 0.5 µm. The core width of the waveguide at the peripheral portions is w1 to w2.

A mode converter is formed of: a delay circuit 1103, 1104 formed of channel waveguides; and an optical coupler 1105 formed of a channel waveguide. The TE-polarized 1st order mode light outputted from the polarization converter 1102 is inputted into each part of the delay circuit 1103, 1104 of the mode converter. In doing so, the TE-polarized 1st order mode light is split into two TE-polarized basic modes having mutually opposite phases. At the mode converter, the optical coupler 1105 converts the two split TE-polarized basic modes into one beam of TE-polarized basic mode light and outputs it.

The length of the polarization converter 1102 is 30 µm, the width w1 of the thick core at the center portion is 0.5 µm, and the width w2 of the thin cores on the sides of the thick core is 1.5 µm.

The length of each part of the delay circuit 1103, 1104 is 100 µm. The length and width of the optical coupler 1105 are 3.5 µm and 2.1 µm, respectively. The thickness of each waveguide 1103, 1104 of the delay circuit is 0.22 µm, and each waveguide 1103, 1104 of the delay circuit is formed of a channel waveguide.

Note that that the waveguide 1103 of the delay circuit is set to be longer than the other waveguide 1104 by 0.314 µm. As will be described later, the longer waveguide 1103 of the delay circuit causes a delay, and will therefore be referred to as the delay waveguide as well.

Figure 20:
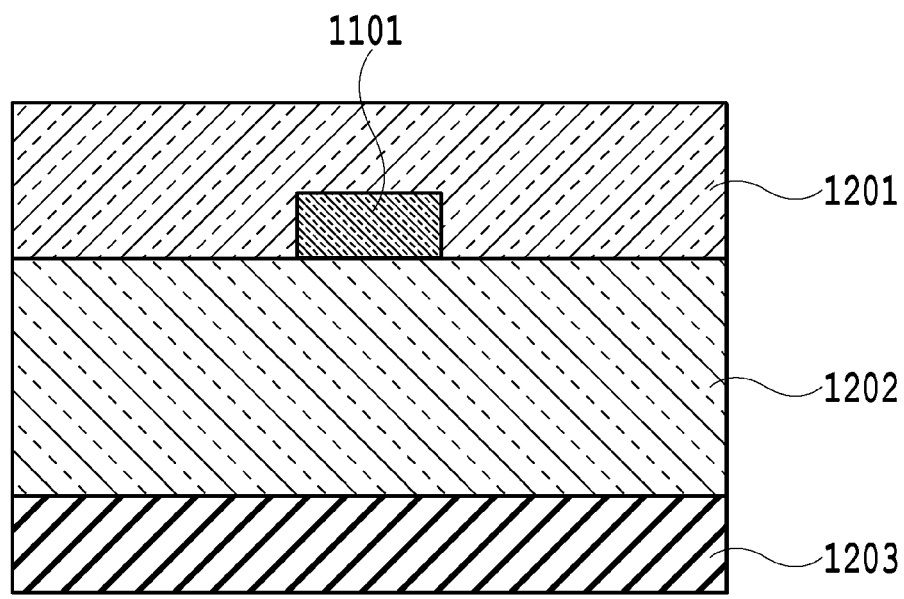
FIG. 20 is a view showing a cross-sectional structure of the polarization rotator taken along line XX-XX shown in FIG. 19.

FIG. 20 is a view showing a cross section of the polarization rotator taken along line XX-XX shown in FIG. 19. An under cladding 1202 and an over cladding 1201 are formed on a silicon substrate 1203 in this order from the substrate. Each cladding 1201, 1202 is made of silica.

The core thickness of a waveguide 1101 is 0.22 µm, the thickness of the over cladding 1201 is 1.5 µm, and the thickness of the under cladding 1202 is 2 µm.

Figure 21:
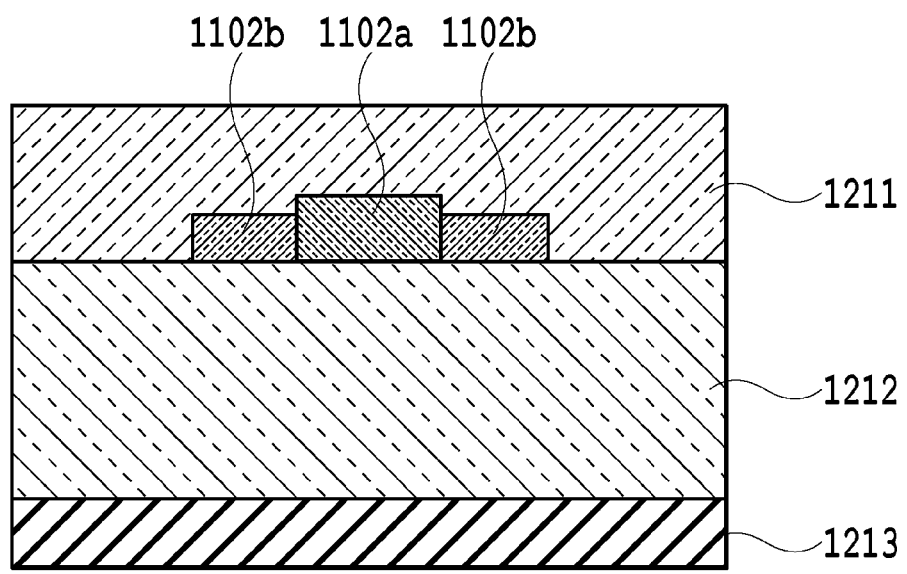
FIG. 21 is a view showing a cross-sectional structure of the polarization rotator taken along line XXI-XXI shown in FIG. 19.

FIG. 21 is a view showing a cross section of the polarization rotator taken along line XXI-XXI shown in FIG. 19. Note that components 1102a, 1211 to 1213 in FIG. 21 correspond to the waveguide 1101, the over cladding 1201, the under cladding 1202, and the silicon substrate 1203 in FIG. 20, respectively.

An under cladding 1212 and an over cladding 1211 are formed on a silicon substrate 1213 in this order from the substrate. Each cladding 1211, 1212 is made of silica. In the polarization converter 1102, the core thickness of a center portion 1102a is 0.22 µm, the core thickness of peripheral portions 1102b is 0.15 µm, the thickness of the over cladding 1211 is 1.5 µm, and the thickness of the under cladding 1212 is 2 µm.

Figure 22:
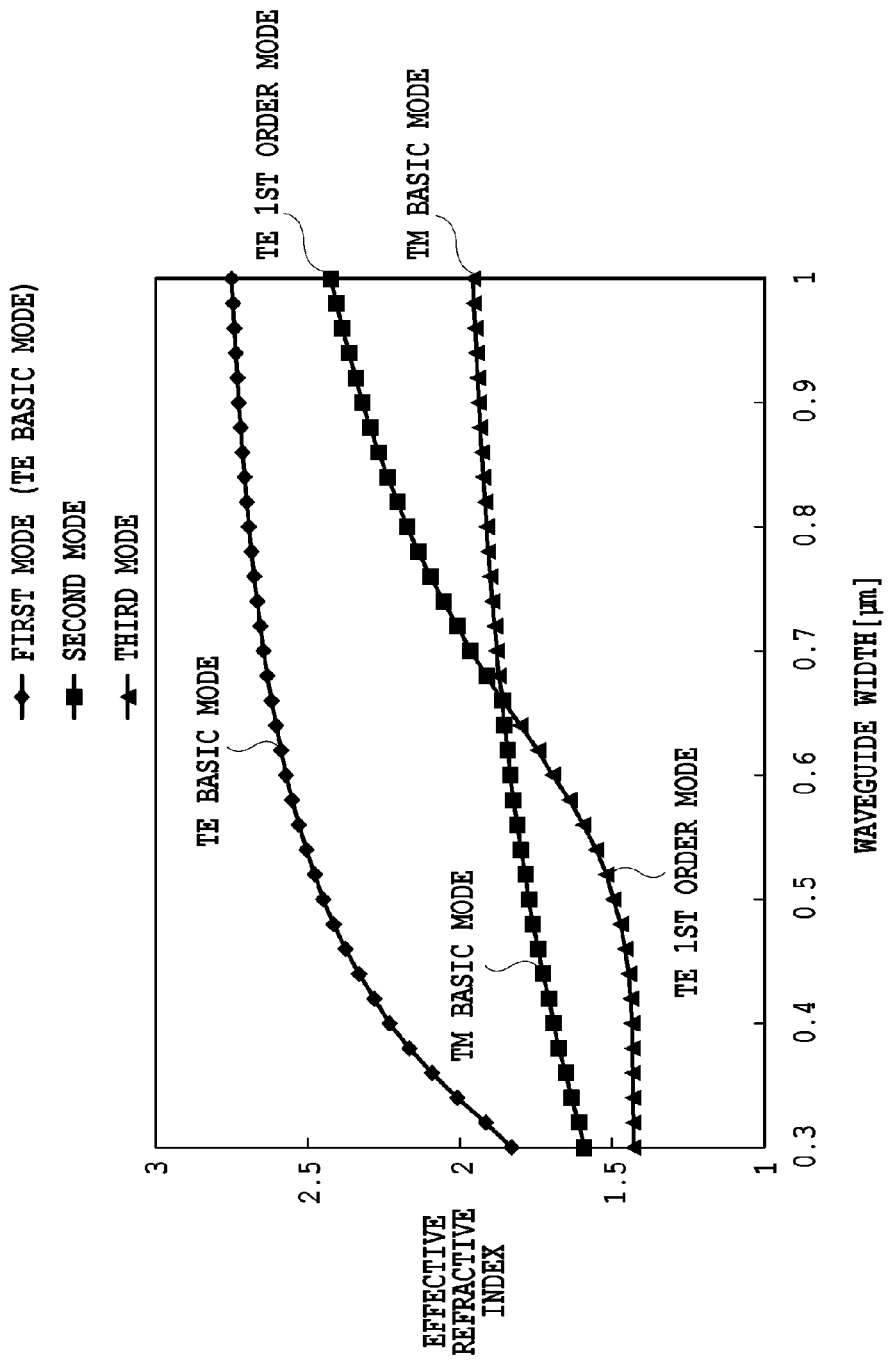
FIG. 22 is a diagram explaining an example of the result of calculation of the effective refractive indexes of eigenmodes versus the core width of a channel waveguide.

FIG. 22 is a diagram explaining an example of the result of calculation of the effective refractive indexes of eigenmodes versus the core width of a channel waveguide through a finite-difference method. In the example shown in FIG. 22, the cross-sectional structure of the waveguide is similar to that shown in FIG. 20 such that the core material of the waveguide 1101 is Si and the material of each cladding 1201, 1202 is $SiO_2$. Moreover, the effective refractive index is calculated for a first mode to a third mode with the waveguide width (core width) varied.

The first mode maintains a TE-polarized basic mode regardless of the core width.

The second mode and the third mode are such that, when the waveguide width is smaller than 0.66 µm, the second mode is a TM-polarized basic mode, and the third mode is a TE-polarized 1st order mode. On the other hand, when the waveguide width is larger than 0.66 µm, the second mode is a TE-polarized 1st order mode, and the third mode is a TM-polarized basic mode.

In optical propagation through a tapered waveguide whose core width, or waveguide width, gradually increases from a width smaller than 0.66 µm to a width larger than 0.66 µm, light inputted as a TM-polarized basic mode propagates while remaining as a TM-polarized basic mode, whereas light inputted as a TE-polarized 1st order mode propagates while remaining as a TE-polarized 1st order mode. This is because the structure of a channel waveguide is symmetric in each of the thickness direction and the width direction in terms of refractive index, and a TE-polarized component and a TM-polarized component are completely perpendicular.

In the case of a structure asymmetric in the waveguide thickness direction as shown in NPL 2, there is no perpendicularity between a TE-polarized component and a TM-polarized component, and a hybrid mode in which the TE-polarized component and the TM-polarized component are mixed occurs at around a certain core width (approximately 0.7 µm). Around this core width (0.7 µm), the effective refractive indexes of the second mode and the third mode do not coincide with each other.

By forming a tapered structure that is adiabatic and gradually increases in core width from a width smaller to some extent than the core width at which a hybrid mode occurs to a width larger to some extent than the core width at which the hybrid mode occurs, light inputted as a TM-polarized basic mode propagates through the tapered waveguide while maintaining the second mode, and is outputted as a TE-polarized 1st order mode. Thus, polarization conversion can be performed.

Figure 23:
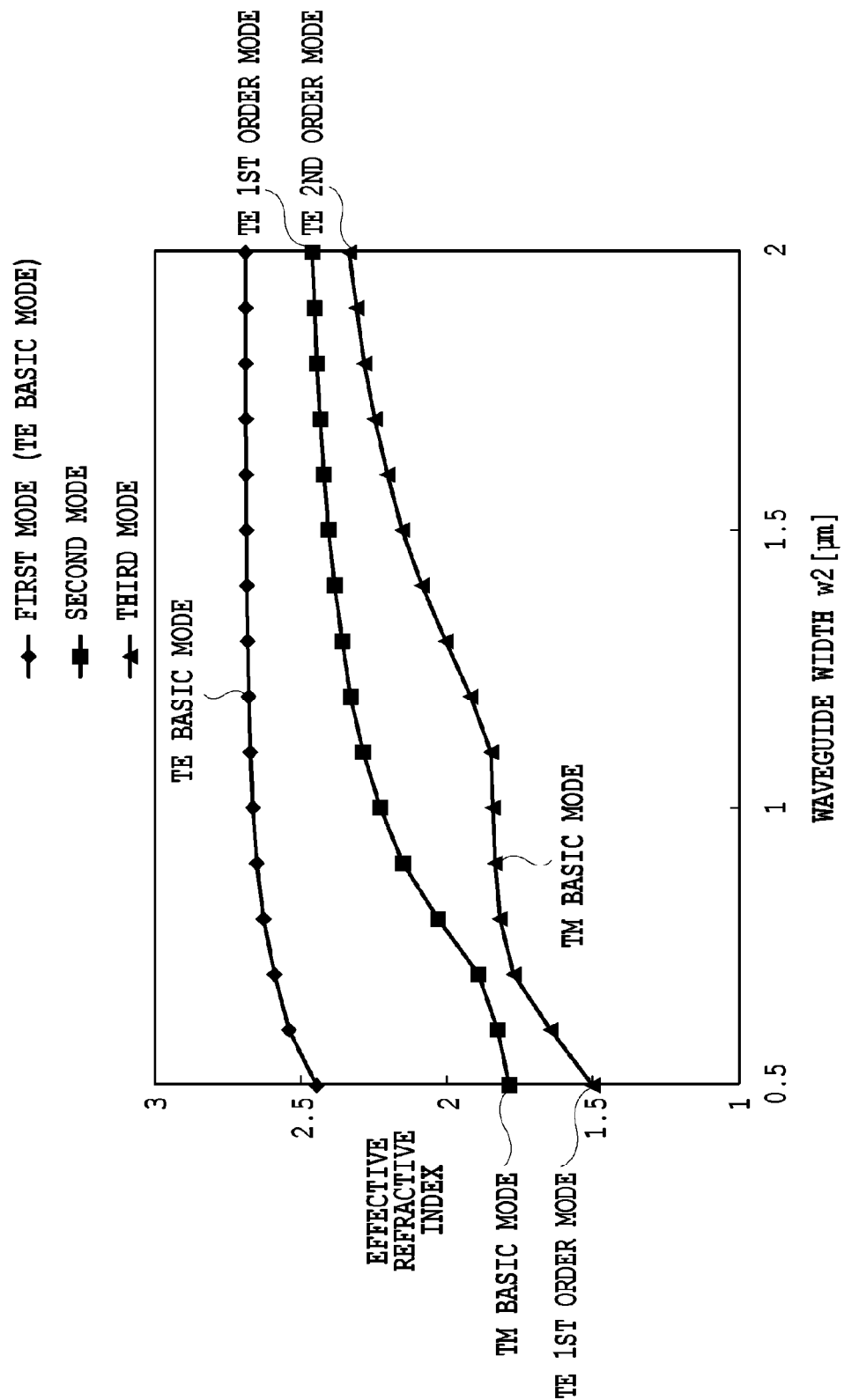
FIG. 23 is a diagram explaining an example of the result of calculation of effective refractive indexes versus the core width of the peripheral portions of a rib waveguide.

FIG. 23 is a diagram explaining an example of the result of calculation of the effective refractive indexes of eigenmodes versus the core width of the peripheral-portions of the rib waveguide near line XXI-XXI shown in FIG. 19 through a finite-difference method. In the example of FIG. 23, the cross-sectional structure of the waveguide is similar to that shown in FIG. 21, and the effective refractive index is calculated for a first mode to a third mode with the core width w2 of the peripheral portions 1102b varied. Note that the core width of the center portion 1102a is 0.5 µm.

The first mode maintains a TE-polarized basic mode regardless of the value of the core width w2 of the peripheral portions.

On the other hand, with the value of the core width w2 of the peripheral portions varied, the second mode and the third mode are hybrid modes, in which a TE-polarized component and a TM-polarized component are mixed, and the effective refractive indexes of the second mode and the third mode do not coincide with each other.

When the value of the core width w2 of the peripheral portions is around 0.5 µm, the second mode is substantially a TM-polarized basic mode, and the third mode is substantially a TE-polarized 1st order mode. On the other hand, when the value of w2 is around 1.0 µm, the second mode switches substantially to a TE-polarized 1st order mode, and the third mode switches substantially to a TM-polarized basic mode. As described, as in NPL 2, the rib waveguide in this embodiment also has a structure asymmetric in the thickness direction. Thus, by forming a tapered structure that, like the polarization converter 1102 in FIG. 19, is adiabatic in the propagation direction and gradually increases in waveguide width to cover the waveguide width (approximately 0.7 µm) at which a hybrid mode occurs, light inputted as a TM-polarized basic mode propagates while maintaining the second mode, and is outputted as a TE-polarized 1st order mode. Thus, polarization conversion can be performed.

Figure 24:
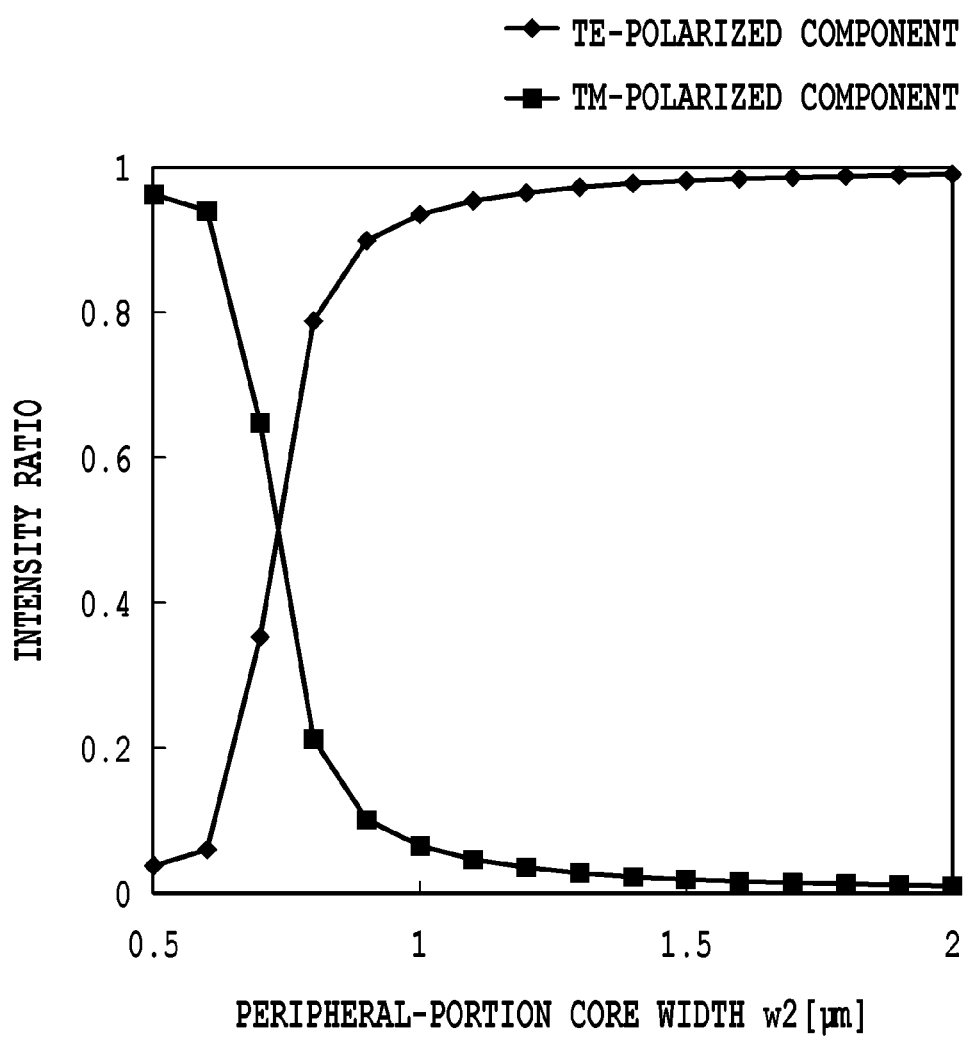
FIG. 24 is a diagram showing the result of calculation of the intensity ratio between differently polarized components for a second mode shown in FIG. 23.

FIG. 24 is a diagram showing the result of calculation of the intensity ratio between the TE-polarized component and the TM-polarized component from the result of the calculation of the second mode shown in FIG. 23. It can be seen that, as the value of the core width w2 of the peripheral portions increases, the intensity ratio of the TM-polarized component decreases but the intensity ratio of the TE-polarized component increases, and the polarized components switch from each other.

The core widths w1, w2 of the polarization converter 1102 are set to cover as much as possible a range within which the polarized components of the second mode switch from each other. In the example in this embodiment, w1=0.5 µm, and w2=2.5 µm.

Figure 25:
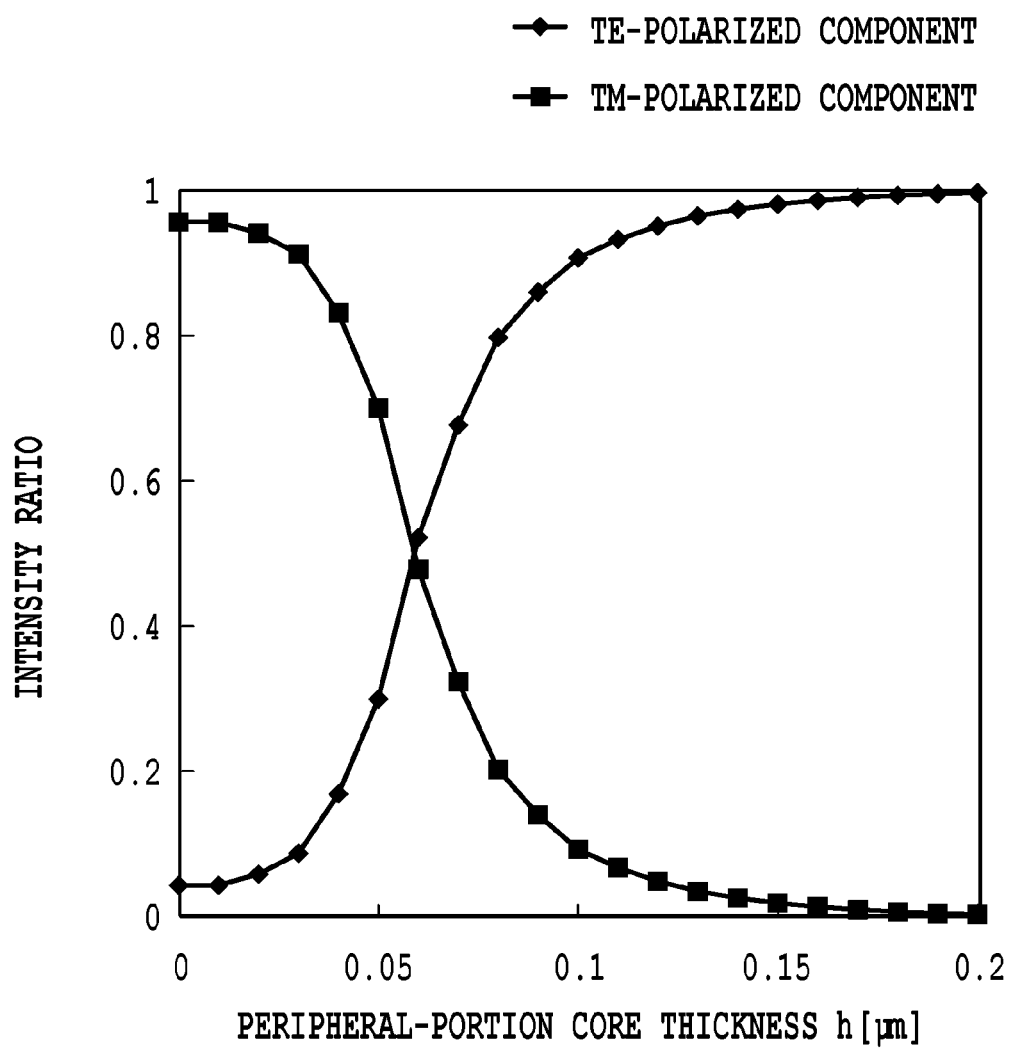
FIG. 25 shows the result of calculation of the TE-polarized component and the TM-polarized component of the second mode versus the thickness of the peripheral-portion cores of the rib waveguide.

FIG. 25 shows the result of calculation of the intensity ration between the TE-polarized component and the TM-polarized component of the second mode versus a thickness h of the thin peripheral-portion cores of the rib waveguide of the polarization converter 1102, shown in FIG. 21.

Note that the width of the center-portion core is w1=0.5 µm, and the width of peripheral-portion cores is w2=1.5 µm.

As the thickness h of the peripheral-portion cores increases, the TE-polarized component increases but the TM-polarized component decreases, and the TE-polarized component and the TM-polarized component switch from each other at around h=0.06 µm. Thus, the thickness of the peripheral-portion cores of the polarization converter 1102 is set to be larger than or equal to 0.06 µm.

Figure 26:
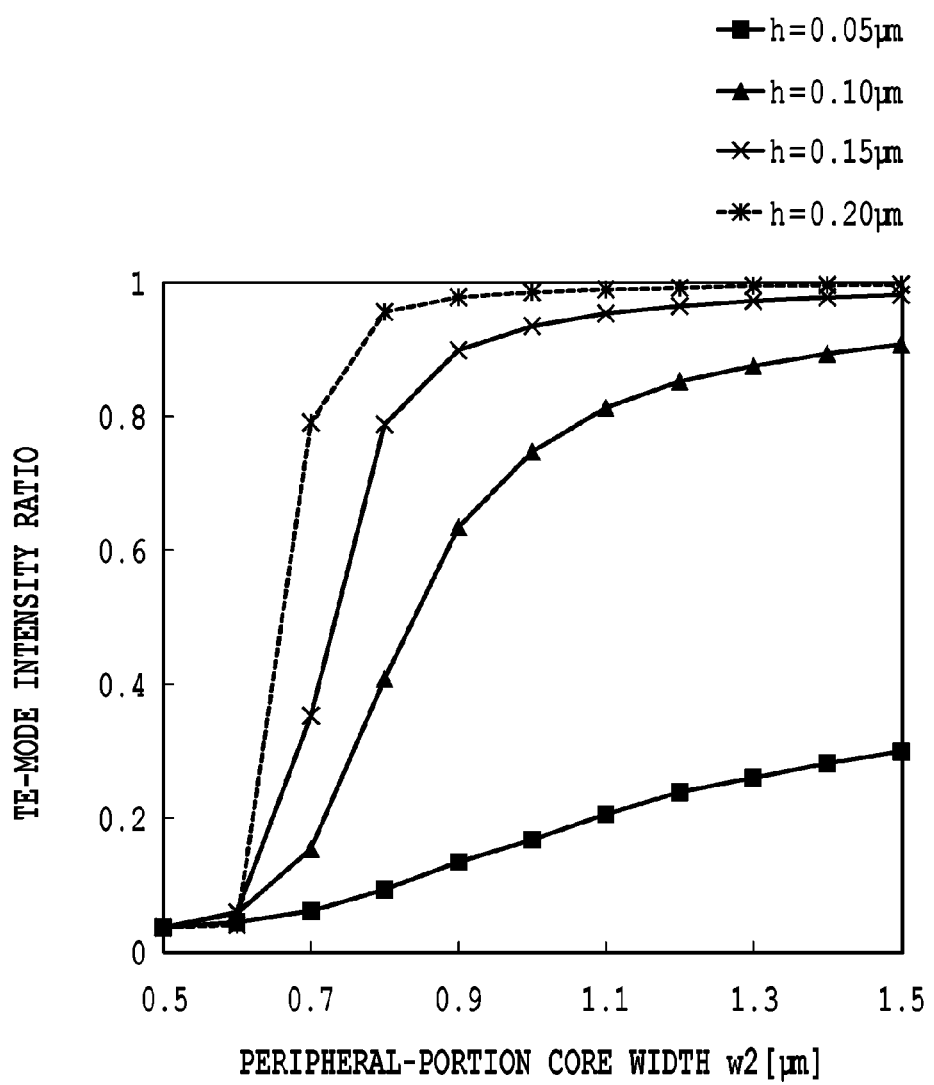
FIG. 26 is a diagram showing an example of the result of calculation of the TE-polarized component of the second mode versus the width of the peripheral-portion cores of the rib waveguide for each given value of the thickness of the peripheral-portion cores.

FIG. 26 shows the result of calculation of the intensity ratio of the TE-polarized component of the second mode versus the width w2 of the peripheral-portion cores of the polarization converter 1102 with the thickness h of the peripheral-portion cores used as a parameter.

It can be seen that the larger the thickness h of the peripheral-portion cores, the smaller the width w2 of the peripheral-portion cores necessary to reverse the intensity ratio between the TE-polarized component and the TM-polarized component. The larger the thickness h of the peripheral-portion cores, the smaller the core width w2 with which polarization conversion can be performed. Then, if the angles of spread of the tapered portions of the peripheral-portion cores of the polarization converter 1102 are set at the same angle, the circuit length can be further reduced.

Figure 27:
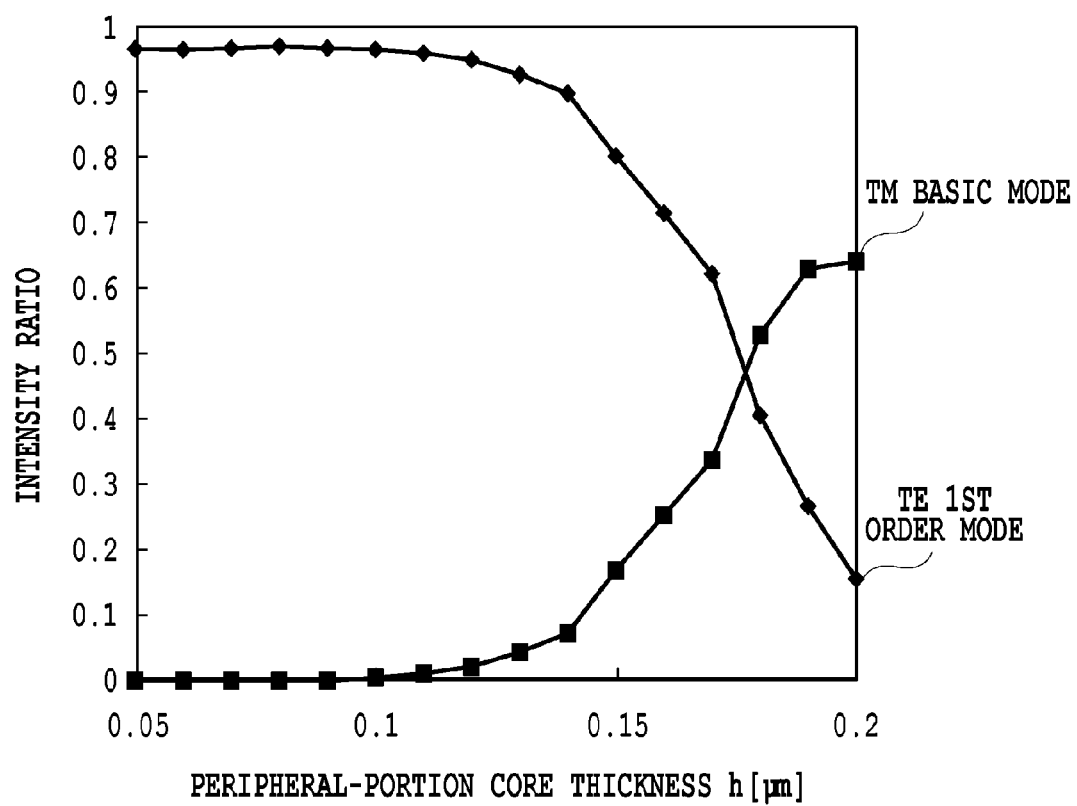
FIG. 27 is a diagram showing an example of the result of calculation of different mode components contained in light outputted from a polarization converter versus the thickness of the peripheral-portion cores of the rib waveguide.

FIG. 27 is a diagram showing the result of calculation of the intensity ratio between different mode components contained in the light outputted from the polarization converter 1102 upon input of TM-polarized basic mode light, versus the thickness h of the peripheral-portion cores of the polarization converter 1102. FIG. 27 shows the result of calculation of the intensity ratio between the different mode components through a three-dimensional finite difference time domain (FDTD) method and overlap integration of an eigenmode.

As the core thickness h increases, the TE-polarized 1st order mode component decreases but the TM-polarized basic mode component increases, and the polarization conversion efficiency decreases.

From the results of the calculations in FIGS. 26 and 27, the thickness of the peripheral-portion cores of the polarization converter 1102 in the polarization rotator in this embodiment is set at h=0.15 µm so that both a short circuit length and high conversion efficiency can be achieved.

Also, in this embodiment, the width of the peripheral-portion cores of the polarization converter 1102 is set at w2=1.6 μm so that the delay circuit 1103, 1104, or the mode converter, can be disposed.

Description will now be given with reference to FIG. 19 again. In a case where TM-polarized basic mode light is inputted into the polarization converter 1102, the propagating light is converted into a TE-polarized 1st order mode by the gradual increase in core width from w1 to w2, and then outputted.

At the mode converter 1103 to 1105, the TE-polarized 1st order mode outputted from the polarization converter 1102 is branched and inputted into the waveguides 1103, 1104 as two TE-polarized basic modes having mutually opposite phases, respectively. At this point, the phase of the light propagating through the waveguide 1103 has a delay of ½ of a wavelength relative to the phase of the light propagating through the waveguide 1104. However, the phases of the two beams of light coincide with each other after they propagate through the waveguides 1103, 1104.

The optical coupler 1105 is a multi-mode interference waveguide (MMI). The optical coupler 1105 combines the two beams of TE-polarized basic mode light having the same phase and inputted from the waveguides 1103, 1104 into one beam of TE-polarized basic mode light. The optical coupler 1105 then outputs the combined beam of basic mode light into an input-output waveguide 1106.

In the polarization rotator in this embodiment, TM-polarized basic mode light inputted from the input-output waveguide 1101 is inputted into the polarization converter 1102 to be converted into TE-polarized 1st order mode light. The output from the polarization converter 1102 is split into two beams of TE-polarized basic mode light having mutually opposite phases and inputted into the delay waveguide 1103 and the waveguide 1104. The beam of light inputted into the waveguide 1103 delays by ½ of a wavelength and therefore becomes a TE-polarized basic mode having the same phase as the beam of light inputted into the waveguide 1104.

The beams of light outputted from the delay waveguide 1103 and the waveguide 1104 are inputted into the optical coupler 1105, which is an MMI, as two TE-polarized basic modes having the same phase, and outputted into the input-output waveguide 1106 as one TE-polarized basic mode.

As described above, the polarization rotator in this embodiment implements a function similar to the polarization rotators of the conventional techniques. Here, the circuit includes only silicon waveguides and therefore has an advantage that it does not need an additional process for a silicon nitride layer or the like, which is not employed in usual fabrication of a silicon waveguide circuit.

Also, the thickness of the peripheral-portion cores at the sides of the polarization converter 1102 is made relatively large. In this way, the width w2 of the right end of the polarization converter 1102 can be set smaller than that in a case where the core thickness is small. Accordingly, the circuit length of the polarization converter 1102 can be smaller.

In FIG. 19, the polarization converter 1102 is formed of a rib waveguide including a thick core at its center portion and thin cores at its peripheral portions, while the mode converter 1103 to 1105 is formed of channel waveguides with no thin core. Thus, the polarization converter 1102 and the mode converter 1103 to 1105 have different waveguide structures, which results in reflection or radiation of the propagating light and thus causes a loss.

Modification 1

To suppress the above loss, it is preferable to add a tapered waveguide having a rib structure including a thick core and thin cores to the polarization rotator in FIG. 19 on the output side of the polarization converter 1102 and on each input side of the delay circuit 1103, 1104 to optically connect the polarization converter 1102 and the mode converter 1103 to 1105.

Figure 28:
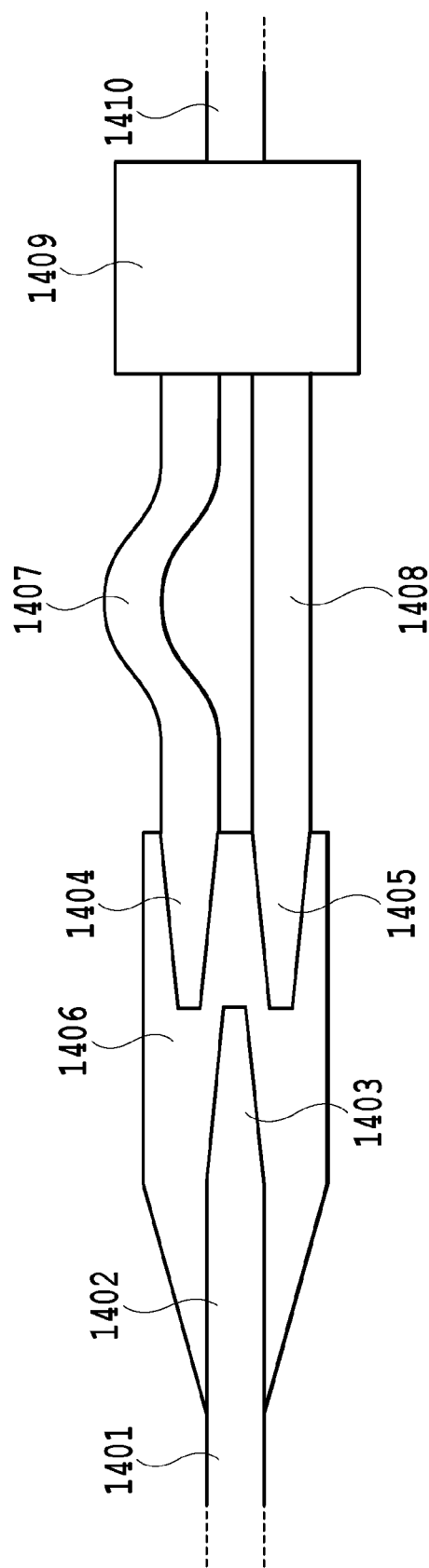
FIG. 28 is a view showing a configuration obtained by adding intermediate tapers to the polarization rotator in the fifth embodiment.

FIG. 28 is a view showing an example of the tapered structure capable of suppressing the loss. Tapered waveguides 1403, 1404, 1405 include relatively thick cores, and their peripheral portion 1406 includes a thin core. The lengths of the tapered waveguides 1403 to 1405 are all 10 μm, and the length and width of the thin peripheral-portion core 1406 are 20 μm and 1.6 μm, respectively. Also, the width of the termination of the tapered waveguide 1403 and the widths of the terminations of the tapered waveguides 1404, 1405 are all 0.2 μm.

TE-polarized 1st order mode light outputted from a polarization converter 1402 is inputted into the tapered waveguide 1403 and the peripheral-portion core 1406. The width of the tapered waveguide 1403 gradually decreases toward the output side (the right end in the figure) so that most part of the electric power of the light can concentrate at the core 1406. The light from the core 1406 is then inputted into the tapered waveguides 1404, 1405. When the TE-polarized 1st order mode light whose electric power has concentrated at the core 1406 is inputted into the tapered waveguides 1404, 1405, the light is split at the same intensity for the tapered waveguides 1404, 1405. In doing so, the light is outputted into the tapered waveguides 1404, 1405 as TE-polarized 0-th order modes having mutually opposite phases.

As described above, the tapered waveguide 1403 and each tapered waveguide 1404, 1405 are structurally discontinuous in the direction of the optical propagation. However, since the light propagates mainly through the thin peripheral-portion core, the reflection or radiation can be reduced.

The core width of the output-side end (the right end in the figure) of the tapered waveguide 1403 and the core width of the input-side end (left end in the figure) of each tapered waveguide 1404, 1405 are dependent on the minimum core width that can be realized by the fabrication process. For example, the core width of each end mentioned above is preferably set to be smaller than 0.2 μm.

Note that the polarization rotator in this embodiment is the polarization rotator in the third Embodiment, shown in FIG. 10, without the polarization converter 204 and the intermediate waveguide 205. The function of the polarization converter in the third Embodiment is implemented by the tapered waveguide 1402 in this embodiment.

The polarization rotator in this embodiment includes the tapered waveguides 1403 to 1405 for suppressing the loss at the polarization converter 1402, which increases the entire length of the polarization rotator. Also, as described with reference to FIG. 27, if the thickness of the peripheral cores of the polarization converter 1402 is set to be larger than 0.15 μm, the circuit length of the polarization converter 1402 can be reduced, but the efficiency of conversion from TM-polarized basic mode light into TE-polarized 1st order mode light decreases such that part of the inputted light is outputted as TM-polarized basic mode light.

If the center-portion core of the polarization converter 1402 is formed into a tapered structure, the tapered waveguide 1403 will be unnecessary. In this way, it is possible to avoid the increase in length of the polarization converter 1402 while suppressing the loss, and also improve the efficiency of the polarization conversion by the polarization converter 1402.

Figure 29:
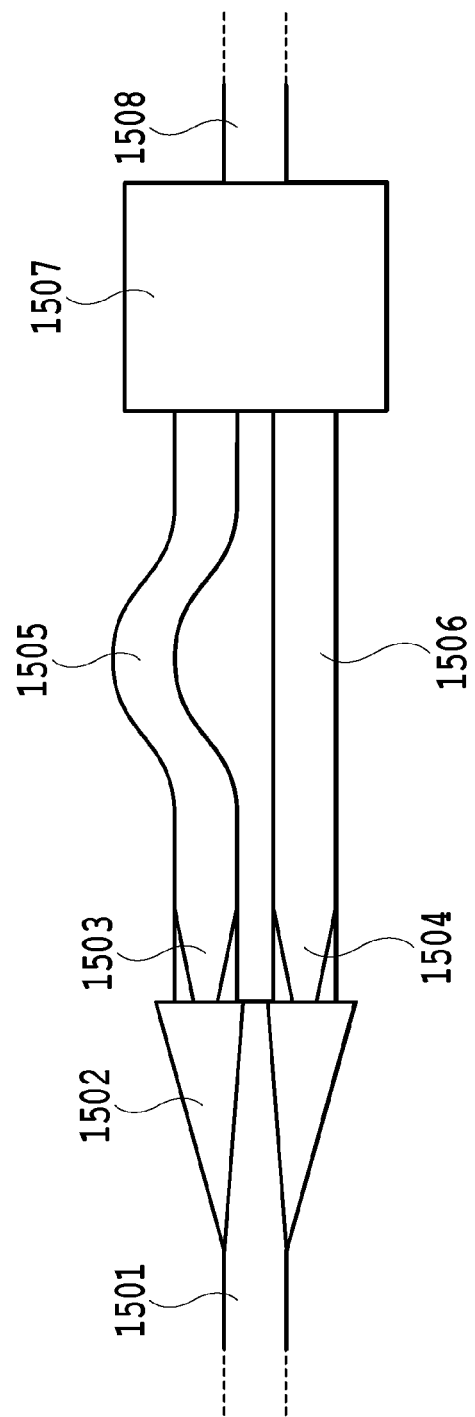
FIG. 29 is a view showing a configuration obtained by forming the center-portion core of the polarization converter in the fifth embodiment into a tapered shape.

FIG. 29 is a plan view showing an example of the polarization rotator with the center-portion core of the polarization converter formed into a tapered structure. With this configuration, it is possible to avoid the increase in circuit length and suppress the loss at the same time, and also improve the efficiency of the polarization conversion.

The length of a polarization converter 1502 is 32 µm, a width w1 of its input end is 0.5 µm, a width w2 of the output end of its thick center-portion core is 0.2 µm, and a width w3 of the output ends of its thin peripheral-portion cores is 1.6 µm. TM-polarized basic mode light inputted into the polarization converter 1502 is converted into TE-polarized 1st order mode light at the output end of the polarization converter 1502, and the electric power of the light mostly concentrates at the peripheral-portion cores.

Figure 30:
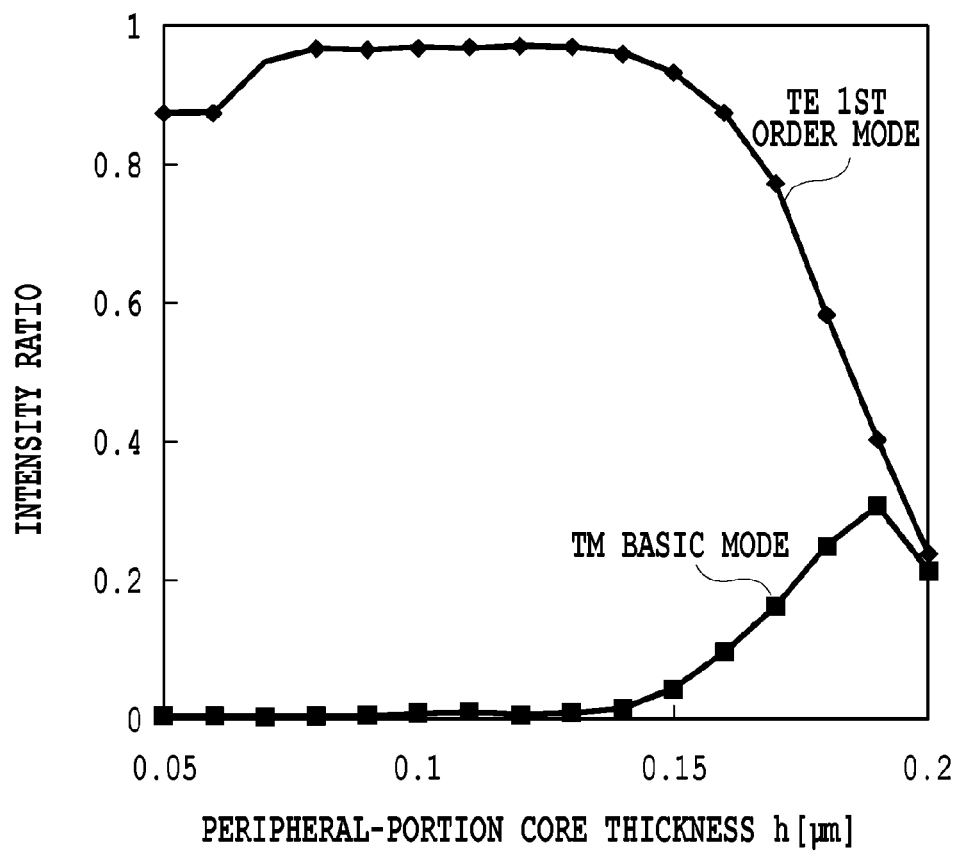
FIG. 30 is a diagram showing an example of the result of calculation of different mode components contained in light outputted from the polarization converter, versus the thickness of the peripheral-portion cores of the rib waveguide.

FIG. 30 is a diagram showing the result of calculation of the intensity ratio between the different mode components contained in the light outputted from the polarization converter 1502 upon input of a TM-polarized basic mode into the polarization converter 1502, versus a thickness h of its peripheral-portion cores. FIG. 30 shows the result of calculation of the intensity ratio between the different mode components through a three-dimensional finite difference time domain (FDTD) method and overlap integration of an eigenmode.

In a comparison of the calculation result in FIG. 30 with the calculation result in FIG. 27, the TE-polarized 1st order mode component in the output light is larger and the TM-polarized basic mode component in the output light is smaller when the thickness h of the peripheral-portion cores is around 0.15 µm. Thus, high polarization conversion efficiency can be maintained even when the thickness of the peripheral-portion cores is set to be smaller than that of the polarization converter 1102 in the fifth Embodiment, described with reference to FIG. 19.

Each of tapered intermediate waveguides 1503, 1504 shown in FIG. 29 includes a rectangular waveguide with a thin core and a tapered waveguide with a thick core. This tapered waveguide is optically connected to the corresponding one of a delay waveguide 1505 and a waveguide 1506 each formed of a rectangular channel waveguide.

The width of the input end (the left end in the figure) of the tapered waveguide with the thick core is 0.2 µm and the width of its output end (right end in the figure) is 0.5 µm. The width of the rectangular waveguide with the thin core is 0.5 µm.

The TE-polarized 1st order mode light whose electric power has concentrated at the thin cores is outputted from the polarization converter 1502 and then adiabatically propagates through the rectangular channel waveguides 1505, 1506 via the tapered waveguides with the thick cores. The core width of the tip (the left end in the figure) of each of the tapered waveguides with the thick cores mentioned above is dependent on the minimum core width that can be realized by the fabrication process. It is preferable to make the core width smaller than 0.2 µm if possible.

The TE-polarized 1st order mode light to be outputted from the tapered intermediate waveguides 1503, 1504 into the mode converter 1505, 1506, 1507 is split into two beams of TE-polarized basic mode light having the same intensity but mutually opposite phases and inputted into the delay waveguide 1505 and the waveguide 1506, respectively.

The delay waveguide 1505 and the waveguide 1506 are a delay circuit. Meanwhile, the delay waveguide 1505 is designed to be longer than the other waveguide 1506 by 0.314 µm.

The beam of TE-polarized basic mode light inputted into the delay waveguide 1505 delays by ½ of a wavelength after being coupled to the waveguide 1506 and transmitted, relative to the TE-polarized basic mode of the opposite phase inputted into the waveguide 1506. Hence, the beam of TE-polarized basic mode light inputted into the delay waveguide 1505 becomes in phase with the other at the output end of the waveguide 1506.

At the multi-mode interference waveguide (MMI) 1507, the two beams of TE-polarized basic mode light having the same phase and intensity after being outputted from the delay circuit 1505, 1506 are combined into one beam of TE-polarized basic mode light and outputted into an input-output waveguide 1508.

The width of the tapered waveguide of the polarization converter 1502 is set to linearly increase from the input end to the output ends. At the boundary of the polarization converter 1502 and an input-output waveguide 1501, the rate of change in width of the tapered portion is discontinuous. When light propagates from the input waveguide 1501 to the polarization converter 1502, a high mode which is a TM-polarized 1st or higher mode or a TE-polarized 2nd or higher mode occurs at this discontinuous point, and a conversion loss occurs. To suppress this unwanted high mode, the entire length of the polarization converter 1502 may be increased. In this way, it is possible to reduce the angle of spread of the taper. Alternatively, the peripheral-portion cores may be widened by using a curved taper instead of the straight taper, for example. In this way, it is possible to avoid increase in length of the polarization converter 1502 and also suppress the high mode.

Figure 31:
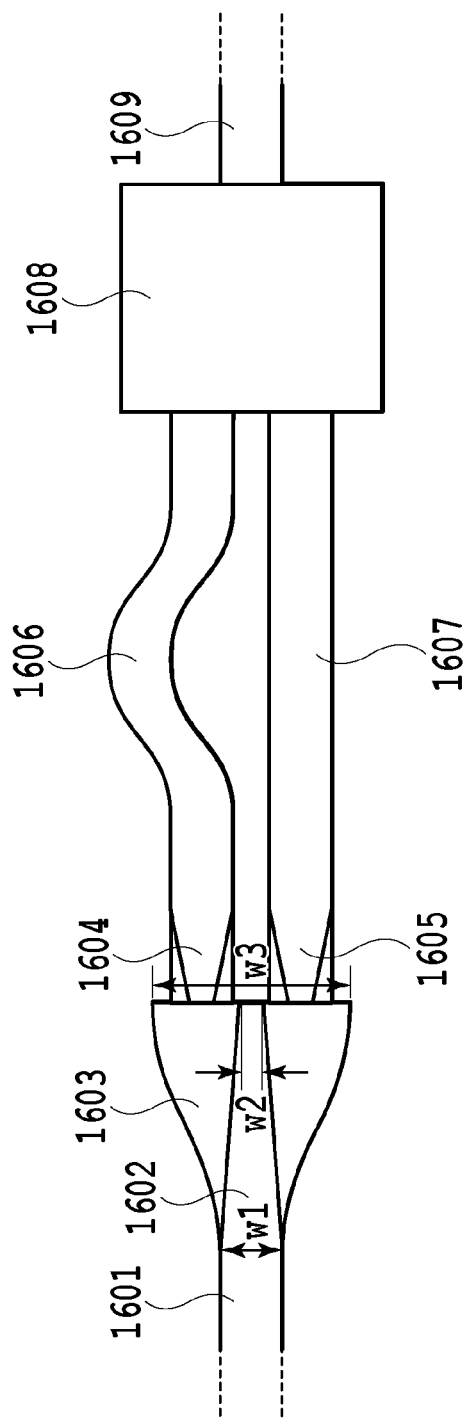
FIG. 31 is a view showing a configuration obtained by forming the peripheral-portion cores of the polarization converter in the fifth embodiment into a curved taper.

FIG. 31 shows a polarization rotator using a polarization converter widened by using a curved taper 1603 formed of thin cores for the purpose of avoiding increase in circuit length and also suppressing the high mode.

Figure 32:
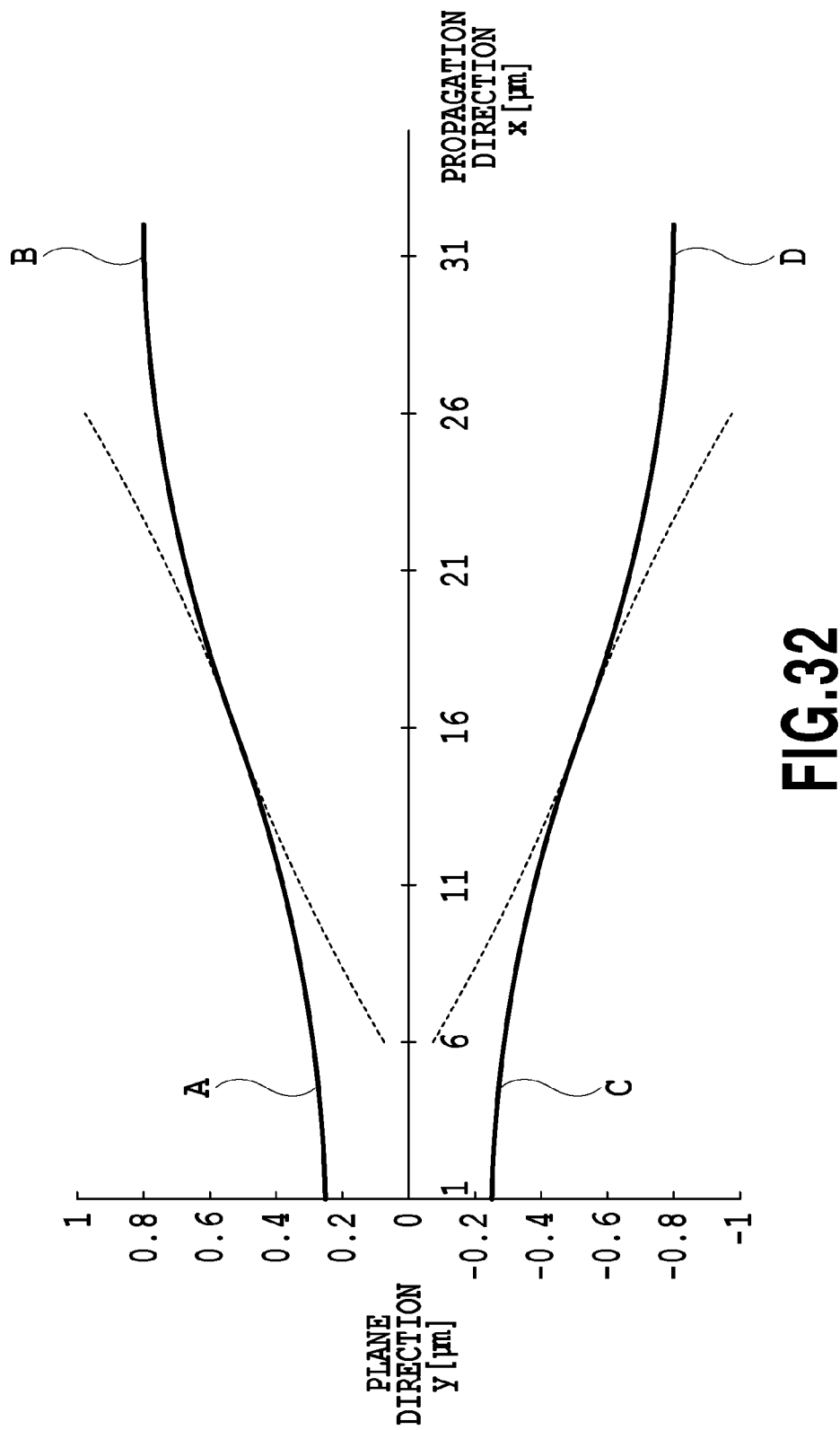
FIG. 32 is a view showing details of the curved taper of the peripheral-portion cores of the polarization converter in FIG. 31.

FIG. 31 shows a configuration example of the taper 1603. The taper 1603 is a combination of two curves formed quadratically. Specifically, the taper has quadratic curves concave from the input end to the half point in length of the entire taper that is the point at 16 µm and has quadratic curves convex away from the sides of the taper from the half point in length of the entire taper to the output ends. FIG. 32 shows the appearance of this taper.

FIG. 32 is a view showing the tapered shape of the taper 1603. In FIG. 32, a horizontal axis x represents the distance (µm) in the direction of optical propagation, while a vertical axis y represents the distance (µm) in the direction of a plane perpendicular to the direction of optical propagation. y is positive toward the top side of the sheet of FIG. 31. Tapered curves A to D of the taper 1603 shown in FIG. 32 are expressed by the following formulas.

Curve A: $0 \leq x \leq 16$, $y=(0.275/256)x^2+0.25$

Curve B: $16 \leq x \leq 32$, $y=-(x-32)^2/(0.275/256)+0.8$

Curve C: $0 \leq x \leq 16$, $y=-(0.275/256)x^2-0.25$

Curve D: $16 \leq x \leq 32$, $y=(x-32)^2/(0.275/256)-0.8$

Note that an input waveguide 1601 is optically connected to a taper 1602. The taper 1602 is formed of a thick core and formed such that its width decreases linearly. A width w1 of the input end of the taper 1602 is 0.5 µm, and a width w2 of its output end is 0.2 µm. A width w3 of the output side of the taper 1603 is 1.6 µm.

The tapered shape of the taper 1603 has been described as a quadratically curved shape but is not limited to this shape. The tapered shape may be a curved shape that can be derived from higher-order polynomials or trigonometric functions.

The polarization rotator in this embodiment includes a polarization converter and a mode converter including a delay circuit and a combiner. Among these, for the combiner, a 2×1 multi-mode interference waveguide (MMI) is used which has a function of outputting two beams of TE-polarized basic mode light having the same phase as one beam of TE-polarized basic mode light. Here, the combiner may be changed to a 2×2 MMI, and the amount of delay caused by the delay circuit may be changed to ¼ of a wavelength. In this way, the polarization converter can be caused to operate as a polarization converter-splitter.

Figure 33:
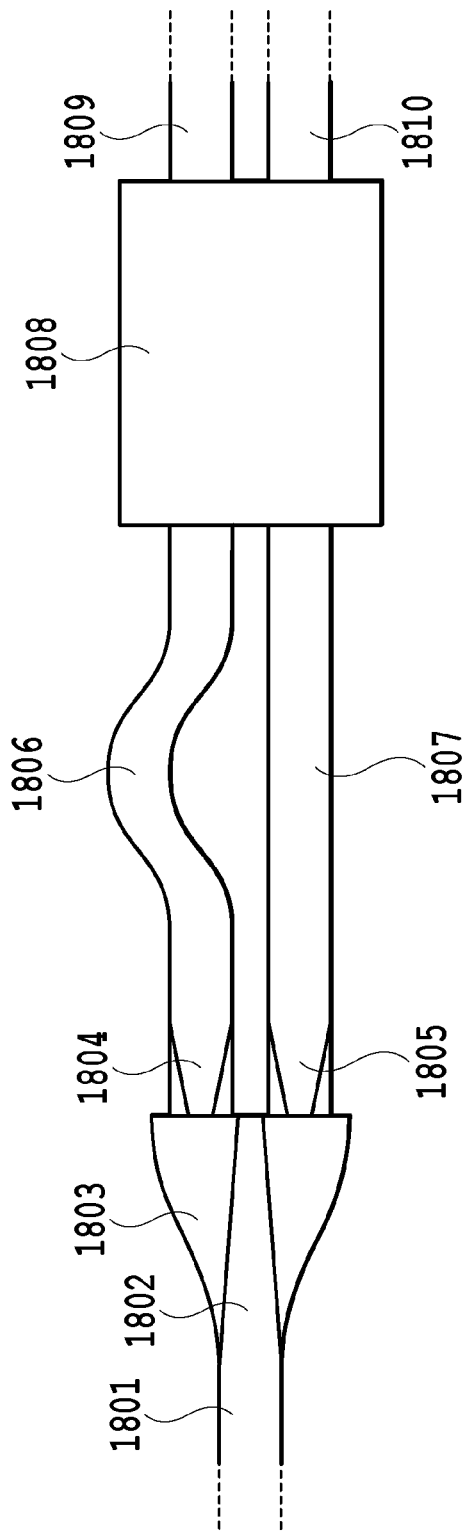
FIG. 33 is a view showing the configuration of a polarization rotator-splitter in the fifth embodiment of the present invention.

FIG. 33 is a plan view showing a configuration example of a polarization converter-splitter using a 2×2 MMI 1808 as a combiner. The configurations of an input waveguide 1801, a polarization converter 1802, 1803, and intermediate tapers 1804, 1805 are similar to those shown in FIG. 31.

The configuration of a delay circuit 1806, 1807 is similar to a delay circuit 1606, 1607 shown in FIG. 31, but the delay waveguide 1806 is set to be longer than the waveguide 1807 by 0.157 µm so that the amount of delay caused by the delay waveguide 1806 can be ¼ of a wavelength.

The mode converter 1808 is formed of channel waveguides having a thickness of 0.22 µm, and is an MMI having a width of 2.1 µm and a length of 7.0 µm.

Output waveguides 1809, 1810 are channel waveguides having a thickness of 0.22 µm and a width of 0.5 µm.

TM-polarized basic mode light inputted from the input waveguide 1801 is converted into TE-polarized 1st order mode light by the polarization converter 1802, 1803, and then split into two TE-polarized basic modes having mutually opposite phases but the same intensity and inputted into the delay circuit 1806, 1807 through the intermediate tapers 1804, 1805.

Meanwhile, the beam of light propagating through one of the waveguides, namely, the delay waveguide 1806, is inputted into the MMI 1808 with a phase delay of ¼ of a wavelength relative to the beam of light propagating through the other waveguide 1807. Of the two beams of TE-polarized basic mode light inputted into the MMI 1808, the phase of the beam of light propagating through the waveguide 1807 has advanced by ¼ of a wavelength relative to that in the delay waveguide 1806. Then, the beams of light from the waveguides 1806, 1807 are combined by the MMI 1808 into one beam of TE-polarized basic mode light and outputted into the output waveguide 1810.

At the polarization converter 1802, 1803, in a case where TE-polarized basic mode light is inputted from the input waveguide 1801, it is not subjected to polarization conversion and is inputted into the intermediate tapers 1804, 1805 while remaining as a TE-polarized basic mode. Then, split into two beams of TE-polarized basic mode light having the same phase and intensity, the beams of light from the intermediate tapers 1804, 1805 are inputted into the delay circuit 1806, 1807. The beam of light propagating through the delay waveguide 1806 is inputted into the MMI 1808 with a phase delay of ¼ of a wavelength relative to the beam of light propagating through the waveguide 1807. Of the two beams of TE-polarized basic mode light to be inputted into the MMI 1808, the beam of light propagating through the delay waveguide 1806 has a phase delay by ¼ of a wavelength relative to that in the other waveguide 1807, and the two beams of TE-polarized basic mode light are then combined by the MMI 1808 into one beam of TE-polarized basic mode light and outputted from the output waveguide 1809.

As described above, the waveguide that outputs light when the input light is TE polarized and the waveguide that outputs light is different from when the input light is TE polarized to when the input light is TM polarized when the input light is TM polarized are different in the case where the amount of delay caused by the delay circuit of the polarization rotator is set at ¼ of a wavelength and a 2×2 MMI is used as the combiner. In other words, the polarization rotator in this embodiment can operate not only as a polarization rotator but also as a polarization splitter.

As described above, the polarization rotator in this embodiment neither needs an additional process such as fabrication of a nitride film, which is not employed in usual fabrication of a silicon waveguide circuit. Also, the gap between the waveguides of the directional coupler is 0.2 µm, and improvement in fabrication tolerance from the directional coupler shown in NPL 2 can therefore be expected.

Sixth Embodiment

The configuration of a polarization rotator according to a sixth embodiment is substantially the same as that shown in the fifth embodiment, except that it includes a delay circuit and a directional coupler such that the entire length of a mode converter using the delay circuit and an MMI combiner can be smaller.

Figure 34:
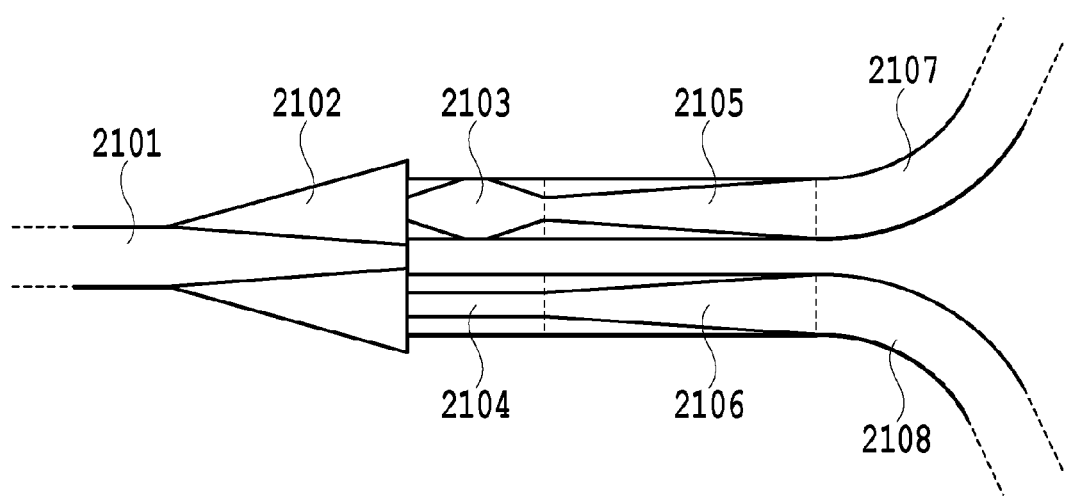
FIG. 34 is a view showing the configuration of a polarization rotator in a sixth embodiment of the present invention.

FIG. 34 is a plan view showing a configuration example of the polarization rotator in this embodiment. The configuration and size of a polarization converter 2102 are similar to those of the polarization converter 1102, shown in FIG. 19.

A delay circuit 2103, 2104 and a directional coupler 2105, 2106 are each formed of rib waveguides having cross-sectional structures similar to that of the polarization converter 2102. The thickness of their thick cores is 0.22 µm, and the thickness of their thin cores is 0.15 µm.

An input waveguide 2101 and output waveguides 2107, 2108 are formed of channel waveguides. Note that the output waveguides 2107, 2108 are such regions that the two waveguides 2107, 2108 are not optically coupled to each other. In other words, these regions are regions that do not operate as the directional coupler.

The widths of the input end and the output end of each thick core of the delay circuit 2103, 2104 are 0.2 µm, and the width of each thin core thereof is 0.5 µm. The length of the entire delay circuit is 8.9 µm.

Note that the thick core of the delay waveguide 2103 is formed of: an input-side taper having a length of 3.5 µm and gradually widening toward an intermediate portion; an output-side taper having a length of 3.5 µm and gradually narrowing toward the output end; and a rectangular waveguide therebetween having a width of 0.5 µm and a length of 1.9 µm.

Each thick core of the directional coupler 2105, 2106 has such a tapered structure that the width of the input end is 0.2 µm and the width of the output end is 0.5 µm.

Each thin core is a rectangular waveguide having a width of 0.5 µm. The length of the directional coupler 2105, 2106 is 15 µm. Moreover, the width of each input-output waveguide 2101, 2107, 2108 is 0.5 µm.

In the polarization rotator in this embodiment, TM-polarized basic mode light is inputted from the input-output waveguide 2101 into the polarization converter 2102 and outputted as TE-polarized 1st order mode light.

The TE-polarized 1st order mode light outputted from the polarization converter 2102 is inputted into the delay circuit 2103, 2104 as two TE-polarized basic modes having mutually opposite phases but the same intensity. The width of the thick center-portion core of the delay waveguide 2103 is increased by its tapered structure, so that the effective refractive index and group refractive index of the beam of light propagating therethrough are larger than those in the waveguide 2104. For this reason, the beam of light propagating through the delay waveguide 2103 is inputted into the directional coupler 2105, 2106 with a phase delay of ¼ of a wavelength relative to the beam of light propagating through the waveguide 2104.

The phase of the beam of light inputted into the waveguide 2105 of the directional coupler further delays by ¼ of a wavelength after it is coupled to the waveguide 2106 and transmitted, relative to the beam of light inputted into the waveguide 2105 and transmitted. As a result, the phase of the beam of light having passed through the waveguides 2103, 2105 has a delay of ½ of a wavelength relative to the phase of the beam of light having passed through the waveguides 2104, 2106. At the waveguide 2106, the beams of light become in phase and interfere with each other, and are outputted from the output waveguide 2108.

As described above, the polarization rotator in this embodiment implements a function similar those of the conventional polarization rotators. Here, the polarization rotator includes only silicon waveguides and needs no additional process for a silicon nitride layer or the like. Further, the entire circuit length can be smaller than that shown in the fifth embodiment.

In FIG. 34, in a case where TE-polarized basic mode light is inputted into the input waveguide 2101, it is not subjected to polarization conversion by the polarization converter 2102 and remains as TE-polarized basic mode light. The TE-polarized basic mode light is split into two beams of TE-polarized basic mode light having the same phase and intensity and inputted into the delay circuit 2103, 2104.

The beam of light propagating through the delay waveguide 2103 is inputted into the directional coupler 2105, 2106 with a phase delay of ¼ of a wavelength relative to that in the waveguide 2104.

The phase of the beam of light inputted into the waveguide 2106 of the directional coupler further delays by ¼ of a wavelength when it reaches the waveguide 2106. As a result, the phase of the beam of light having passed through the waveguides 2104, 2106 has a delay of ½ of a wavelength.

At the waveguide 2105, the beams of light become in phase and interfere with each other, and are outputted from the output waveguide 2107. Thus, in the polarization rotator in this embodiment, the waveguide that outputs light is different from when the input light is TE polarized to when the input light is TM polarized. Hence, the polarization rotator in this embodiment operates not only as a polarization rotator but also as a polarization splitter.

Modification 2

Figure 35:
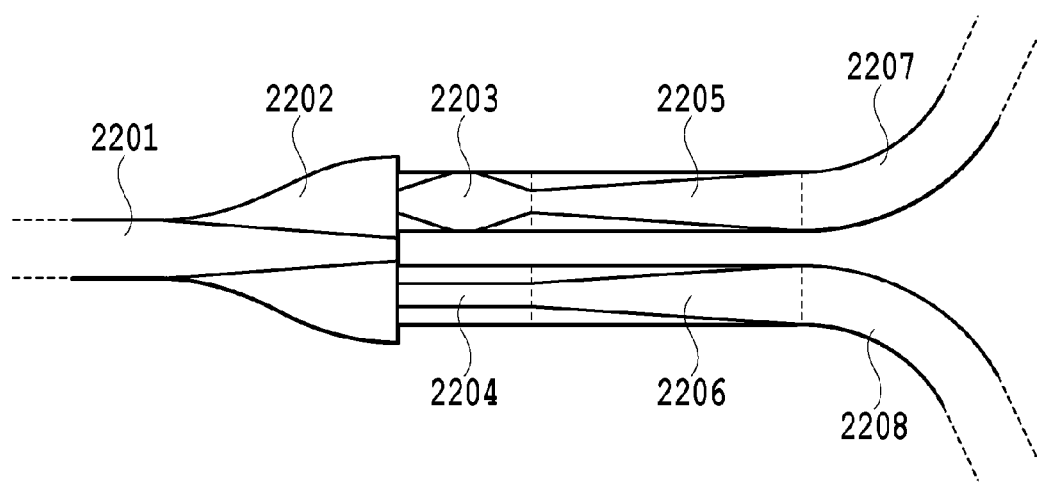
FIG. 35 is a view showing a configuration obtained by forming peripheral-portion cores of a polarization converter in the sixth embodiment into a curved taper.

FIG. 35 is a view showing a configuration in a modification obtained by forming the peripheral-portion cores of the polarization converter in the sixth embodiment into a curved taper. Modification 2 represents a polarization rotator with peripheral-portion cores formed into a curved taper. The modification in FIG. 35 shows a polarization rotator including a polarization converter 2202 having a tapered structure including thin cores using quadratic curves, as in the tapered structure shown in FIG. 31. In this way, the polarization rotator can operate as a polarization splitter and also suppress the occurrence of a high mode.

As described above, the polarization rotator in this embodiment neither needs an additional process such as fabrication of a nitride film, which is not employed in usual fabrication of a silicon waveguide circuit. Also, the gap between the waveguides of the directional coupler only needs to be 0.2 μm, and improvement in fabrication tolerance from the sixth embodiment can therefore be expected.

Seventh Embodiment

A mode converter of a polarization rotator in this embodiment is similar to the mode converter in the sixth embodiment, but a polarization converter in this embodiment is has a three-step rib structure. This three-step rib structure can further suppress the occurrence of a high mode and reduce the entire circuit length.

Figure 36:
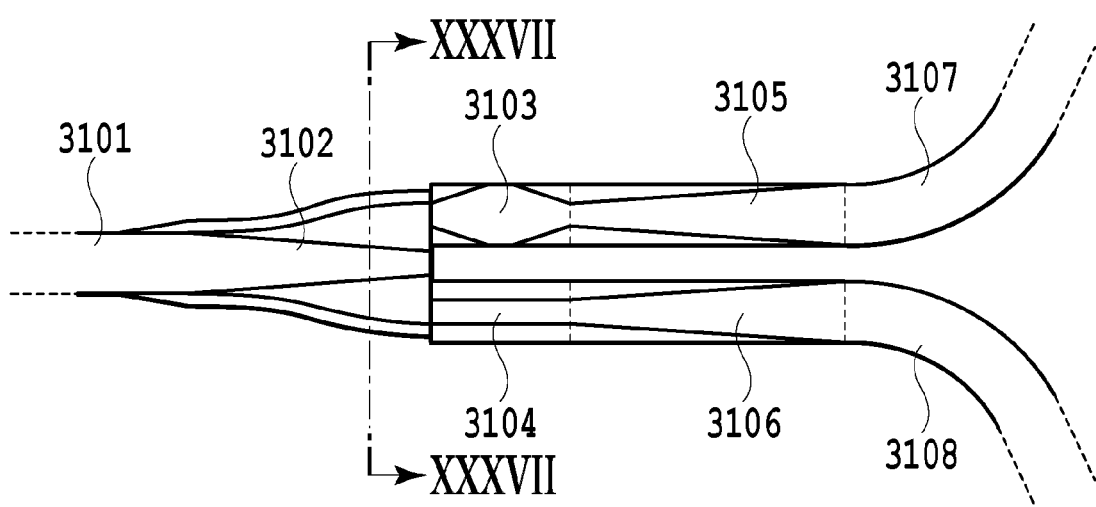
FIG. 36 is a view showing the configuration of a polarization rotator in a seventh embodiment of the present invention.

FIG. 36 is a plan view showing the configuration of the polarization rotator in this embodiment. The configurations and sizes of a delay circuit 3103, 3104 and a directional coupler 3105, 3106 are similar to those of the delay circuit 2103, 2104 and the directional coupler 2105, 2106, shown in FIG. 34. Moreover, output waveguides 3107, 3108 are similar to the output waveguides 2107, 2108, shown in FIG. 34.

The entire length of a polarization converter 3102 is 25 μm. At the input end, a width w1 of its thick center-portion core is 0.5 μm, and a width w2 of its thin peripheral-portion cores is 0.7 μm. At the output end, a width w3 of the thick center-portion core is 0.2 μm, a width w4 of the thin peripheral-portion cores is 1.6 μm, and a width w5 of thin cores is 1.8 μm.

An input waveguide 3101 includes a taper including thin cores at its peripheral portions so that the input waveguide 3101 can be optically connected to the thinnest peripheral-portion cores of the polarization converter 3102. Note that each of the two pairs of the thin peripheral-portion cores of the polarization converter 3102 has a tapered structure obtained by combining quadratic curves, and the cores that have a thickness of 0.15 μm are formed by curves derived from the same functions for the tapered structure shown in FIG. 31.

The taper of the thinnest peripheral-portion cores, having a thickness of 0.06 μm, is obtained by changing the curves of the taper of the 0.15-μm thick peripheral-portion cores such that the width is increased to 0.7 μm at the portion connected to the input waveguide 3101 and to 1.8 μm at the portion connected to the delay circuit.

Figure 37:
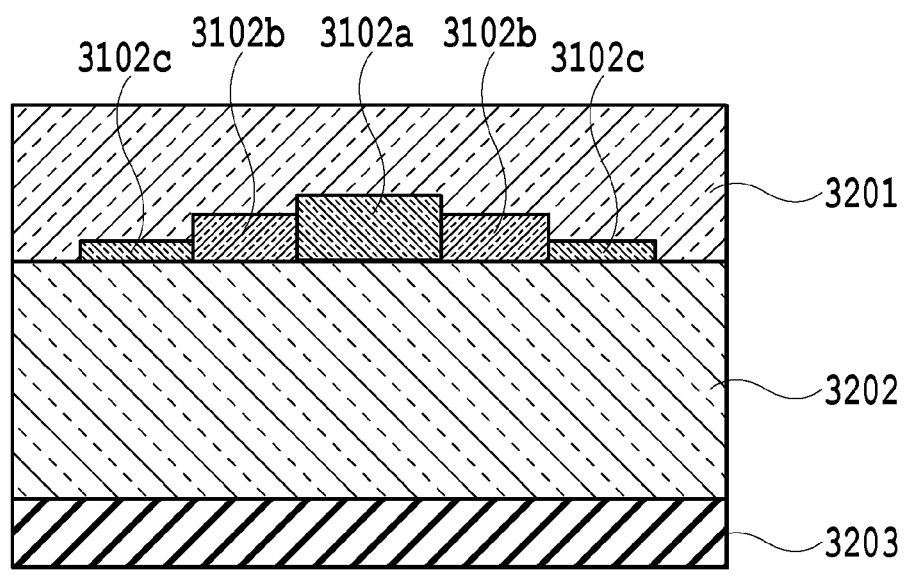
FIG. 37 is a cross-sectional view of the polarization rotator taken along line XXXVII-XXXVII shown in FIG. 36.

FIG. 37 is a cross-sectional view of the polarization converter 3102 taken along line XXXVII-XXXVII shown in FIG. 36.

An under cladding 3202 and an over cladding 3201 are formed on a silicon substrate 3203 in this order from the substrate. The over cladding 3201 and the under cladding 3202 are both made of silica glass.

A center-portion core 3102*a* is a core of a rib waveguide made of silicon, and peripheral-portion cores 3102*b*, 3102*c* are formed on its sides.

The core thickness of the center-portion core 3102*a* is 0.22 μm, and the core thickness of the peripheral-portion cores 3102*b* is 0.15 μm. The core thickness of the peripheral-portion cores 3102*c* is 0.06 μm, the thickness of the over cladding 3201 is 1.5 μm, and the thickness of the under cladding 3202 is 2 μm.

In the polarization rotator in this embodiment, TM-polarized basic mode light inputted from the input waveguide 3101 is inputted into the polarization converter 3102 and outputted as TE-polarized 1st order mode light. The TE-polarized 1st order mode light outputted from the polarization converter 3102 is split into two TE-polarized 0-th order modes having mutually opposite phases but the same intensity, and inputted into the delay circuit 3103, 3104.

The width of the center-portion core of the delay waveguide 3103 is increased by its tapered structure, so that the effective refractive index of the beam of light propagating therethrough is larger than that in the waveguide 3104. For this reason, the beam of light inputted into one of the waveguides, namely, the delay waveguide 3103, is inputted into the directional coupler 3105, 3106 with a phase delay of ¼ of a wavelength relative to the beam of light propagating through the other waveguide 3104.

The phase of the beam of light inputted into the waveguide 3105 of the directional coupler further delays by ¼ of a wavelength when it reaches the waveguide 3106. As a result, the phase of the beam of light having passed through the waveguides 3103, 3105 has a delay of ½ of a wavelength.

The beams of light inputted into the delay circuit 3103, 3104 are of mutually opposite phases at the beginning. Thus, as these beams of light are coupled at the directional coupler 3105, 3106, the beams of light become in phase and interfere with each other at the waveguide 3106, and outputted from the output waveguide 3108.

As described above, the polarization rotator in this embodiment implements a function similar to those of the conventional polarization rotators. The polarization rotator includes only silicon waveguides and does not need an additional process for a silicon nitride layer or the like, which is not employed in usual fabrication of a silicon waveguide circuit. Further, the polarization rotator in this embodiment can further reduce the entire circuit length as compared to the fifth embodiment and the sixth embodiment.

Note that the width of the right end of the taper formed of the 0.22-μm thick center core of the polarization converter 3102, the widths of the input and output ends of the 0.22-μm thick cores of the delay circuit 3103, 3104, and the widths of the output portions of the 0.22-μm thick cores of the directional coupler are dependent on the minimum core width that can be realized by the fabrication process. It is preferable to make the widths smaller than 0.2 μm if possible.

In FIG. 36, the 0.15-μm thick peripheral-portion cores and the 0.06-μm thick peripheral-portion cores of the polarization converter 3102 are both tapers defined by curves obtained by combining quadratic curves.

Figure 38:
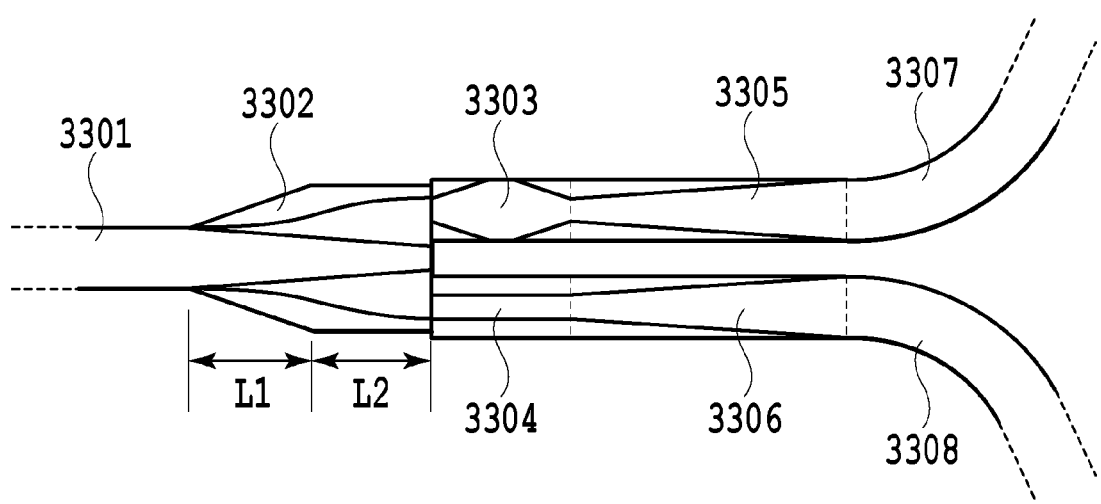
FIG. 38 is a view showing a configuration obtained by forming peripheral-portion cores of a polarization converter in the seventh embodiment into a straight taper.

FIG. 38 is a view showing a configuration obtained by forming some of the peripheral-portion cores of the polarization converter in the seventh embodiment into a straight taper. Like a polarization converter 3302 shown in FIG. 38, of the thin peripheral-portion cores of the polarization converter, only the 0.06-μm thick cores may be formed as a combination of a taper defined solely by straight lines and a rectangular waveguide. In this way, a high mode can be further suppressed. Since an input waveguide 3301 does not need a tapered structure, the entire circuit length can be further reduced.

The lengths of the taper defined solely by straight lines are L1=10 μm and L2=7 μm, and the entire length of the polarization converter is 17 μm.

Note that, in this embodiment too, as in the sixth embodiment, in a case where TE-polarized basic mode light is inputted from the input waveguide 3101, shown in FIG. 36, a TE-polarized basic mode is outputted from the output waveguide 3107. Thus, the waveguide that outputs light is different from when the input light is TE polarized to when the input light is TM polarized. Hence, the polarization rotator can thus operate not only as a polarization rotator but also as a polarization splitter. Likewise, the polarization rotator shown in FIG. 38 operates as a polarization splitter.

As described above, the polarization rotator in this embodiment neither needs an additional process such as fabrication of a nitride film, which is not employed in usual fabrication of a silicon waveguide circuit. Also, the gap between the waveguides of the directional coupler only needs to be 0.2 μm, and the fabrication tolerance is therefore improved as compared to NPL 2.

Eighth Embodiment

Description has been given of the case where the polarization converters 3102, 3302 in above FIGS. 36 and 38 are formed into three-step rib waveguide structures. However, they may be formed into two-step rib waveguide structures. Here, the delay circuit (3103, 3104 in FIG. 36 and 3303, 3304 in FIG. 38) and the directional coupler (3105, 3106, 3305, 3306) are formed of two-step rib waveguide structures each including a center-portion core having a thickness of 0.22 μm and peripheral-portion cores having a thickness of 0.15 μm. For this reason, mode mismatch occurs between the polarization converter (3102, 3302) and the delay circuit (3103, 3104, 3303, 3304), and reflection or radiation occurs as a loss. The configuration of the polarization converter of the polarization rotator in this embodiment is similar to that of the polarization converter in the seventh embodiment, but the delay circuit and the directional coupler are configured as follows in order to suppress the mode mismatch with the polarization converter. Specifically, the mode converter is configured in such a way as to integrate a delay circuit and a directional coupler using three-step rib waveguides including cores having thicknesses of 0.22 μm, 0.15 μm, and 0.06 μm.

Figure 39:
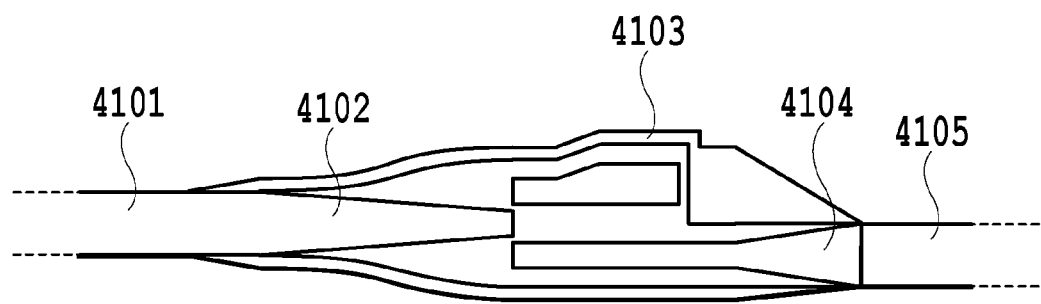
FIG. 39 is a view showing the configuration of a polarization rotator in an eighth embodiment of the present invention.

FIG. 39 is a plan view showing a configuration example of the polarization rotator in this embodiment.

The configuration of a polarization converter 4102 is similar to that of the polarization converter 3102, shown in FIG. 36, but differs in core width and length. Specifically, the width of the output end of the 0.22-μm thick core is 0.2 μm, the width of the output ends of the 0.15-μm thick cores is 1.0 μm, and the width of the 0.06-μm thick cores is 1.2 μm.

The length of the polarization converter 4102 is 25 μm. The functions of the curves defined by the 0.15-μm thick cores and the 0.06-μm thick cores are combinations of quadratic curves satisfying the above core widths.

A mode converter 4103 is a circuit in which a delay circuit and a directional coupler are integrated. In FIG. 39, the waveguide width of a 0.22-μm thick core on the top side of the sheet is partly increased toward the top side of the sheet such that the phase of light concentrating around the 0.22-μm thick core on the top side delays by ¼ of a wavelength relative to light concentrating around a 0.22-μm thick core on the bottom side of the sheet. The widths of a 0.15-μm thick core and a 0.06-μm thick core are partly increased in a similar manner.

Figure 40:
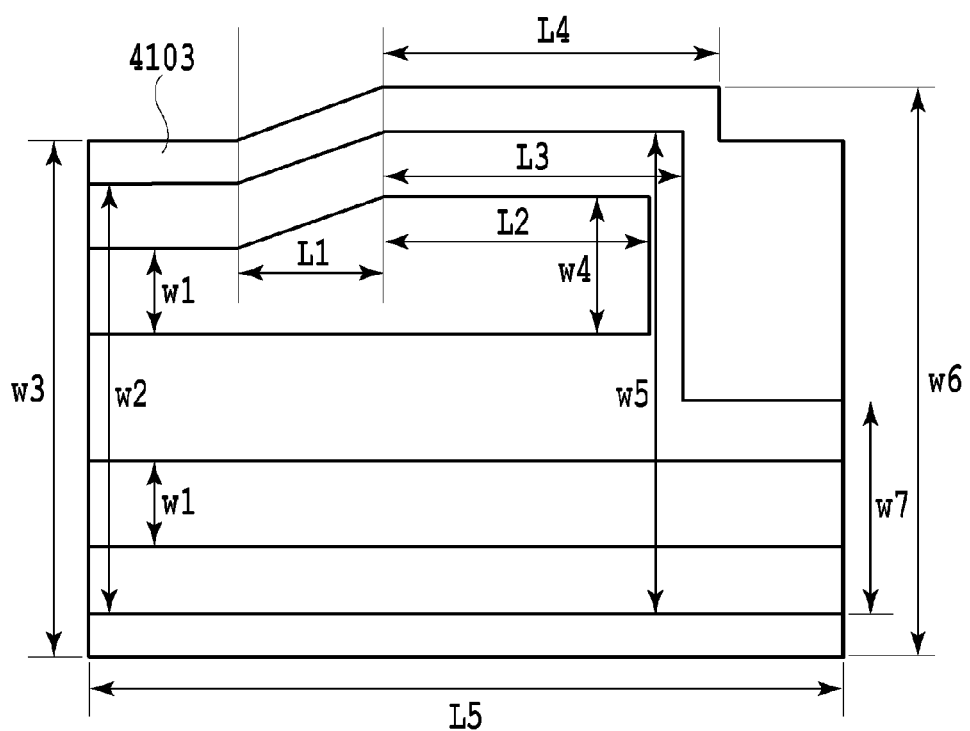
FIG. 40 is a view showing details of a mode converter of the polarization rotator in FIG. 39.

FIG. 40 is an enlarged view showing only the mode converter 4103, which is shown in FIG. 39 and in which the delay circuit and the directional coupler are integrated. In FIG. 40, the width of the input end of each of the 0.22-μm thick cores disposed at the top and bottom is w1=0.2 μm, and the distance between the centers of the cores is 0.8 μm. The width of the 0.15-μm thick cores is w2=1.0 μm.

The width of the 0.06-μm thick cores is w3=0.12 μm. The length of the widened taper portion of each of the 0.22-μm, 0.15-μm, and 0.06-μm thick cores is L1=1.5 μm. Of the 0.22-μm thick cores, the widened section of the core disposed on the top side of the sheet includes a rectangular widened portion having a length of L2=2.9 μm and a width of w4=0.4 μm.

Of the 0.22-μm thick cores, the core disposed on the bottom side of the sheet is a rectangular waveguide over the entire area thereof, and its width is w1=0.2 μm. The width and length of the rectangular widened portion of the 0.15-μm thick cores are w5=1.2 μm and L3=3.0 μm, respectively, and the width of the right end of the 0.15-μm thick cores is w7=0.5 μm.

The width and length of the rectangular widened portion of the 0.06-μm thick cores are W6=1.4 μm and L4=3.1 μm, respectively. A length L5 of the entire mode converter may be any length as long as it is larger than the entire length of the widened sections. In this embodiment, L5=6.0 μm, for example.

A termination taper 4104 is formed of a three-step rib waveguide having thicknesses of 0.22 μm, 0.15 μm, and 0.06 μm. The termination taper 4104 is optically connected to the mode converter 4103 and an input-output waveguide 4105.

The 0.22-μm thick center core has a tapered structure, and the width of its input end is 0.2 μm while the width of its output end is 0.5 μm. The 0.15-μm thick peripheral-portion core is a rectangular waveguide and its width is 0.5 μm. The 0.06-μm thick peripheral-portion core has a tapered structure, and the width of its input end is 1.2 μm while the width of its output end is 0.5 μm.

The length of the termination taper 4104 is 5 μm. The output waveguide 4105 is a channel waveguide including a core having a thickness of 0.22 μm, and is a rectangular waveguide having a width of 0.5 μm.

In the polarization rotator in FIG. 39, TM-polarized basic mode light is inputted into the polarization converter 4102 through an input waveguide 4101 and outputted as TE-polarized 1st order mode light.

The TE-polarized 1st order mode light outputted from the polarization converter 4102 is inputted into the mode converter 4103 as two beams of TE-polarized 0-th order mode light having mutually opposite phases. Of the two beams of TE-polarized 0-th order mode light, the phase of the beam of light propagating through the top side of the sheet of FIG. 39 delays by ¼ of a wavelength relative to the beam of light propagating through the bottom side of the sheet of FIG. 39. The beams of light are combined into a TE-polarized 0-th mode light at the waveguide on the bottom side of the sheet and outputted from the output waveguide 4105 through the termination taper 4104.

As described above, the polarization rotator in this embodiment implements a function similar to those of the polarization rotators of the conventional techniques. On the other hand, the polarization rotator in this embodiment includes only silicon waveguides and does not need an additional process for a silicon nitride layer or the like, which is not employed in usual fabrication of a silicon waveguide circuit.

Moreover, utilizing the mode converter 4103, which has a three-step rib structure, eliminates the need of splitting waveguides as in the mode converter shown in FIG. 19 (the delay circuit 1103, 1104 and the combiner 1105) and the mode converter shown in FIG. 34 (the delay circuit 2103, 2104 and the directional coupler 2105, 2106). Accordingly, the polarization rotator in this embodiment can reduce the circuit width, and can also reduce the coupling length of the directional coupler and thus reduce the circuit length.

Moreover, if the circuit width is reduced, the entire length of the polarization converter can be reduced as well. Hence, the circuit length can be further reduced as compared to the polarization converter 3102, shown in FIG. 36. Thus, by using the mode converter 4103 of the three-step rib structure as in this embodiment, it is possible to further reduce the circuit length and the circuit area as compared to the fifth to seventh embodiments.

In the polarization rotator in this embodiment, shown in FIG. 39, the entire length of the polarization converter is 25 μm, the entire length of the mode converter is 6 μm, the entire length of the input and output tapered waveguides is 5 μm, and the entire length of the entire polarization rotator is 36 μm. Hence, the circuit size and length can be greatly reduced as compared to the polarization rotator disclosed in NPL 2, whose entire length is 71 μm.

Note that the width of the input end of the taper formed of the 0.22-μm thick center core of the polarization converter 4102 and the widths of the output ends of the 0.22-μm thick cores of the mode converter and the output end of the 0.22-μm thick termination taper are dependent on the minimum core width that can be realized by the fabrication process. It is preferable to make the widths smaller than 0.2 μm if possible.

In the polarization converter 4102 of the polarization rotator in this embodiment, shown in FIG. 39, both of the 0.15-μm thick peripheral-portion cores and the 0.06-μm thick peripheral-portion cores are tapers defined by curves obtained by combining quadratic curves, but can be have different tapered shapes.

Figure 41:
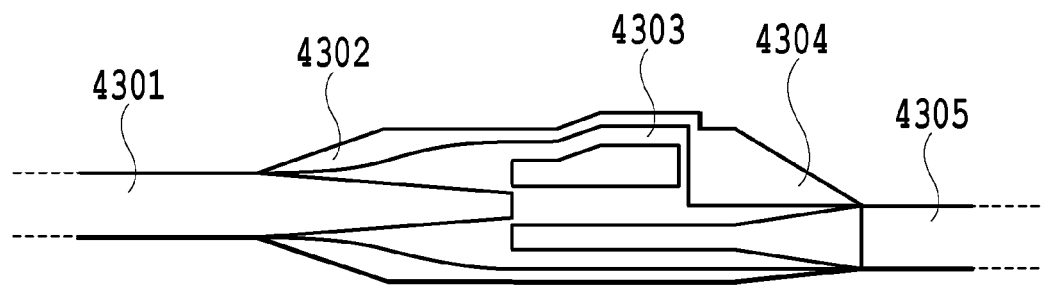
FIG. 41 is a view showing a configuration obtained by forming peripheral-portion cores of the polarization rotator in the eighth embodiment into a straight taper.

FIG. 41 is a view showing a configuration obtained by forming some peripheral-portion cores of the polarization rotator in the eighth embodiment into a straight taper. As shown in FIG. 41, of the thin peripheral-portion cores of the polarization converter, only the 0.06-μm thick cores are formed as a combination of a taper defined solely by straight lines and a rectangular waveguide. In this way, a high mode can be further suppressed. Hence, an input waveguide 4301 does not need a tapered structure, and the entire circuit length can be reduced accordingly. The lengths of the taper defined solely by straight lines are L1=10 μm and L2=7 μm, the entire length of the polarization converter is 17 μm, and the entire circuit length is 28 μm. Thus, the circuit length can be greatly reduced as compared to 71 μm in NPL 2.

In the polarization rotator in this embodiment, a branch circuit may be disposed on the output side of the mode converter. In this way, the polarization rotator can operate also as a polarization splitter as in the fifth to seventh embodiments.

Figure 42:
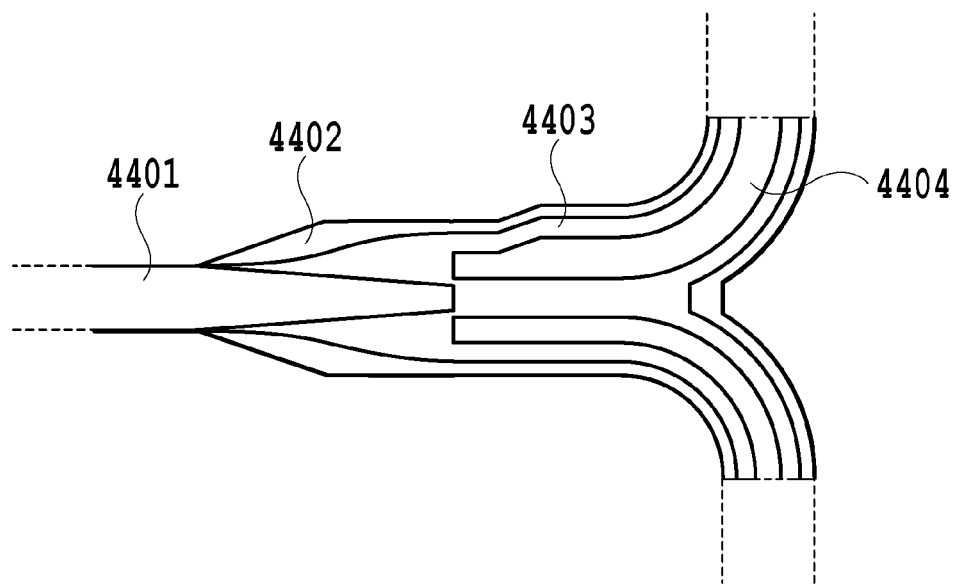
FIG. 42 is a view showing the configuration of a polarization rotator-splitter in the eighth embodiment.
Figure 43A:
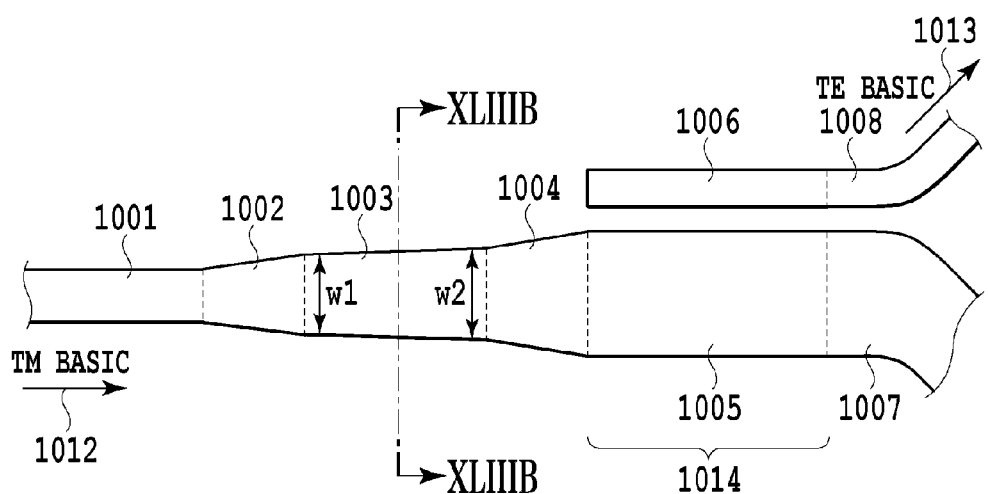
FIG. 43A is a view showing the configuration of a polarization rotator in Conventional Technique Example 2.
Figure 43B:
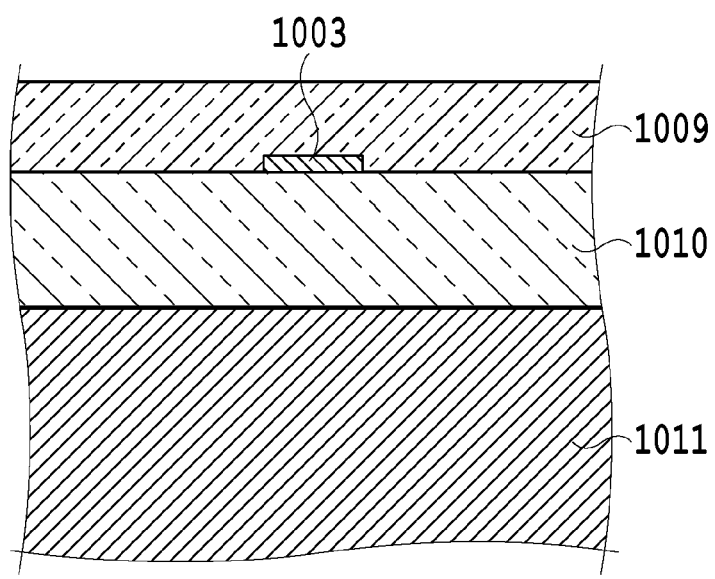
FIG. 43B is a view showing a cross-sectional structure of the polarization rotator in Conventional Technique Example 2.

FIG. 42 is a plan view showing the structure of a polarization splitter obtained by disposing a branch circuit on the output side of a mode converter. A mode converter 4403 is designed such that the length of the waveguide formed of the 0.22-μm thick core of each of the mode converters 4103, 4303 of the polarization rotators, shown in FIGS. 39 and 41, on the bottom side of the figures is made equal to the length of the waveguide formed of the 0.22-μm thick core on the top side of the figures. The length is 6 μm.

A branch circuit 4404 shown in FIG. 42 has a three-step rib structure including cores having thicknesses of 0.22 μm, 0.15 μm, and 0.06 μm. The branch circuit 4404 is designed such that mode coupling does not occur between the waveguide on the top side of the sheet and the waveguide on the bottom side of the sheet.

TM-polarized basic mode light inputted into an input waveguide 4401 is converted by a polarization converter 4402 into TE-polarized 1st order mode light and inputted into the mode converter 4403. The TE-polarized 1st order mode light inputted into the mode converter 4403 is split into two beams of TE-polarized basic mode light having mutually opposite phases but the same intensity. The phase of the beam of light propagating through the 0.22-μm thick core portion on the top side of the sheet delays by ¼ of a wavelength relative to the beam of light propagating through the 0.22-μm thick core portion on the bottom side of the sheet, interferes with the beam of light propagating through the 0.22-μm thick core portion on the bottom side of the sheet, and is outputted from the waveguide of the branch circuit 4404 on the bottom side of the sheet.

TE-polarized basic mode light inputted from the input waveguide 4401 is not subjected to polarization conversion by the polarization converter 4402 and is inputted into the mode converter 4403 while remaining as TE-polarized basic mode light. The TE-polarized basic mode light inputted into the mode converter 4403 is split into two beams of TE-polarized basic mode light having the same phase and intensity. The phase of the beam of light propagating through the 0.22-μm thick core portion on the top side delays by ¼ of a wavelength relative to the beam of light propagating through the 0.22-μm thick core portion on the bottom side of the sheet, interferes with the beam of light propagating through the 0.22-μm thick core portion on the bottom side of the sheet, and is outputted from the waveguide of the branch circuit 4404 on the top side of the sheet.

As described above, in the polarization rotator shown in FIG. 42, the waveguide that outputs light is different from when the inputted light is TE polarized to when the inputted light is TM polarized. Hence, the polarization rotator operates not only as a polarization rotator but also as a polarization splitter.

As described above, the polarization rotator in this embodiment neither needs an additional process such as fabrication of a nitride film, which is not employed in usual fabrication of a silicon waveguide circuit. Also, the smallest process dimension only needs to be 0.2 μm, and the fabrication tolerance is therefore improved as compared to the polarization rotator disclosed in NPL 2.

In each of the above first to eighth embodiments and modifications, silica glass is used as the material of each of the over cladding and the under cladding, but the over cladding and the under cladding are not limited to this material. The over cladding and the under cladding only need to be made of a material lower in refractive index than silicon. Moreover, the values of the thicknesses of the over cladding and the under cladding are not limited to those in the above embodiments and modifications.

For the polarization converter in each of the above first to eighth embodiments, design parameters of the silicon waveguide are limited to specific values, but the silicon waveguide is not limited to these parameters. The width of the silicon waveguide that causes conversion between TM-polarized basic mode light and TE-polarized 1st order mode light is determined by the thicknesses of the cores of the waveguide and the materials and refractive indexes of the over cladding and the under cladding. The widths of the opposite ends of the tapered waveguide at the polarization converter only need to be set to cover a range of change in waveguide width within which the conversion.

The mode converter in the fifth embodiment employs a MMI circuit as its optical coupler, but can also employ any other circuits that implement optical combination such as a Y-branch circuit. Moreover, the mode converter in the fifth embodiment creates a phase difference by using the difference in waveguide length between the delay waveguide 1103 and the waveguide 1104, but can also create the phase difference by using a difference in width between the waveguides.

As described above in detail, with the present invention, it is possible to provide a polarization rotator that includes only silicon waveguides and needs no additional process for a silicon nitride layer or the like. Further, with the present invention, it is possible to relax requirements on fabrication accuracy in close arrangement of waveguides.

INDUSTRIAL APPLICABILITY

The present invention can be generally utilized in optical communication systems.

REFERENCE SIGNS LIST

101, 110, 174, 181, 184, 201, 212, 301, 310, 1001, 1007, 1008, 1101, 1401, 1501, 1601, 1801, 2101, 2201, 3101, 3301, 4101, 4301, 4401 input-output waveguide
102, 103, 108, 109, 172, 173, 202, 203, 207, 208, 302, 303, 305, 307, 1503, 1504, 1604, 1605, 1804, 1805, 4104, 4304 rib-channel conversion waveguide
104, 204, 304, 1003, 1102, 1402, 1502, 2102, 2202, 3102, 3302, 4102, 4302, 4402 polarization converter
104a, 204a, 206a, 206b, 304a, 306a, 306b center-portion core
104b, 104c, 204b, 204c, 206c to 206e, 304b, 304c, 306c to 306e peripheral-portion core
105, 171, 182, 183, 205, 305, 313 intermediate waveguide
106, 107, 205, 206, 308, 309, 1005, 1006 waveguide of asymmetric directional coupler
111, 185, 213, 311, 1012 TM-polarized basic mode light
112, 176, 186, 214, 312, 1013 TE-polarized basic mode light
113, 215, 314, 4103, 4303, 4403 mode converter
121, 131, 141, 221, 231, 241, 321, 331, 341, 351, 1009, 1201, 1211, 3201 over cladding
122, 132, 142, 222, 232, 242, 322, 332, 342, 352, 1010, 1202, 1212, 3202 under cladding
123, 133, 143, 223, 233, 243, 323, 333, 343, 353, 1011, 1203, 1213, 3203 silicon substrate
161, 162, 1002, 1004 tapered waveguide
206 optical splitter
209, 210 delay circuit
211, 1105 optical coupler
1103, 1407, 1505, 1606, 1806, 2103, 2203, 3103, 3303 delay waveguide
1104, 1408, 1506, 1607, 1807, 2104, 2204, 3104, 3304 delay-less waveguide
1409, 1507, 1608, 1808 MMI coupler

The invention claimed is:
1. A polarization rotator comprising:
a polarization converter including a silicon rib waveguide and configured to convert TM-polarized basic mode light into TE-polarized 1st order mode light, the silicon rib waveguide including a center-portion core and a peripheral-portion core thinner than the center-portion core, and having such a tapered shape that a core width of the peripheral-portion core gradually increases along a propagation axis of the TM-polarized basic mode light that is converted into TE polarized 1$^{st}$ order mode light; and a mode converter optically connected to the polarization converter and configured to convert the TE-polarized 1st order mode light into TE-polarized basic mode light, wherein the mode converter includes:
an optical splitter optically connected to the polarization converter,
a delay circuit including two waveguides, and
an optical coupler.

2. The polarization rotator according to claim 1, wherein the optical splitter includes
a silicon rib waveguide with no center-portion core, and
a silicon rib waveguide including two thick core portions, and
the silicon rib waveguide with no center-portion core has one end connected to the polarization converter.

3. The polarization rotator according to claim 1, wherein the mode converter includes
a delay circuit including two waveguides optically connected to the polarization converter, and
any one of an optical coupler and an optical combiner.

4. A polarization rotator comprising:
a polarization converter including a silicon rib waveguide and configured to convert TM-polarized basic mode light into TE-polarized 1st order mode light, the silicon rib waveguide including a center-portion core and a peripheral-portion core thinner than the center-portion core, and having such a tapered shape that a core width of the peripheral-portion core gradually increases along a propagation axis of the TM-polarized basic mode light that is converted into TE polarized 1$^{st}$ order mode light; and
a mode converter optically connected to the polarization converter and configured to convert the TE-polarized 1st order mode light into TE-polarized basic mode light, wherein the mode converter includes:
a delay circuit including two waveguides optically connected to the polarization converter, and
any one of an optical coupler and an optical combiner.

5. The polarization rotator according to claim 4, wherein the mode converter includes
a delay circuit configured to cause a delay of ½ of a wavelength and a 2×1 coupler, or
a delay circuit configured to cause a delay of ¼ of a wavelength and a 2×2 combiner.

6. The polarization rotator according to claim 5, wherein the delay circuit of the mode converter that is configured to cause a delay of ¼ of a wavelength is two silicon rib waveguides each including a center-portion core having a first thickness and a peripheral-portion core having a second thickness, wherein the first thickness is greater than the second thickness,
one of the two silicon rib waveguides has a structure including such tapers that a width of the center-portion core gradually increases and then gradually decreases toward an output side, and
the 2×2 combiner of the mode converter is a directional coupler.

7. The polarization rotator according to claim 5, wherein
the center-portion core of the polarization converter has such a tapered shape that a width of the center-portion core gradually decreases toward an output side, and
the peripheral-portion core of the polarization converter has such a tapered shape that the width of the peripheral-portion core gradually increases toward the output side.

8. The polarization rotator according to claim 7, wherein the tapered shape of the peripheral-portion core of the polarization converter is designed such that the width of the peripheral-portion core increases in a curved manner.

9. The polarization rotator according to claim 8, wherein the polarization rotator operates also as a polarization rotator-splitter.

10. The polarization rotator according to claim 5, wherein the tapered shape of the peripheral-portion core of the polarization converter is designed such that the width of the peripheral-portion core increases in a curved manner.

11. The polarization rotator according to claim 5, wherein the polarization rotator operates also as a polarization rotator-splitter.

12. The polarization rotator according to claim 4, wherein
the polarization converter and the mode converter are optically connected by a tapered intermediate waveguide,
the tapered intermediate waveguide is a rib waveguide including a center-portion core and a peripheral-portion core thinner than the center-portion core, and has such a tapered shape that a width thereof gradually decreases toward an output side,
a portion connecting the tapered intermediate waveguide and the mode converter includes two cores, and
each of the two cores has such a tapered shape that a width of the core gradually increases.

13. The polarization rotator according to claim 4, wherein
the center-portion core of the polarization converter has such a tapered shape that a width of the center-portion core gradually decreases toward an output side, and
the peripheral-portion core of the polarization converter has such a tapered shape that the width of the peripheral-portion core gradually increases toward the output side.

14. The polarization rotator according to claim 4, wherein the tapered shape of the peripheral-portion core of the polarization converter is designed such that the width of the peripheral-portion core increases in a curved manner.

15. The polarization rotator according to claim 4, wherein the polarization rotator operates also as a polarization rotator-splitter.

* * * * *